United States Patent [19]

Pocius

[11] Patent Number: 5,039,603
[45] Date of Patent: Aug. 13, 1991

[54] EDUCATIONAL SYSTEM FOR TEACHING COUNTING AND EQUATION SOLVING STRATEGIES

[76] Inventor: Frank Pocius, 2315 Broad Pke., Cinnaminson, N.J. 08077

[21] Appl. No.: 327,726

[22] Filed: Mar. 23, 1989

[51] Int. Cl.$^5$ ............................................. G09B 19/02
[52] U.S. Cl. ................................. 434/188; 434/191; 434/200
[58] Field of Search ............... 434/188, 191, 194, 195, 434/196, 200, 205, 210

[56] References Cited

U.S. PATENT DOCUMENTS

| | | | |
|---|---|---|---|
| 2,502,238 | 3/1950 | Wade et al. | 434/208 |
| 2,722,754 | 11/1955 | Slote | 434/190 |
| 3,235,975 | 2/1966 | Pierson | 434/189 |
| 3,276,151 | 10/1966 | Smith, Jr. | 434/190 |
| 3,423,849 | 1/1969 | Jordan et al. | 434/188 |
| 3,514,873 | 6/1970 | Stobbe | 434/190 |
| 4,713,009 | 12/1987 | Borenson | 434/188 |

Primary Examiner—William H. Grieb
Attorney, Agent, or Firm—Donald C. Simpson

[57] ABSTRACT

This invention encompasses teaching kits for mathematics and a set of cooperating cards for use with the kits. A single surface displaying manipulable elements arranged on the surface is used to teach concepts of counting denominate units and evaluating expressions. Two surfaces displaying manipulable elements arranged on each surface simulate a linear equation. Four surfaces displaying manipulable elements arranged on each surface simulate a system of two linear equations. The elements are distinguishable by physical features in such a way that typically as many as three distinct denominate units are displayed with both positive and negative representations. The invention can be extended, in general, to a system of n equations, with 2n surfaces. Certain elements mask the occurrence of other elements in such a way as to simulate a variable in an equation. The cards serve to provide information for utilizing the boards and also can be employed by themselves. By manipulating elements a student is taught, in a very concrete and tangible fashion, the strategies necessary to count an array, solve a linear equation, or solve a system of two or more linear equations.

12 Claims, 58 Drawing Sheets

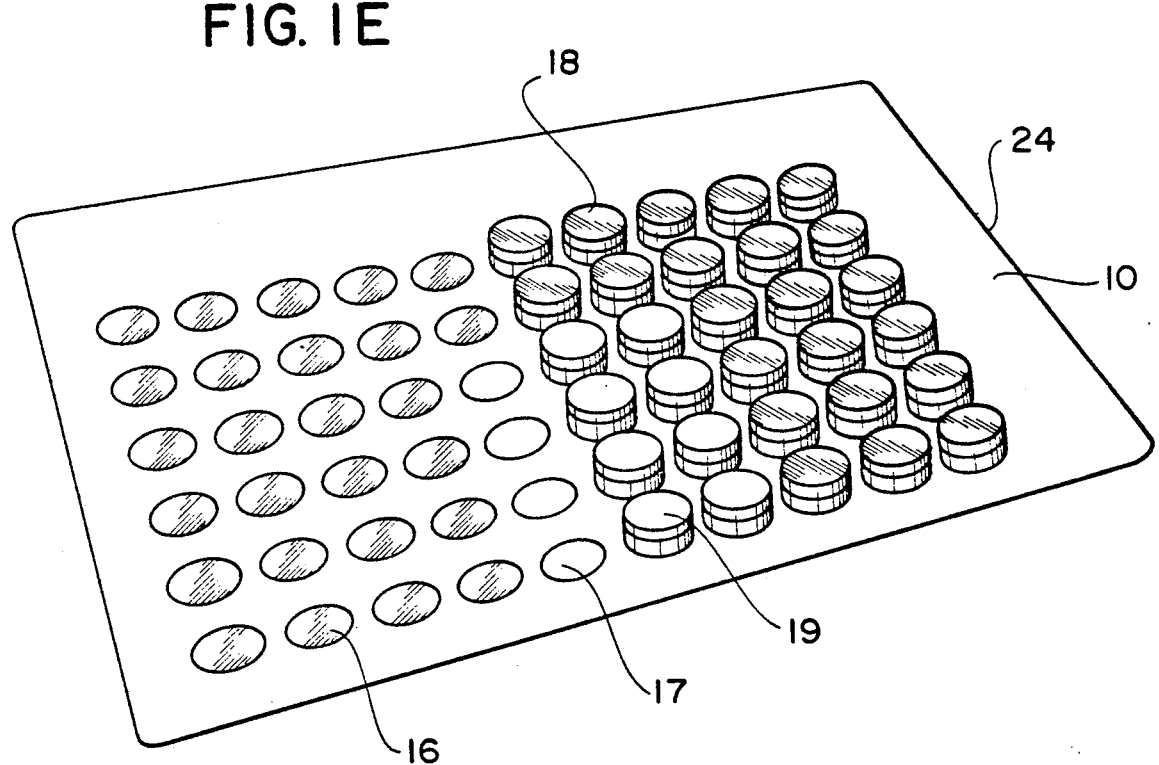
FIG. IE

FIG. IIH
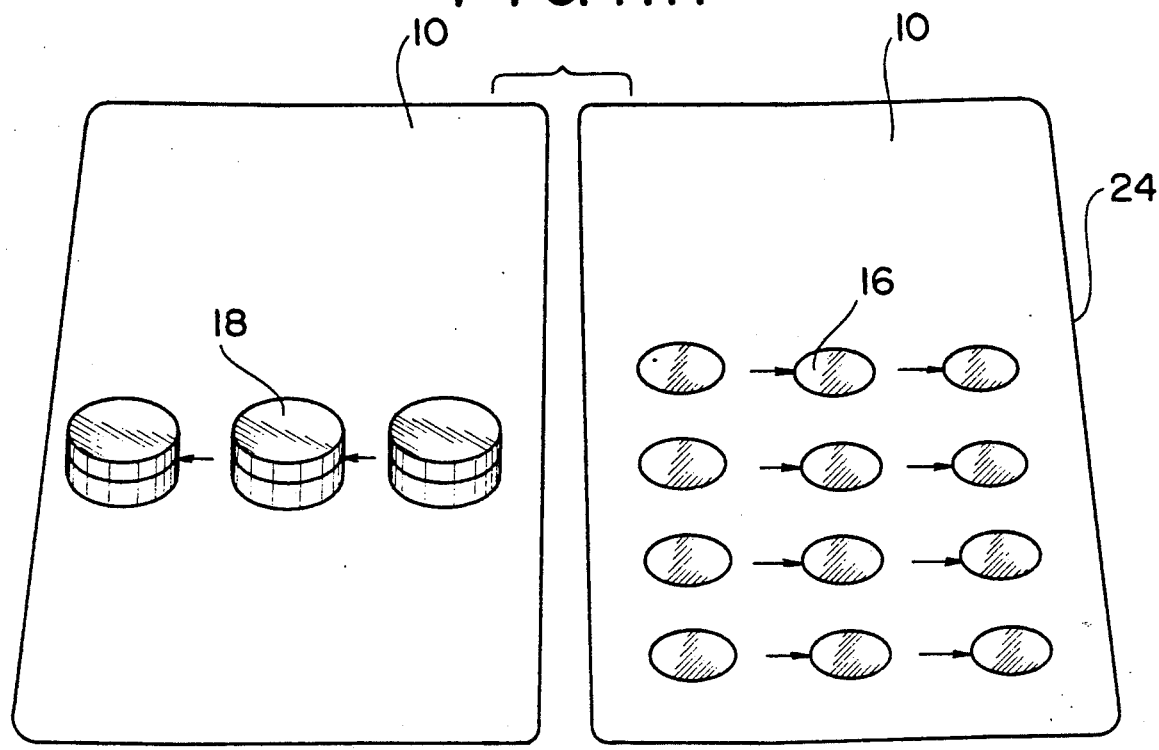
FIG. III
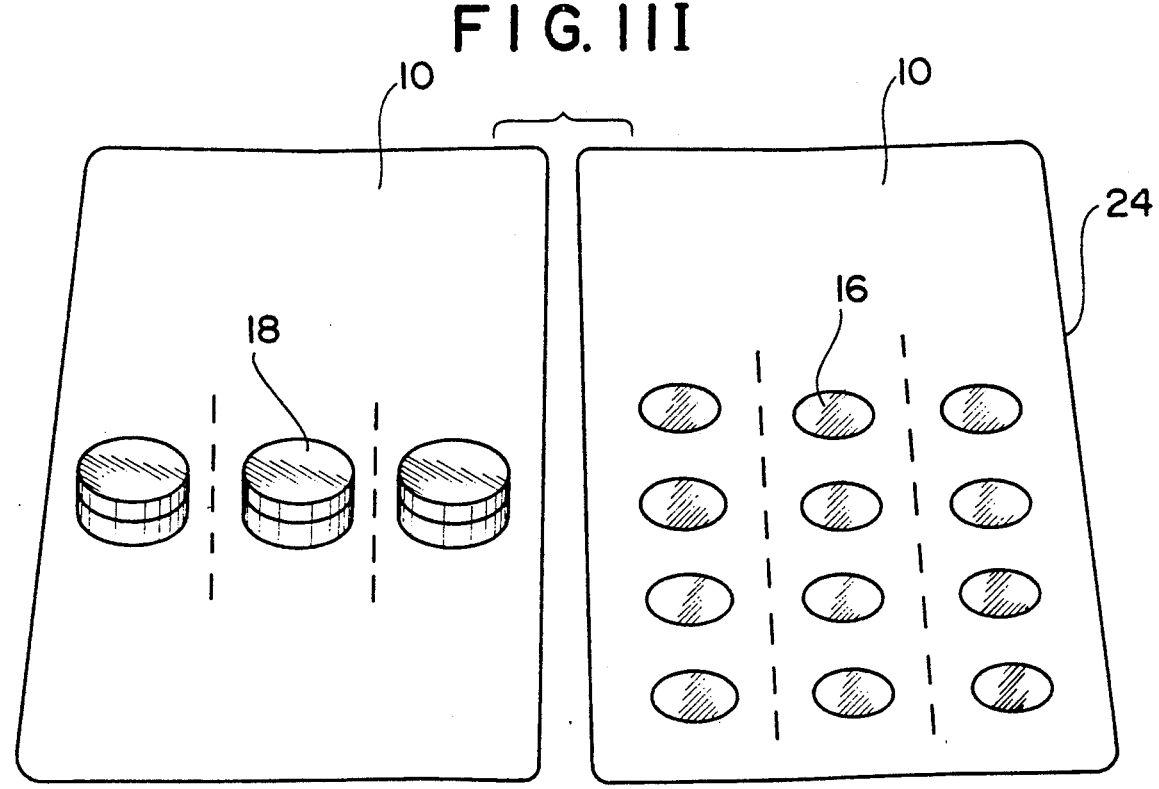

$$3d + 6c = 3c + 9d$$

$$\frac{3(1d + 2c)}{3} = \frac{3(1c + 3d)}{3}$$

$$\begin{array}{rcr} 1d + 2c & = & 1c + 3d \\ -1d - 1c & & -1c - 1d \\ \hline 1c & = & 2d \end{array}$$

$$1c + 1b = 5d$$
$$1c + 2b = 8d$$
$$\underline{-1c - 1b \phantom{xx} -5d}$$
$$1b = 3d$$
$$1c + 1b = 5d$$
$$1c + 3d = 5d$$
$$\underline{\phantom{1c+}-3d \phantom{xx} -3d}$$
$$1c \phantom{xxxx} = 2d$$

EDUCATIONAL SYSTEM FOR TEACHING COUNTING AND EQUATION SOLVING STRATEGIES

This invention relates to teaching devices for the concrete and tangible representation of the methods for counting arrays, evaluating expressions, solving linear equations and/or solving systems of two or more linear equations of a corresponding number of unknowns.

BACKGROUND OF THE INVENTION

It has been argued that the quality of mathematics education in the United States has deteriorated over a period of years. Students are not exhibiting depth of understanding of the subject and certainly are not developing an enthusiasm for it. Part of the reason for this lies in the abstract nature of mathematics itself, but part also lies in the way it is customarily taught. In many classrooms, the instructional sequence is as follows:

1. The teacher presents a technique or introduces a topic, usually by definition.
2. The students practice the technique or work on the topic.
3. A test is given to measure mastery of the technique or topic.
4. The teacher moves on to the next topic or technique.

Because of the inherent abstractness in mathematics, this pedagogical approach simply does not generate long-lasting success. Students often do not understand what they are learning and succeed more by mimicry than by genuine knowledge. Moreover, this approach tends to make students endure mathematics rather than enjoy it.

FIELD OF THE INVENTION

It is a premise of this invention that any teaching device and/or strategy which can impart a concrete understanding in the mind of the student must be considered worthy of use and implementation. When a student has a concrete understanding of what he is doing, he has a foundation from which to develop the abstractness inherent in mathematics. This invention is designed to facilitate the following teaching strategy:

1. The student is presented with a concrete manifestation of the process involved. Through manipulations performed in the concrete setting, the student develops an internalized understanding of the problem solving to be performed.
2. Mathematical symbolism is then introduced which parallels the concrete and the student can correlate a written solution with a problem which he has already learned to solve in a tangible manner.
3. Eventually, the student is weaned away from the concrete manifestation and can solve a problem given only its symbolic form.
4. At this point the student is ready to accept any necessary formalization or verbalization of concepts (as opposed to an a priori definition of concepts).

This invention comprises a set of teaching devices which permit this strategy to be utilized in the very important topics of counting and evaluating expressions, solving linear equations, and solving systems of linear equations.

RELATED PRIOR ART

Stobbe (U.S. Pat. No. 3,514,873) devised a board which allowed the arrangement of elements for counting purposes. However, it does not provide for expression evaluation nor does it possess the necessary features to allow the teaching of counting by partitioning. Jordan and Fiske (U.S. Pat. No. 3,423,849) created a visual representation of equality by filling equal areas with rectangles of various sizes. However, there is neither intention nor capability with this device for either solving the equation or for determining how the various-sized rectangles actually count the same type of object. Pierson (U.S. Pat. No. 3,235,975) visually established equations using a peg board with square and circular inserts to represent variables and constants. However, the "equality" thus represented is an abstraction, as the objects utilized do not actually perform a counting function. Borenson (U.S. Pat. No. 4,713,009) devised a pseudo-balance to represent an equation, with pawns signifying variables and numbered cubes indicating constants, with a contrasting color used for negative values. Once again, however, the concrete manifestation of the equation has its origin in an abstraction in that there is no perceivable connection between what the pawns count and what the numbered cubes count. Moreover, each cube can be made to indicate a different value by merely rotating its upper face so that the actual counting thus represented is an abstraction. Also, the balance actually presents a distorted reality in that it will always indicate a situation of balance even if the student performs an incorrect maneuver.

SUMMARY OF THE INVENTION

This invention provides a concrete environment (non-verbal and non-memory oriented) which facilitates the establishment of mathematical concepts and skills necessary to develop problem solving strategies, including modeling. It comprises an apparatus and environment which can be used for individualized or independent student instruction as well as group instruction and enables students to formulate inductively arithmetic and algebraic concepts prior to being exposed to the verbal or symbolic formalisms which establish the same concepts by definition.

The apparatus of this invention permits the simultaneous instruction of arithmetic facts and algebraic forms at the elementary grade level. Children of average ability attending elementary grades may learn concepts of arithmetic and algebra normally reserved for more advanced or so-called "gifted" students. Even visually handicapped children can learn many of the concepts of mathematics when provided with a tactile learning aid; this invention provides each student with a learning environment that utilizes, at its optimum level, an individual tactile sensory apparatus to be used in conjunction with visual and auditory senses for learning basic arithmetic and algebraic concepts.

It is possible, by use of the present invention for a student to understand the logic that determines a solution to an equation in a concrete environment prior to the establishment of algebraic and arithmetic formalisms and properties of equality that accomplish the same task but by mimicry or rote. This invention also provides a counting environment to teach, in a concrete sense, order of operations. Since each number counts a denominate unit, order of operation is a natural consequence of combining only those numbers which count the same thing. The single board version of the invention provides such a counting environment or process that is a viable alternative to defining an order to abstract operations; it also can be used to demonstrate arithmetic and algebraic properties of commutivity and associativity of addition and multiplication and the distributive property of multiplication over addition. The apparatus establishes a concrete environment for teaching inverse arithmetic and algebraic operations and their relationships to addition and multiplication.

BRIEF DESCRIPTION OF THE DRAWINGS

The drawings indicate various uses of the invention.

FIGS. 1A through E illustrate a single board used for various counting exercises.

FIGS. 11A through K illustrate a two-board system used for the solution of a linear equation requiring equivalent replication on both sides of the equality (multiplication).

DETAILED DESCRIPTION OF THE INVENTION

Figure 1A:
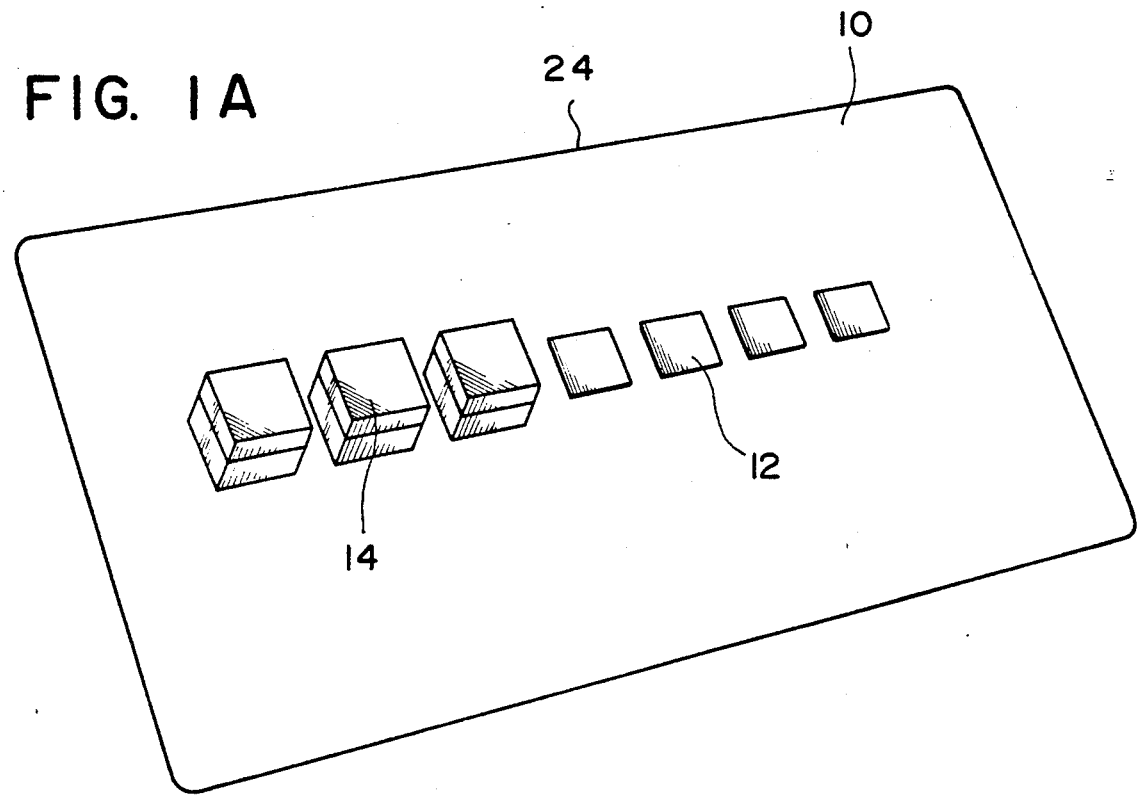

The invention consists of the following components:
1. Display surfaces for the placement of objects.

2. A plurality of masking objects and counting objects which can be placed on or attached to the display surfaces. The objects may be three dimensional representations of either two or three dimensional objects. The objects may possess indicia. Similar objects will be distinguishable by means of dominant physical features, such as color, texture, shape, size, dimension or visual consistency. For each type of object, there will be a corresponding object of a contrasting physical feature which will serve as a "negative". Certain objects may be of sufficient size so as to contain a plurality of other objects.

3. A plurality of descriptive cooperating cards, which diagram for the instructor how the objects are to be displayed on the surfaces for a particular problem, and what the solution of the problem should be. Each card provides in "picture" form a representation of the setup of the surface. The reverse side provides symbolic representations which count and thereby formulate a count for the units depicted. Numbers for evaluation may be provided. The same pictorial representatives may be provided on computer software.

A single display surface can be utilized for counting exercises and/or expression evaluation. Two display zones or surfaces can be utilized to represent a linear equation. The setup of the surfaces is based on the premise that an equation arises from a situation in which the occurrence of a given object is counted in two different ways. In one or both countings, a specific occurrence of the given counting object may be "masked" (i.e. grouped in such a way as to not be perceptibly apparent to the solver). This becomes symbolically the "variable" of the equation. The counting objects are placed within the masking object such that the net effect is to have both boards actually counting the same number of objects, but requiring the student to perform acts of deduction to ascertain the number of objects in each masking unit.

It is a distinguishing feature of this invention that the physical representation of the equation verifiably counts the same number of objects on each side. The user of the device can actually open the masking unit to reveal its contents. By using this device, the student will acquire a concrete understanding, before any symbolic representation or verbal formalism is employed, of the following concepts: subtraction property of equality, division property of equality, addition property of equality, multiplication property of equality, the principle of additive and multiplicative inverses. Furthermore, the student will have a tangible understanding of the various types of solutions to an equation: positive vs. negative; integral vs. fractional; unique, nonexistent, or infinite.

Four display surfaces or zones are utilized to represent a system of two linear equations. Pairs of boards may be positioned in vertical tandem, with the equations being read horizontally. Two distinct masking objects are present together with the appropriate number of counting objects, and the student will deduce the contents of the masking objects by physically employing the techniques of "substitution" and/or "linear combinations". Should it be desired, the device can be expanded to represent systems of more than two equations.

In general, the present invention comprises (2n) display zones, (n) types of masking objects and at least one type of counting unit object capable of being masked for a system of (n) equations in (n) unknowns. To illustrate, solving a system of 2 equations in 2 unknowns in accordance with the present invention would require 2×2 or 4 display zones, two distinguishable types of masking objects, e.g., red cans and blue cans, and at least one type of counting unit objects, e.g., disks of smaller diameter than the inside diameters of the cans.

It is also useful to have additional types of counting unit objects which provide more complex counting information. Thus, maskable units such as disks might have numerals on one side so that each disk might represent, for example, a multiple or a fraction of the counting unit objects; for the purposes of the present invention, a negative value is treated as a multiple, i.e., −1, of a positive unit. In this way, for an equation containing an unknown equal to 7, the instructor need not mask 7 separate counting units in each masking object but only one of the representative disks bearing the numeral 7.

In the preferred embodiment of this invention, there is a progression from the most concrete visible or tactile representation to the abstract symbolic representation. The types of counting unit objects may be distinguishable by indicia of objects highly familiar to the students (e.g. candy bars or coins) and can be fitted into companion containers of simple geometric shapes (e.g. cylinders or boxes). Positive and negative values can be indicated by color (e.g. by a bright color vs. black or white or by a pair of complementary colors) or texture (e.g. rough vs. smooth). The display surface itself may simply be a board divided into an appropriate number of zones and may be held in a horizontal position requiring the student to view the surface from above. In the preferred embodiment, however, both the display surfaces or boards and counting unit objects and masking objects are adapted to be separably affixed to each other in a manner that the display surface or display board may be held in a vertical position, and viewed by the students from their seats in the classroom. For example, the display surface or board can be made of ordinary ferromagnetic materials and the containers and masked objects (counting units) can have magnetic tape affixed to the base so that they will be attracted magnetically to the board, but can be removed at will. Alternatively, the display surfaces themselves may be made of magnetic tape or similar magnetic material, supported in a generally rigid manner as by a backing board so that simple masked objects and containers may be made out of readily available ferromagnetic materials and attached directly to the board and removed therefrom at will. Other possibilities include the use of VELCRO materials and similar materials in which the objects may be separably attached to the display surface and held there until sufficient force is applied to remove them from the board.

In the drawings, like-parts are identified by the same numbers. Thus, for example, display boards are indicated by the number 10, square counting units by the number 12, "box" masking units by the number 14, round or disk counting units by the number 17, "can" masking units by the number 18, negative masking units by the number 19, fractional counting units by the number 20, fractional masking units by the number 22, zone defining means comprising edges or borders by the number 24, zone-defining means, other than edges or borders by the number 25, and printed cards by the number 26.

Example 1: FIGS. 1A through F illustrate use of the invention for developing the concept of counting with two denominate units, with one unit possibly masking equal numbers of occurrences of the other. This establishes the concept of one denominate unit (a variable) counting another. The two units can differ from one another in dimension, shape, size, cplor or texture, with any of these four parameters capable of being varied to express a negative count. In the discussion which follows, letters are employed to suggest what they physically represent. In this case "b" suggests "box", "c" suggests "can", "d" suggests "dot", and "s" suggests square. If one unit is considered to be masking the occurrence of the other, then the masking unit will be a generic "x" and the other unit can remain unspecified.

Figure 1B:
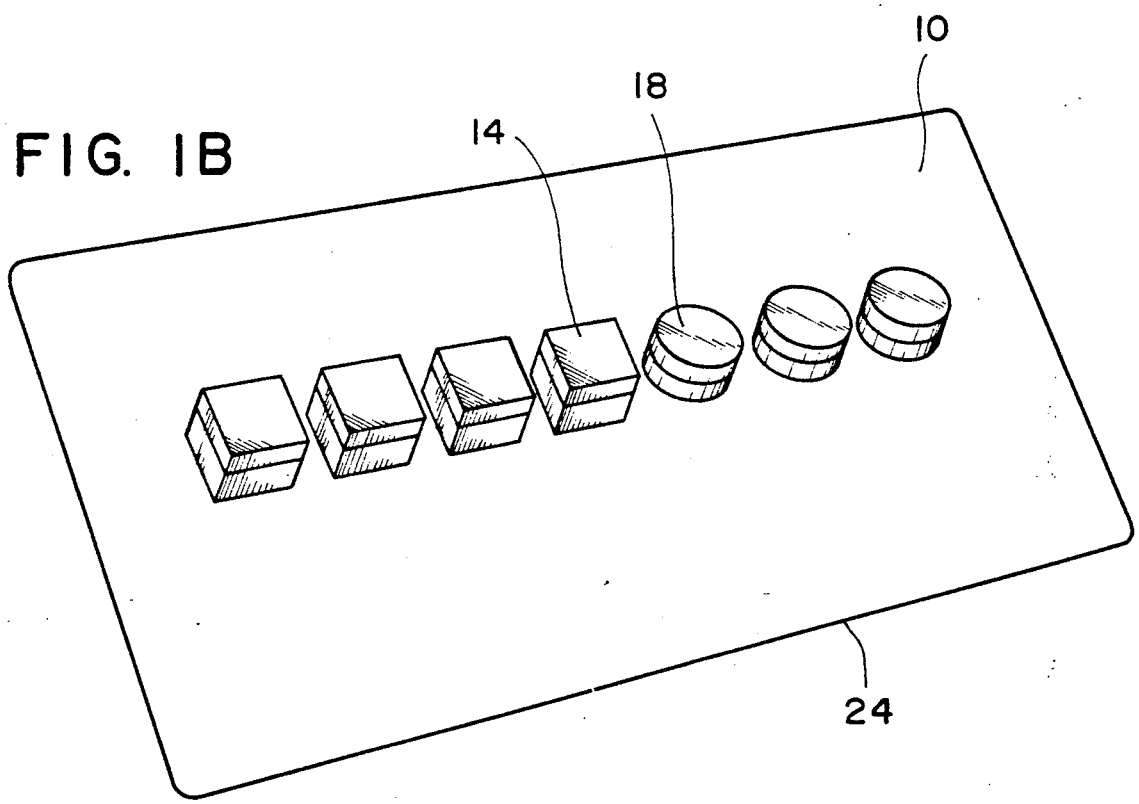
Figure 1C:
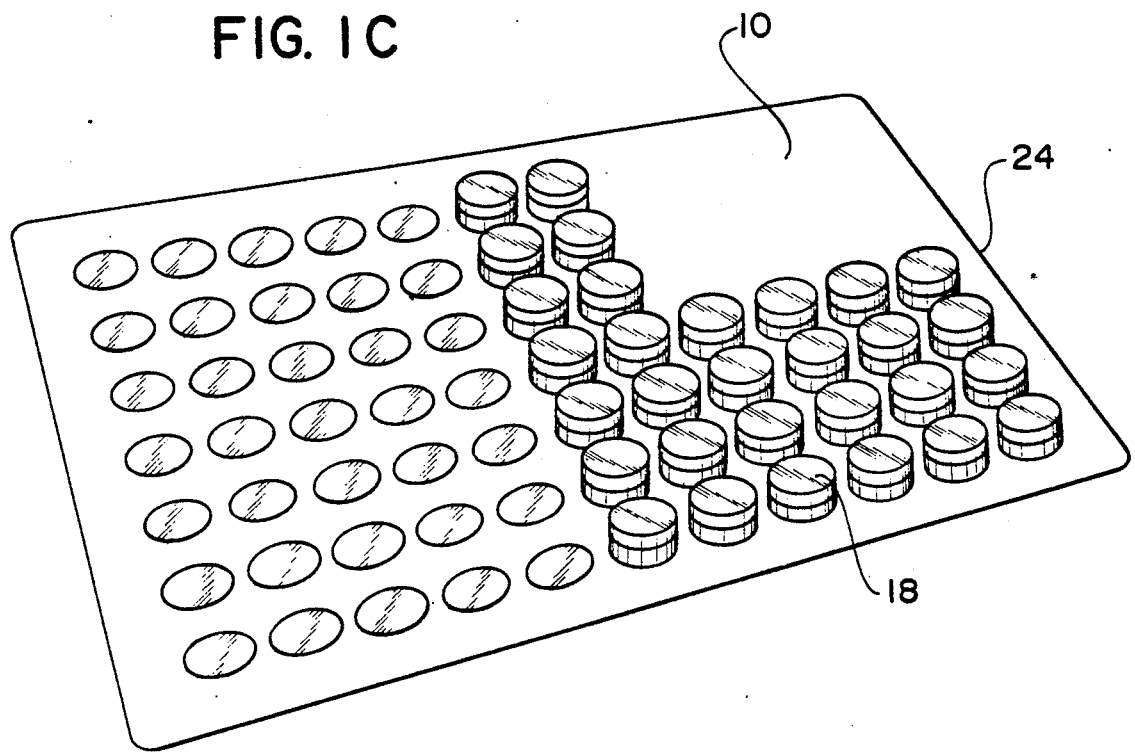

FIG. 1A uses two dimensional squares and three dimensional boxes to depict the expression $3b+4s$, or, if the b units are to be interpreted as counting a specific number of the s units, $3x+4$. The student will write an expression or create a formulation which symbolizes the counting. The cooperating card will suggest, on its reverse side, a variety of possible substitutions for expression evaluation, together with the correct solution (e.g. if a box contains three squares, then a substitution of $(b=3s)$ could be made, yielding a count of $3(3s)$ 4s or 14s). At the lower grade levels the student could actually open the box to reveal the contents that it masks. FIG. 1B uses three dimensional boxes and cans to depict the expression $4b+3c$. The cooperating card would contain information for substituting as if each element were counting a third denominate unit. FIG. 1C uses two dimensional dots and three dimensional cans to illustrate counting by partitioning. The array depicted can be counted as $4(5d+6c)+3(5d+2c)$. The student would then be required to simplify the expression to 35d 30c, with substitutions and solutions given by the cooperating card. Students would also be encouraged to partition in various ways. The array of FIG. 1C can also be partitioned as $7(5d+2c)+4(4c)$.

Figure 1D:
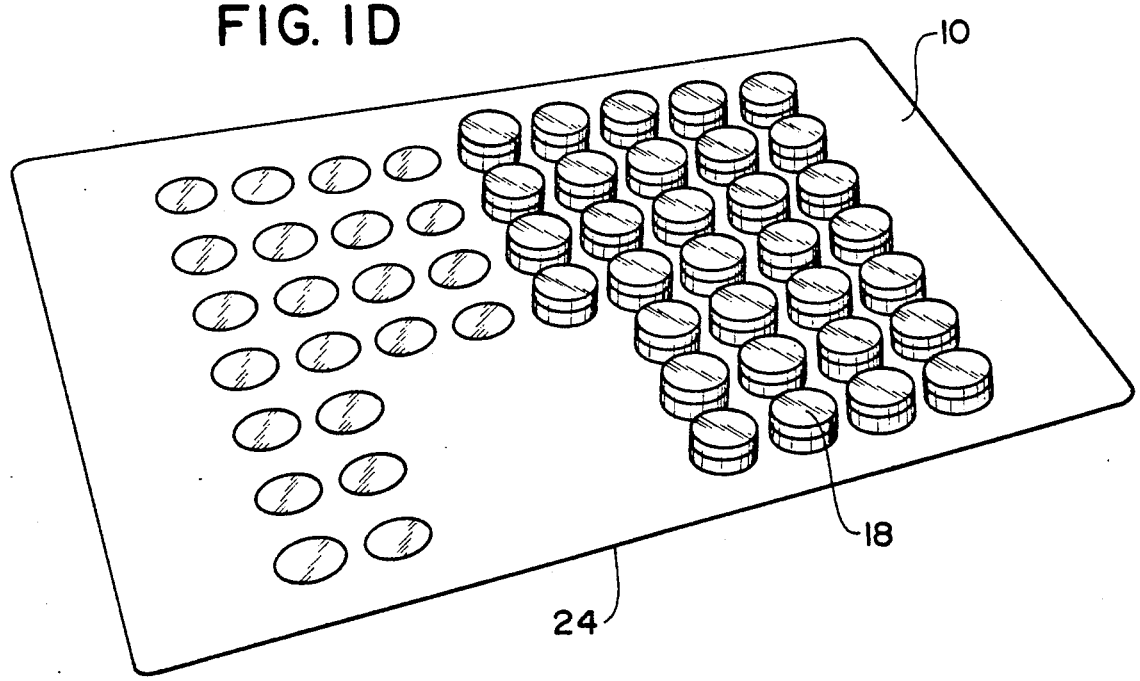
Figure 2A:
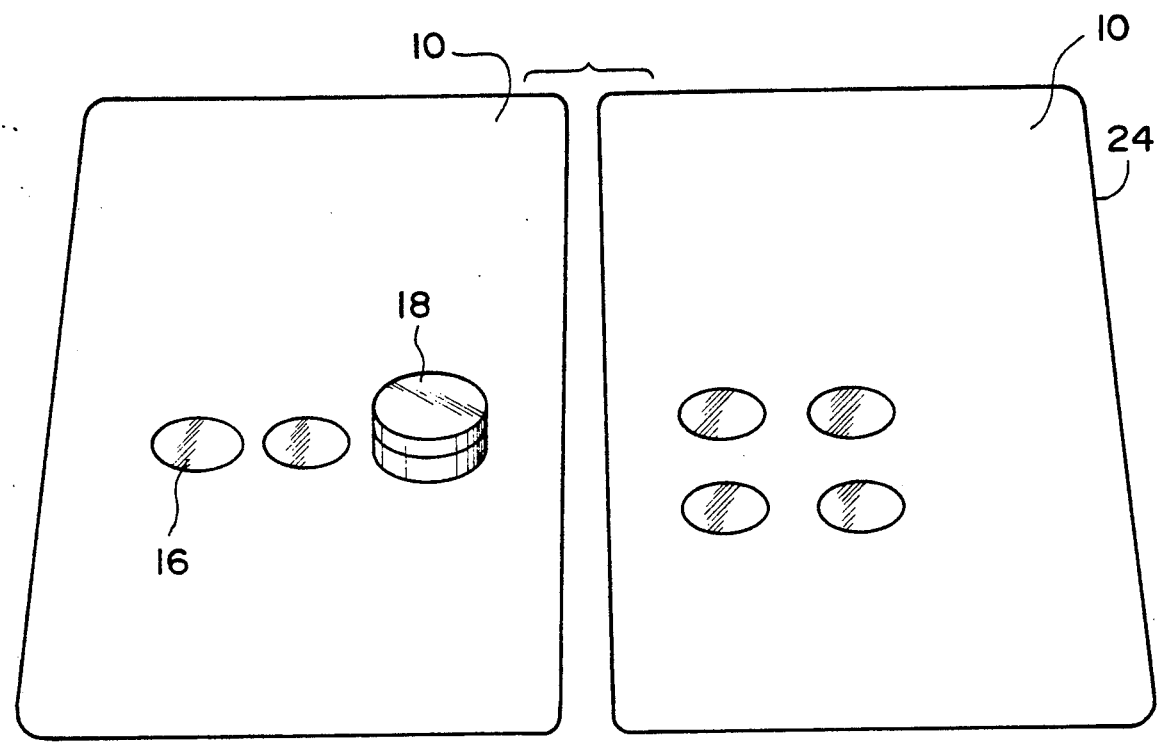
FIGS. 2A through C illustrate a two-board system used for the solution of a linear equation by subtracting equal numbers of masked objects or counters.
Figure 2B:
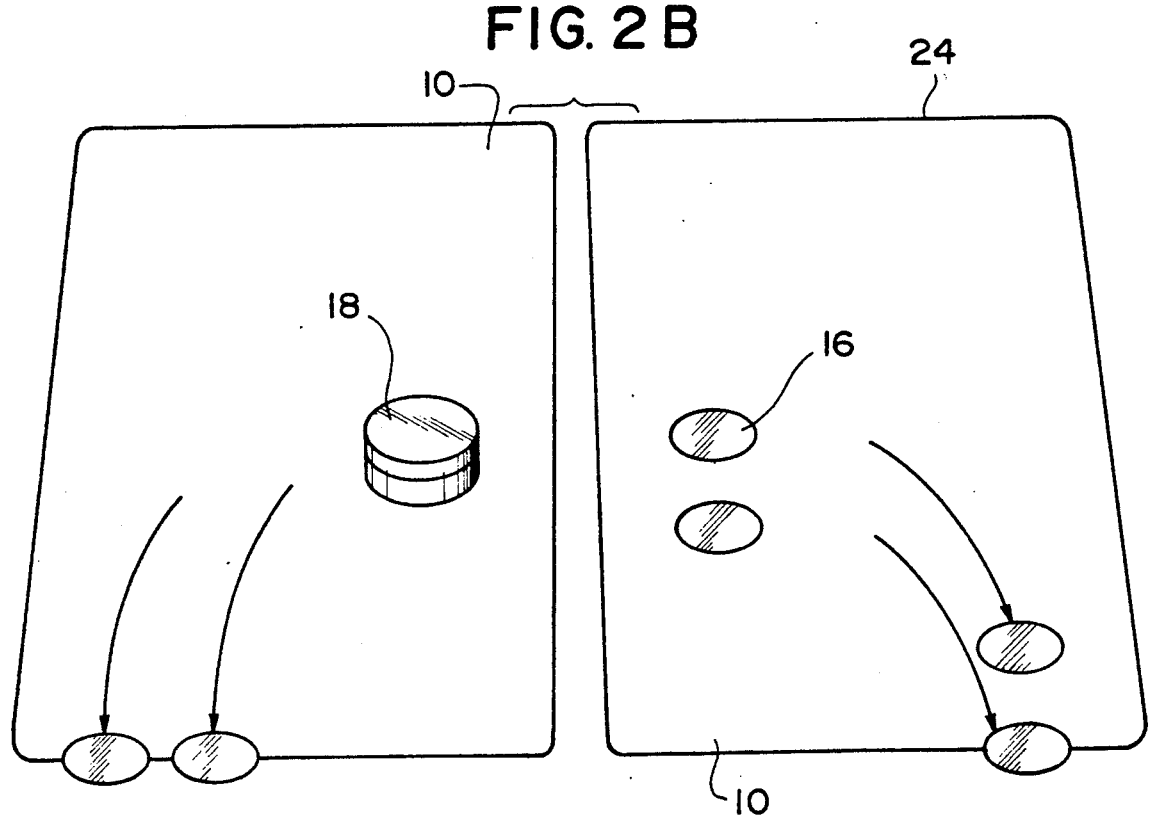
Figure 2C:
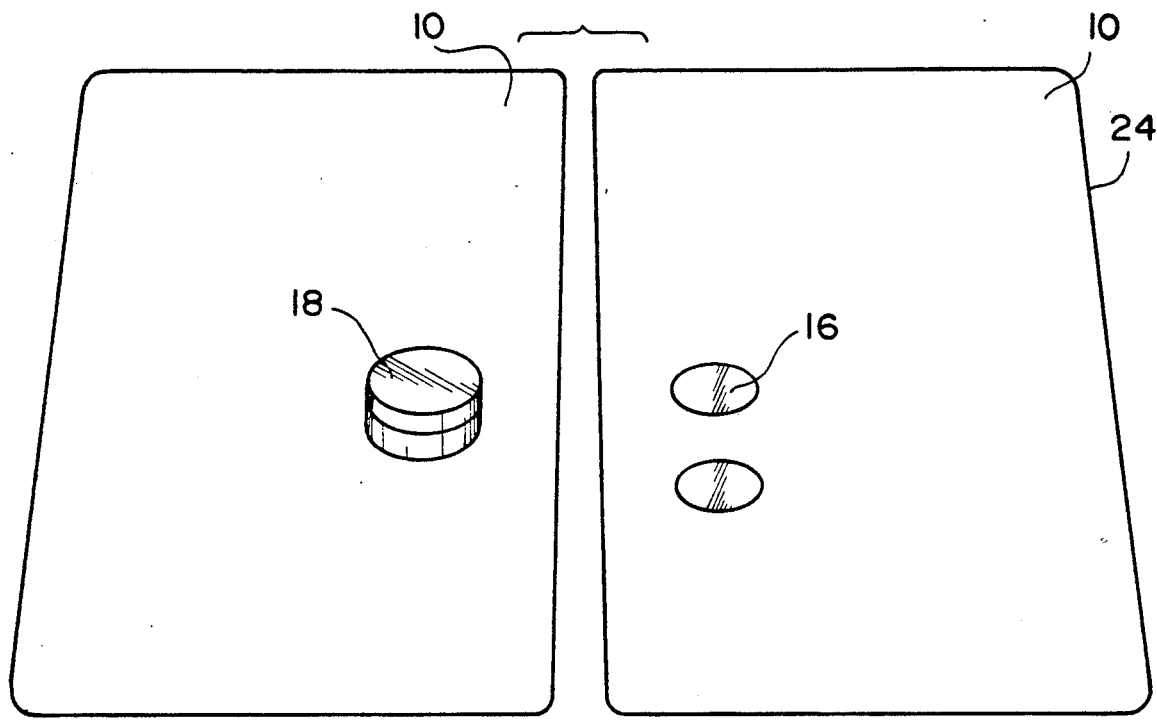

FIG. 1D uses the same denominate units to illustrate counting by partitioning with a negative array. The expression depicted can be interpreted as $7(4d+5c)-3(2d+c)$. FIG. 1E illustrates counting with negatives. Textured counting units represent positive values and non-textured counting units represent negative values. The array depicted can be interpreted as $2(5d+5c)+4(4d+(-d)+2(-c)+3c)$, or, by an alternative counting scheme, $6(5d+5c)-4(d+2c)+4((-d)+(-2c))$ Example 2: FIGS. 2A through C illustrate the application of the invention to solving a linear equation using the subtraction property of equality. FIG. 2A depicts the equation $2d+c$ $4d$, using two dimensional dots and a three dimensional can. The student is instructed that the can contains a specific number of dots. If the dot is to be interpreted as a counter of an unspecified unit, then the equation becomes $2+x=4$. The student solves it by removing two dots from each side (the subtraction property of equality) in FIG. 2B yielding the solution $c=2d$ or $x=2$ in FIG. 2C. If the boards are correctly set up, the student can actually open the can to reveal its contents of two dots. At higher levels of abstraction, the relationship can be based on any physical concept and the student would have to test the equivalence. The elements can have indicia for purposes of establishing value.

Figure 3A:
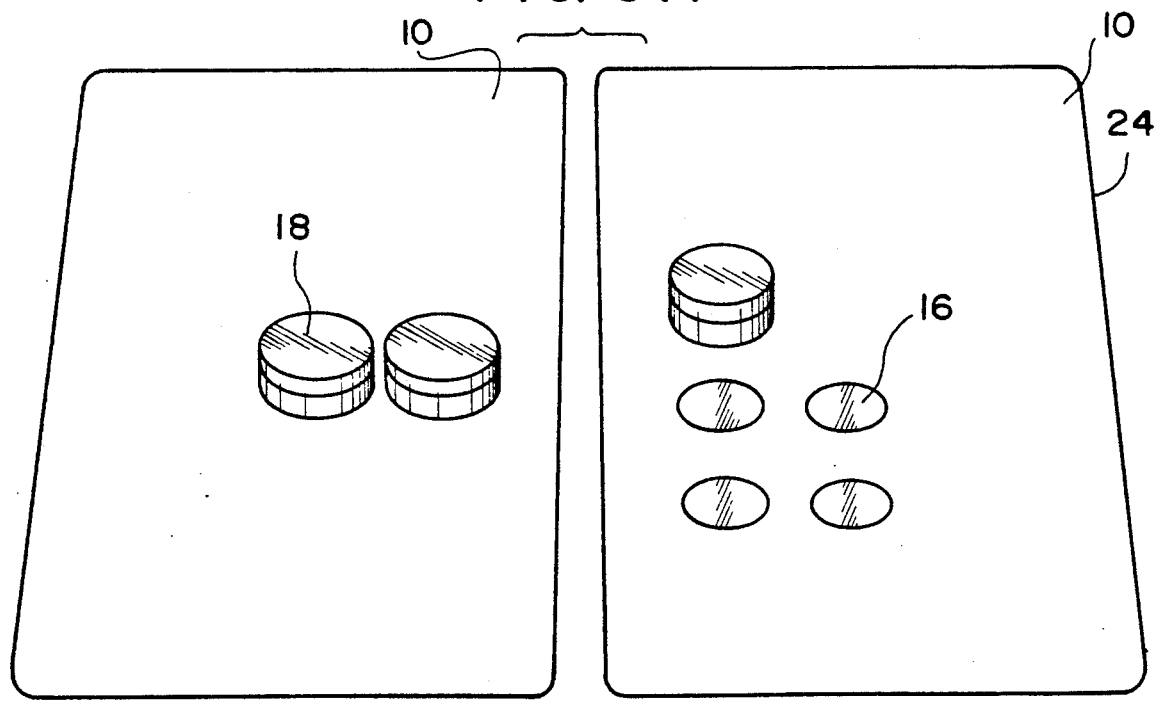
FIGS. 3A through C illustrate a two-board system used for the solution of a linear equation by subtracting equal numbers of the masking objects or variables.
Figure 3B:
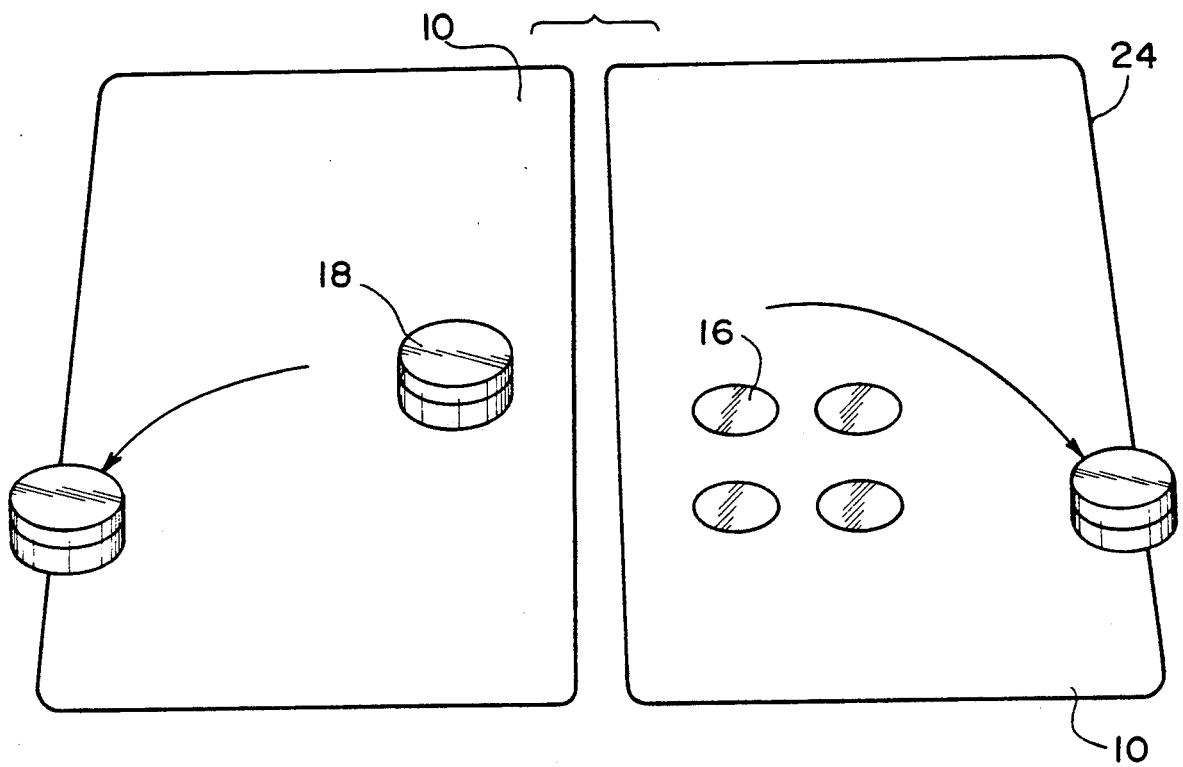
Figure 3C:
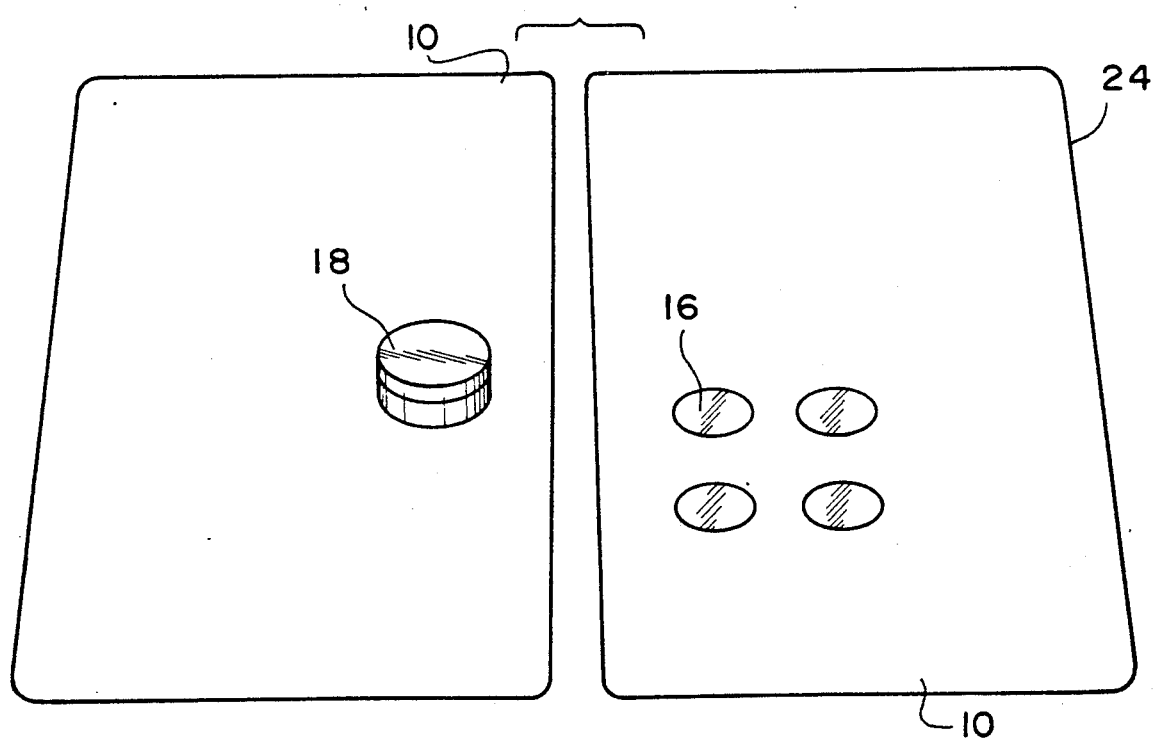

Example 3: FIGS. 3A through C also illustrate the use of the invention to solve a linear equation using the subtraction property of equality, but with the item being subtracted being the masking object, or variable. FIG.

3A depicts the equation $2c=c+4d$ or $2x=x+4$. FIG. 3B illustrates the removal of a can from each side, yielding the solution of $c=4d$ or $x=4$ in FIG. 3C.

Figure 4A:
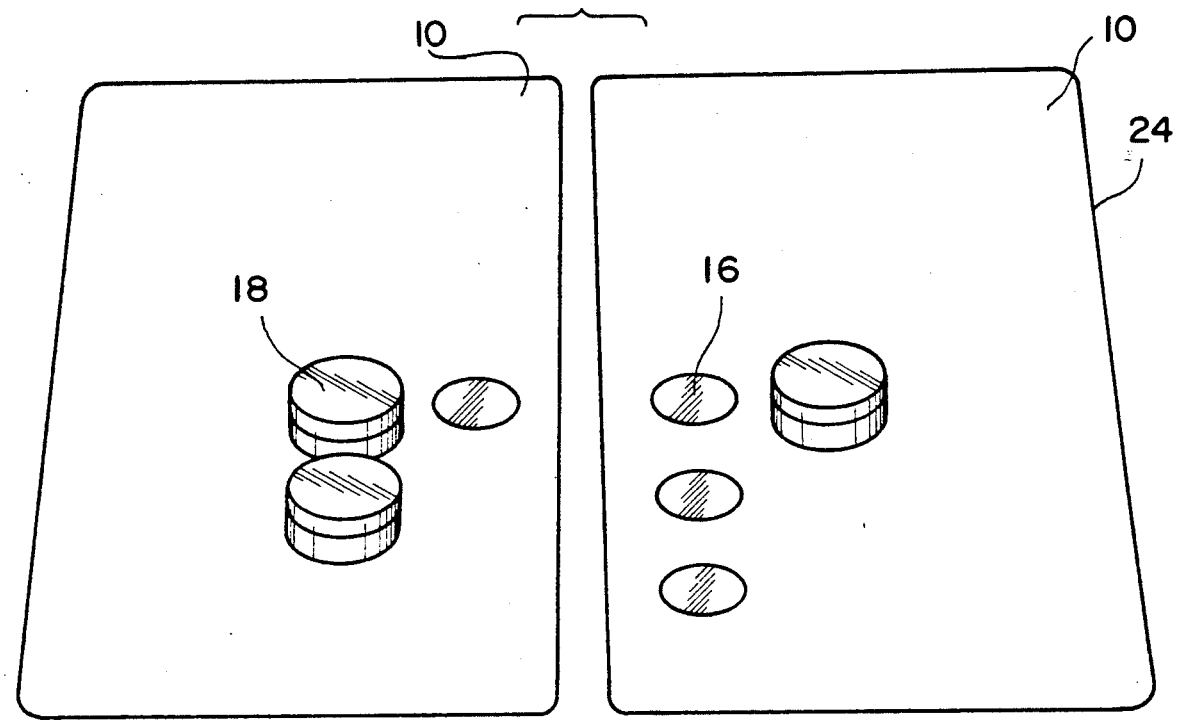
FIGS. 4A through E illustrate a two-board system used for the solution of a linear equation by subtracting equal numbers of both types of denominate units.
Figure 4B:
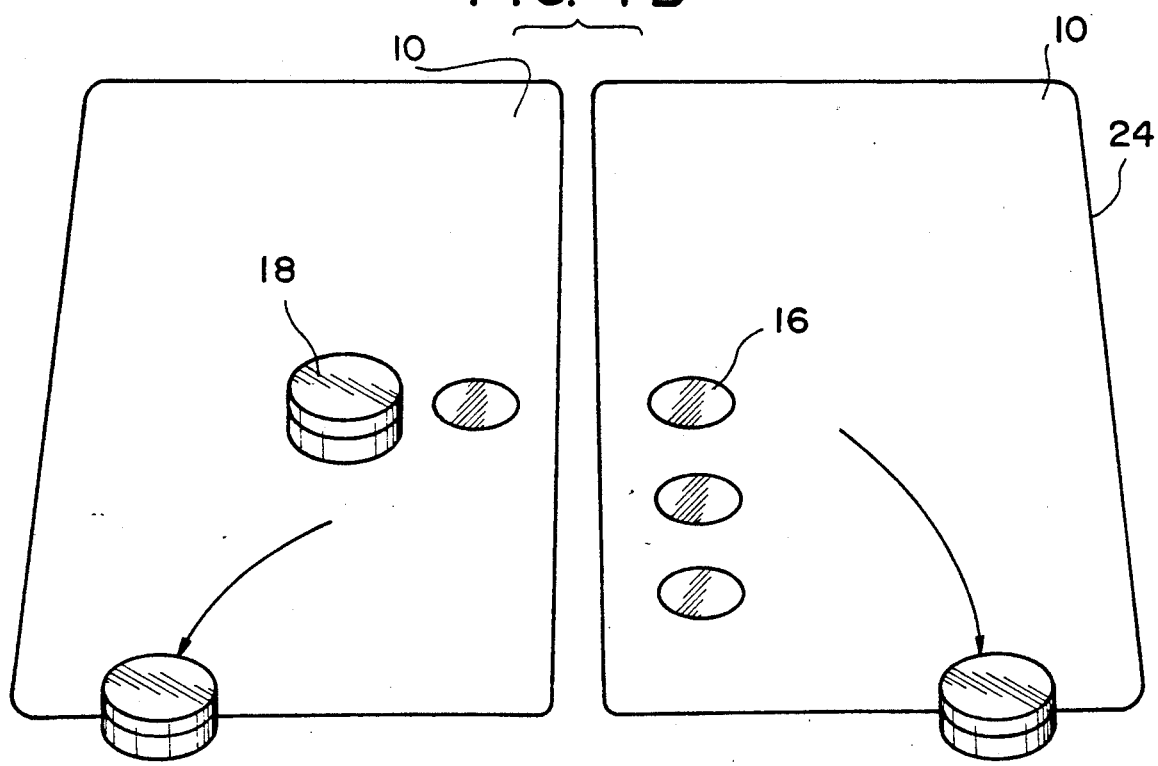
Figure 4C:
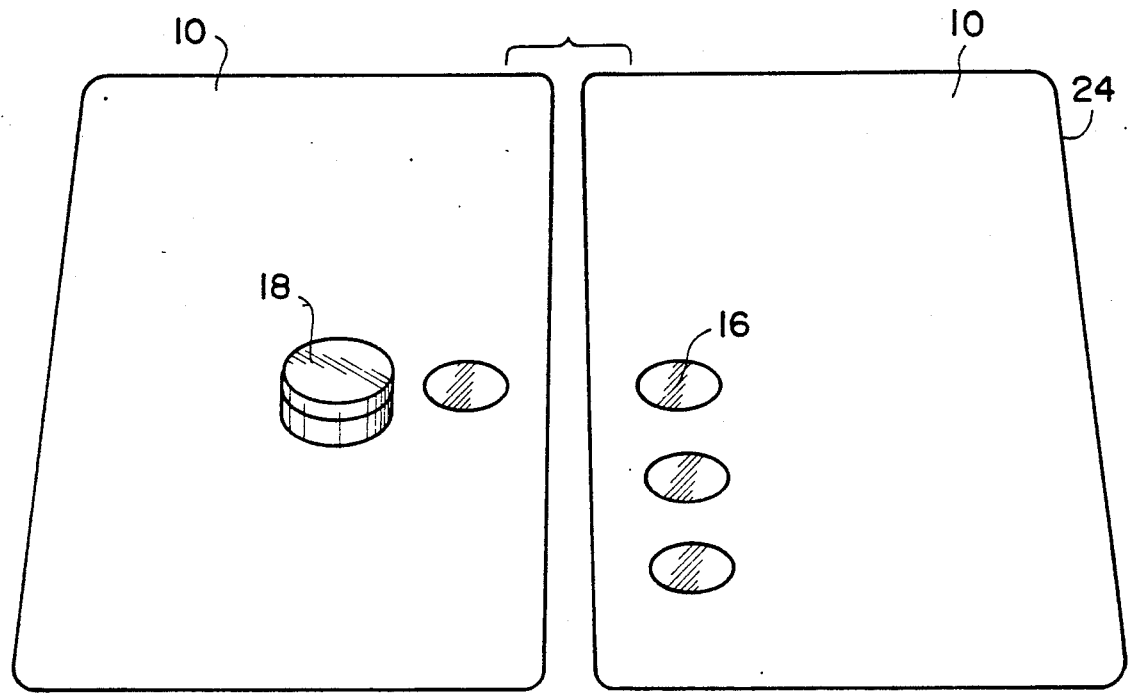
Figure 4D:
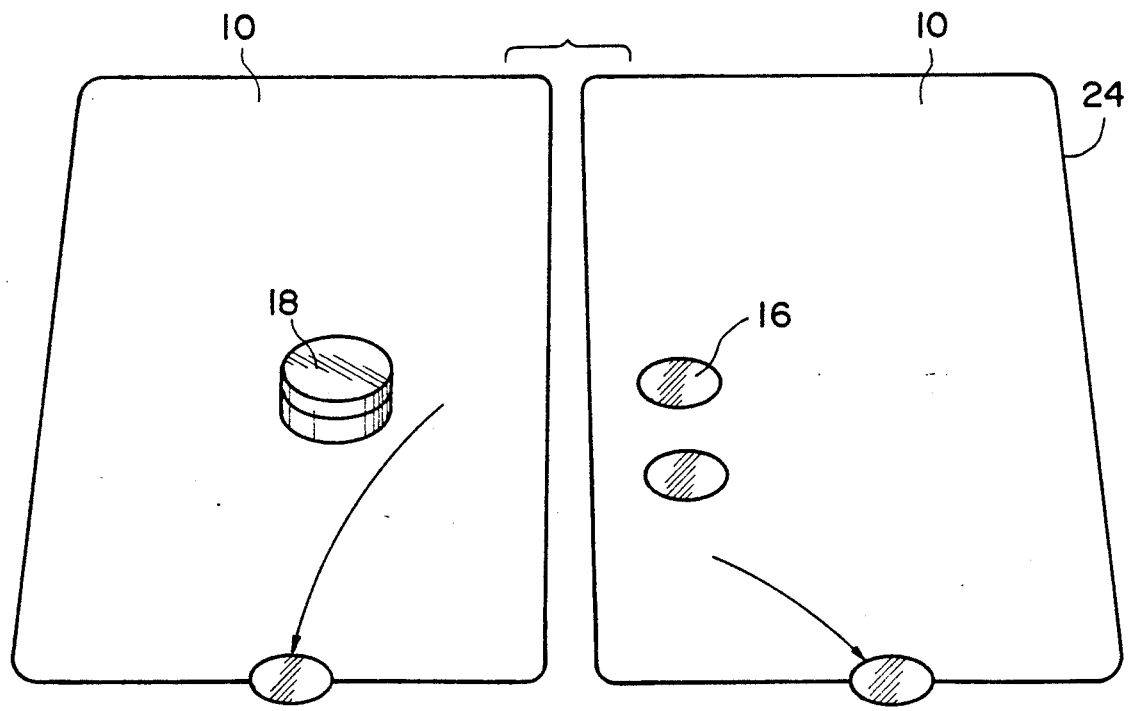
Figure 4E:
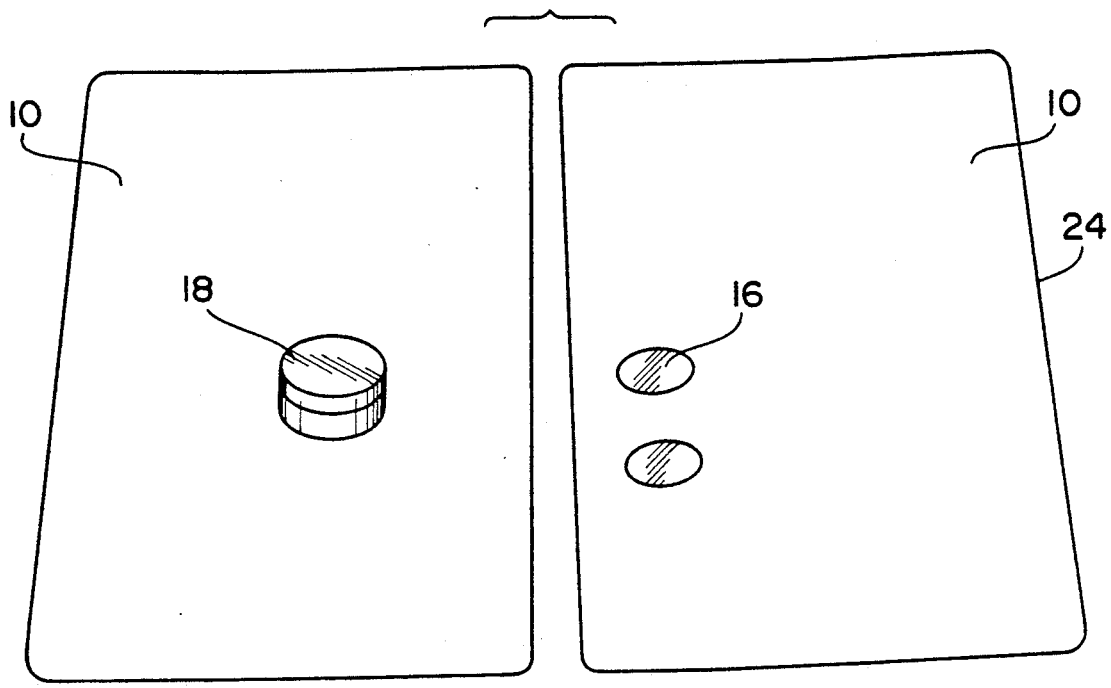
Figure 5A:
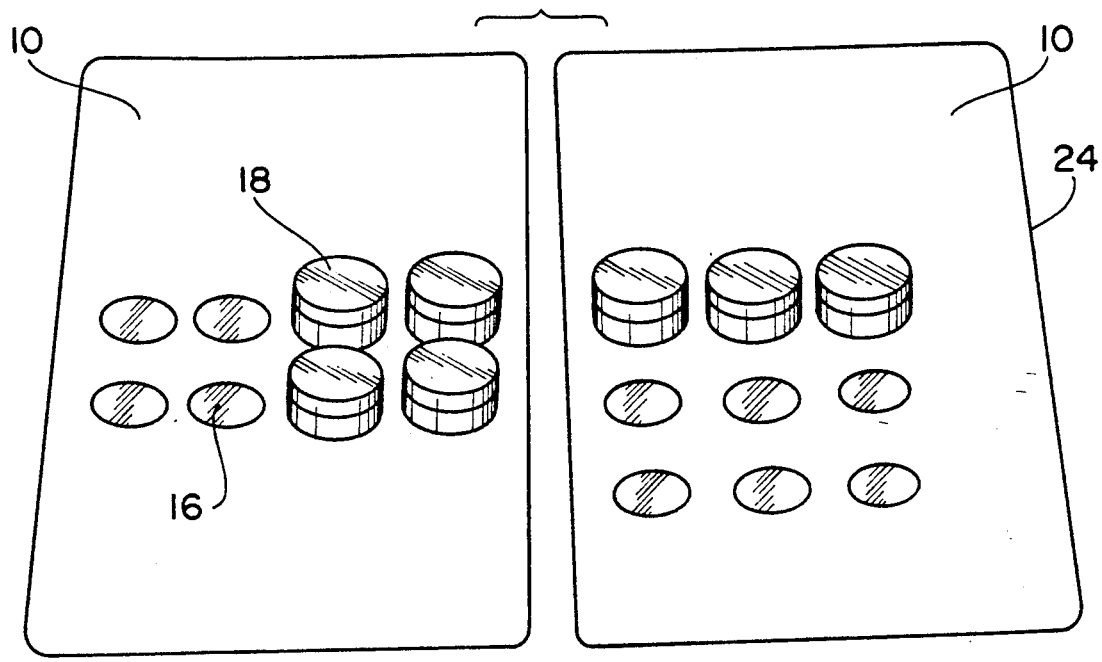
FIGS. 5A through E illustrate a two-board system used for the solution of a linear equation by subtracting equal groups of denominate units.
Figure 5B:
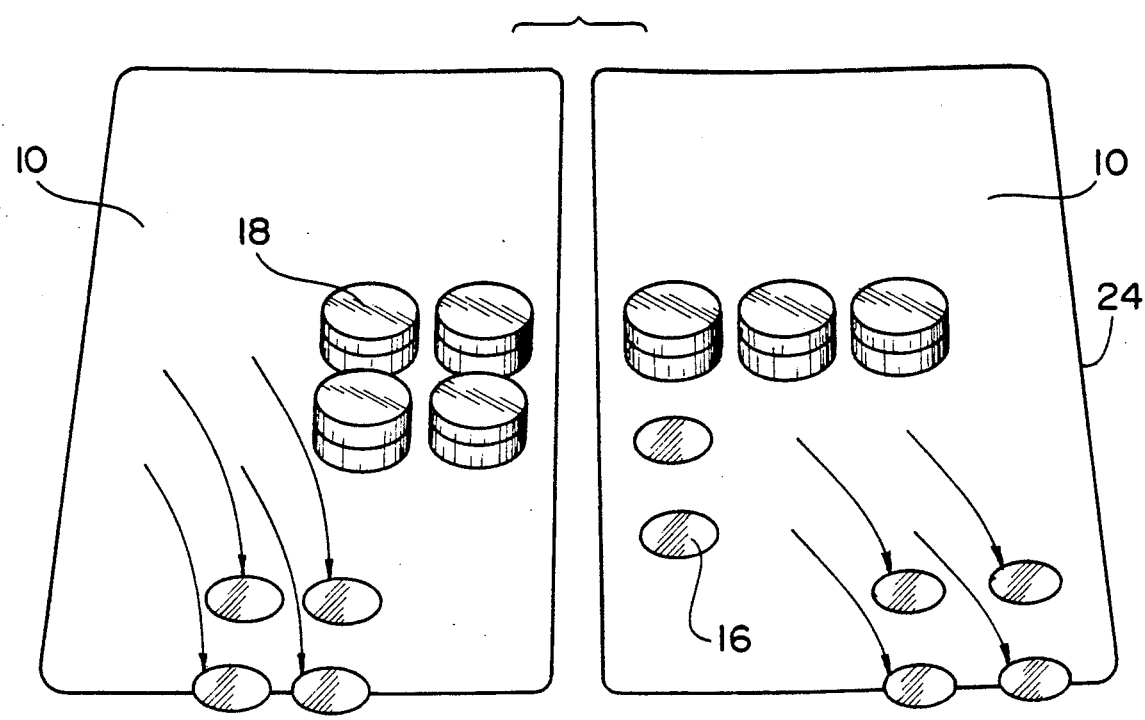
Figure 5C:
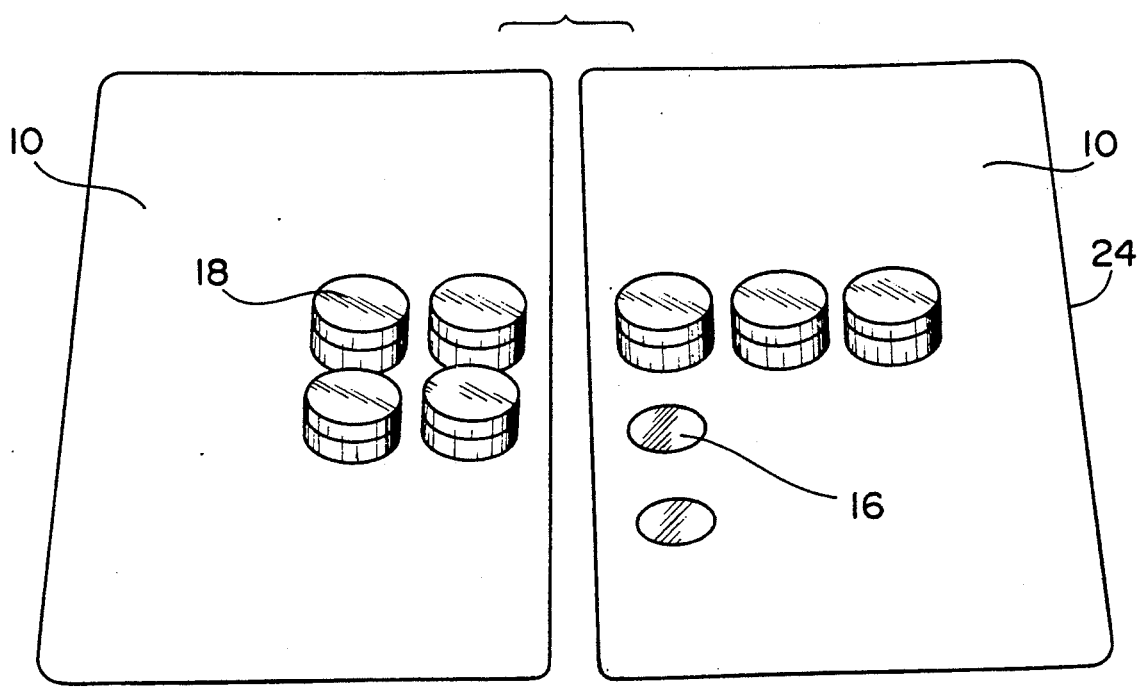
Figure 5D:
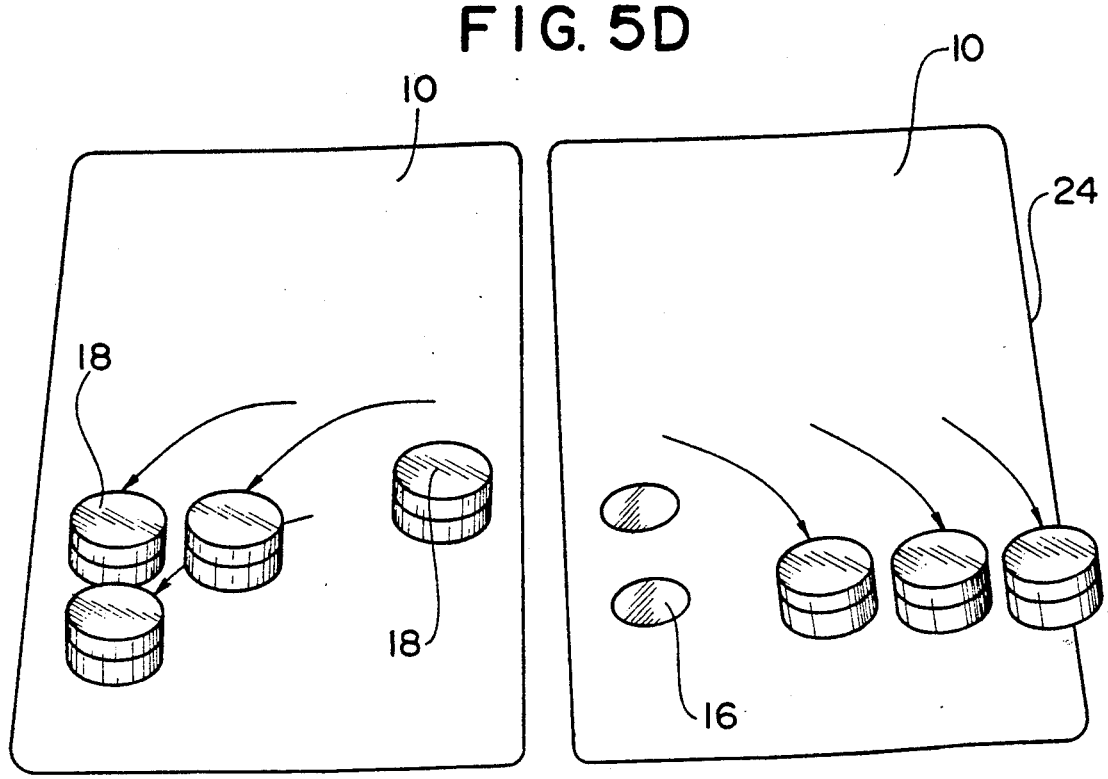
Figure 5E:
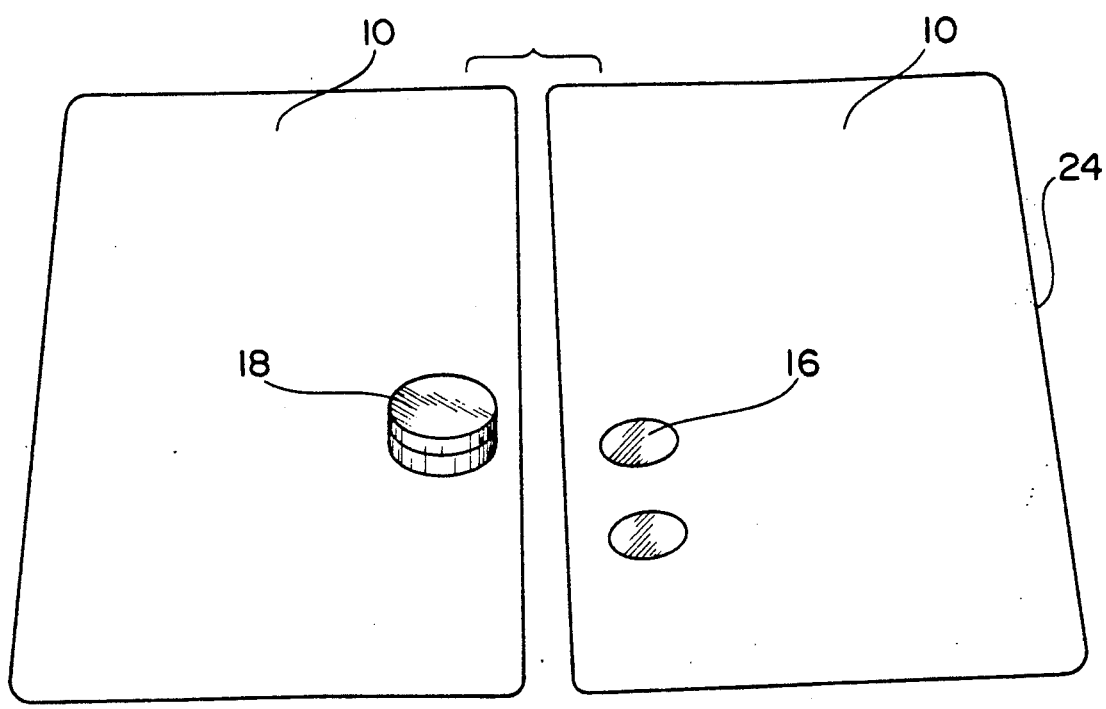

Example 4: FIGS. 4A through E also illustrate solving a linear equation by using the subtraction property of equality, but with both the masked and masking objects (counter and variable) being subtracted. FIG. 4A depicts the equation $2c+d=3d+c$, or $2x+1=3+x$. The removing of objects is performed in separate stages for each type. In FIG. 4B, a can is removed from each side, yielding the equivalent equality $c+d$ $3d$ or $x+1=3$ in FIG. 4C. In FIG. 4D, a dot is removed from each side, yielding the solution $c=2d$ or $x=2$ in FIG. 4E. Example 5: FIGS. 5A through E illustrate the application of the invention to solving a linear equation by using the subtraction property of equality with both the masked and masking objects being subtracted in groups. FIG. 5A depicts the equation $4d+4c=3c+6d$, or $4+4x=3x+6$. In FIG. 5B, a group of 4 dots is removed from each side, yielding the equivalent equality of $4c=3c+2d$, or $4x=3x+2$, in FIG. 5C. In FIG. 5D, a group of 3 cans is removed from each side, yielding the solution of $c=2d$, or $x=2$ in FIG. 5E.

Figure 6A:
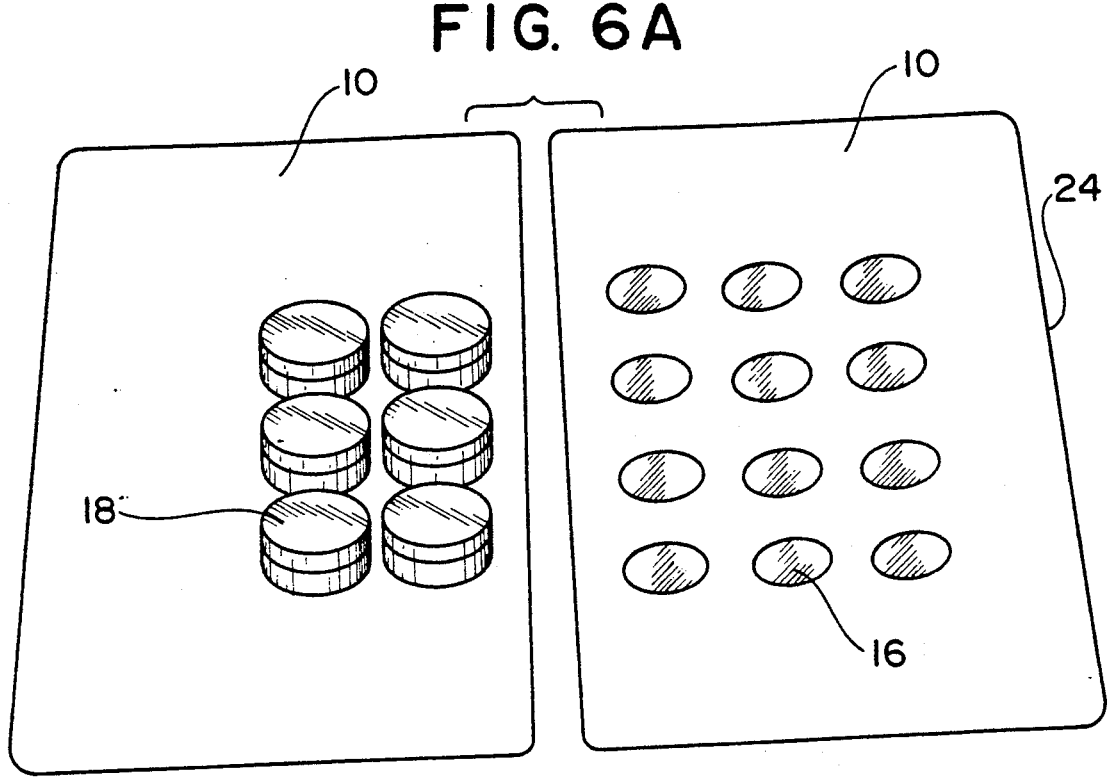
FIGS. 6A through I illustrate a two-board system used for the solution of a linear equation by removing repetitions of a single denominate unit (division).
Figure 6B:
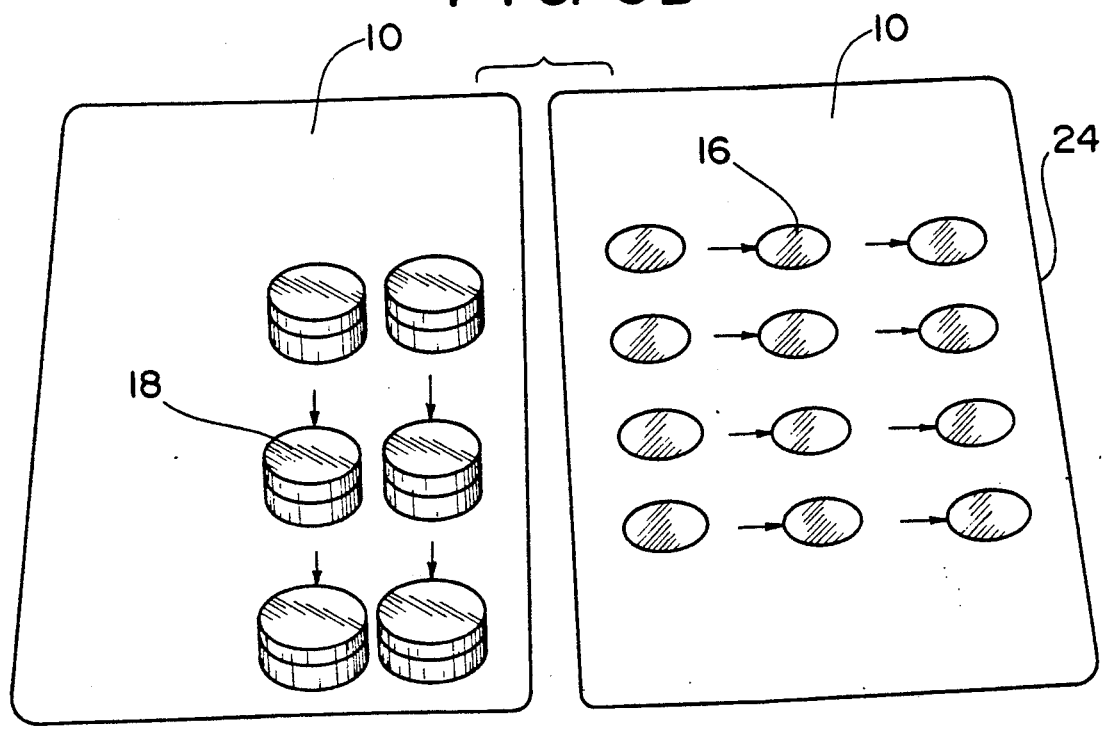
Figure 6C:
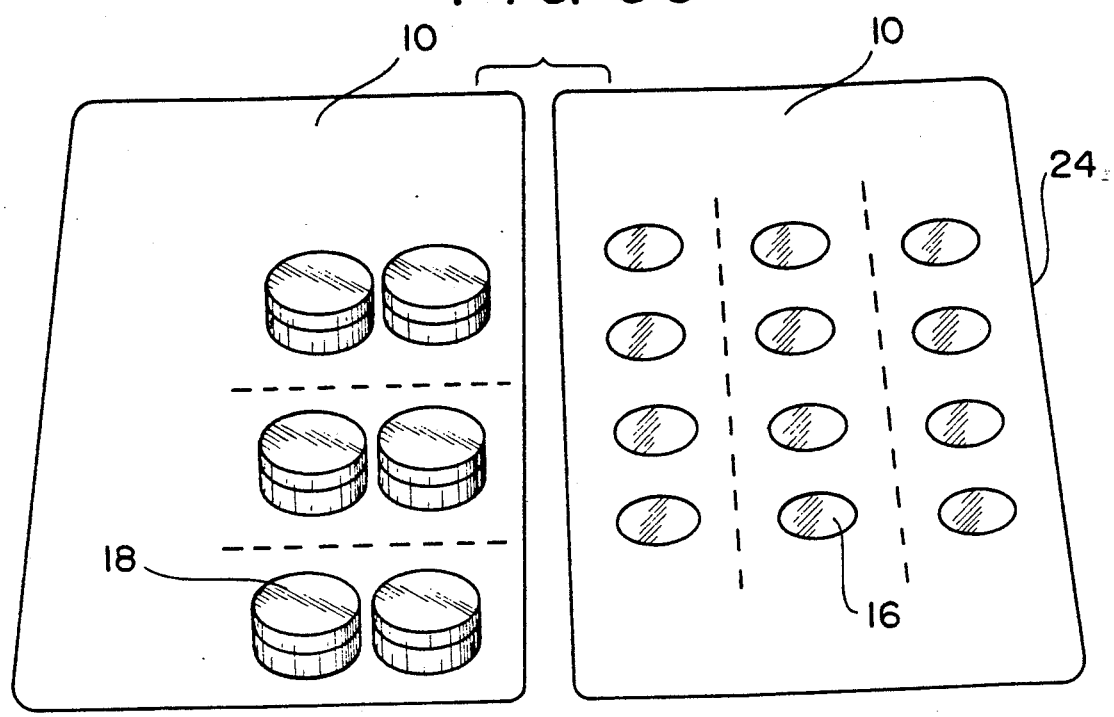
Figure 6D:
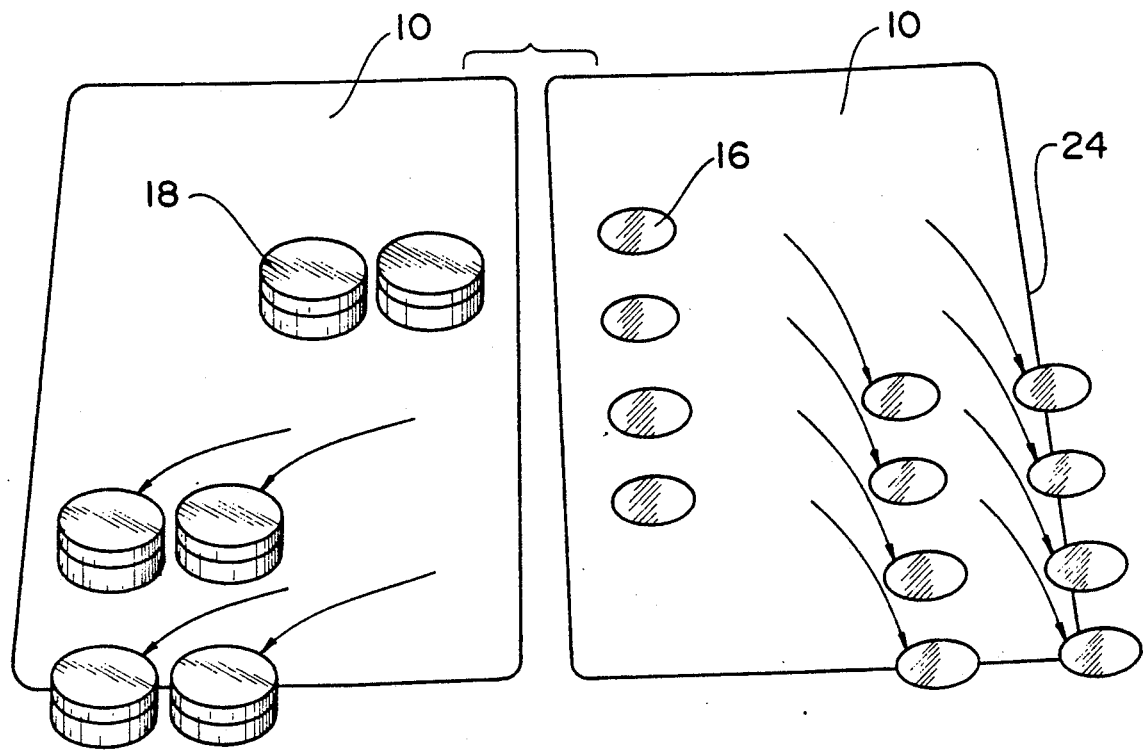
Figure 6E:
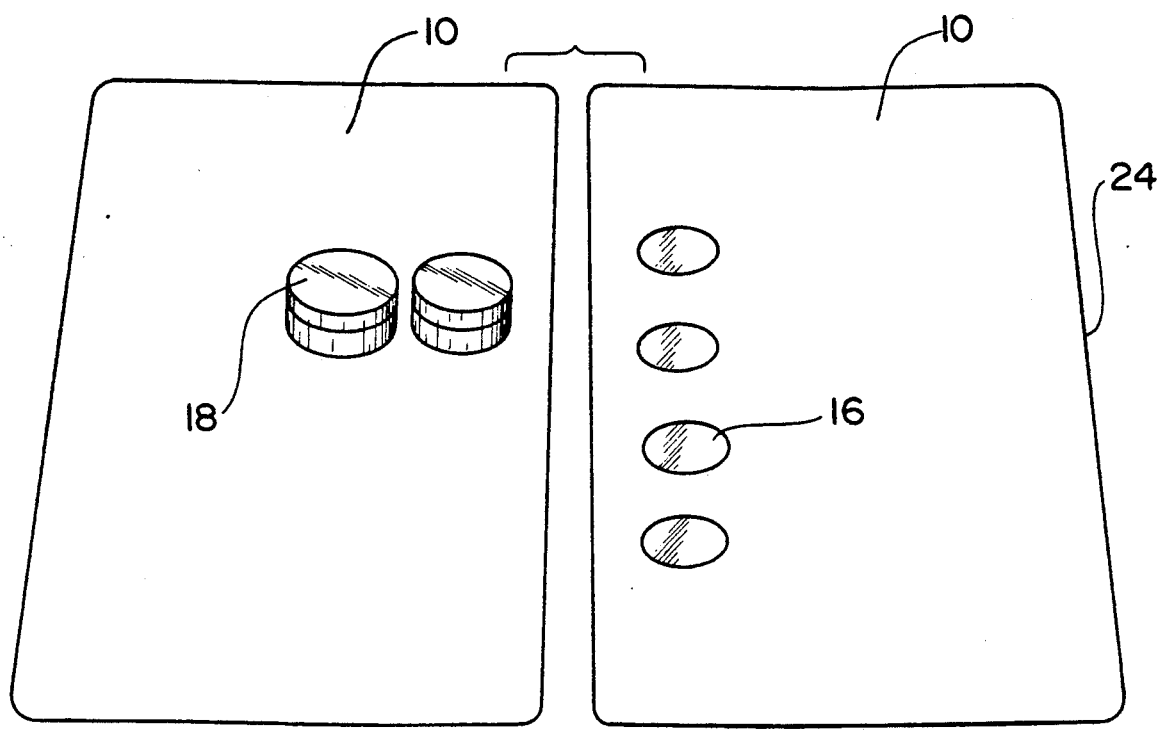
Figure 6F:
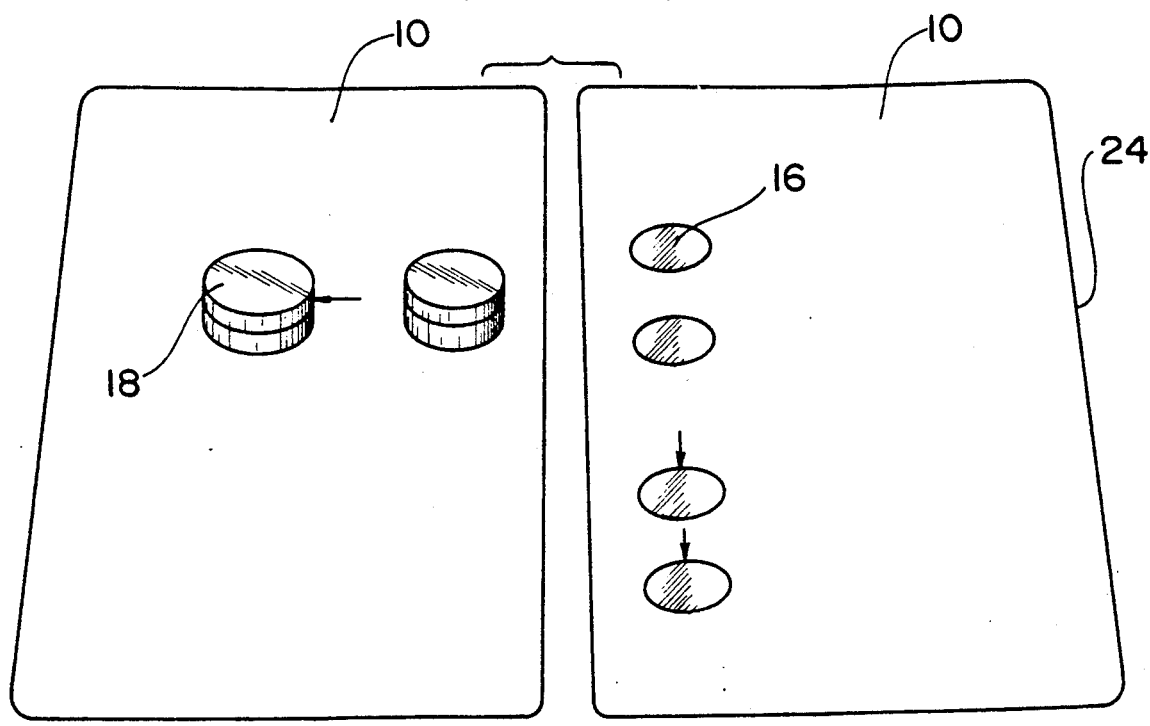
Figure 6G:
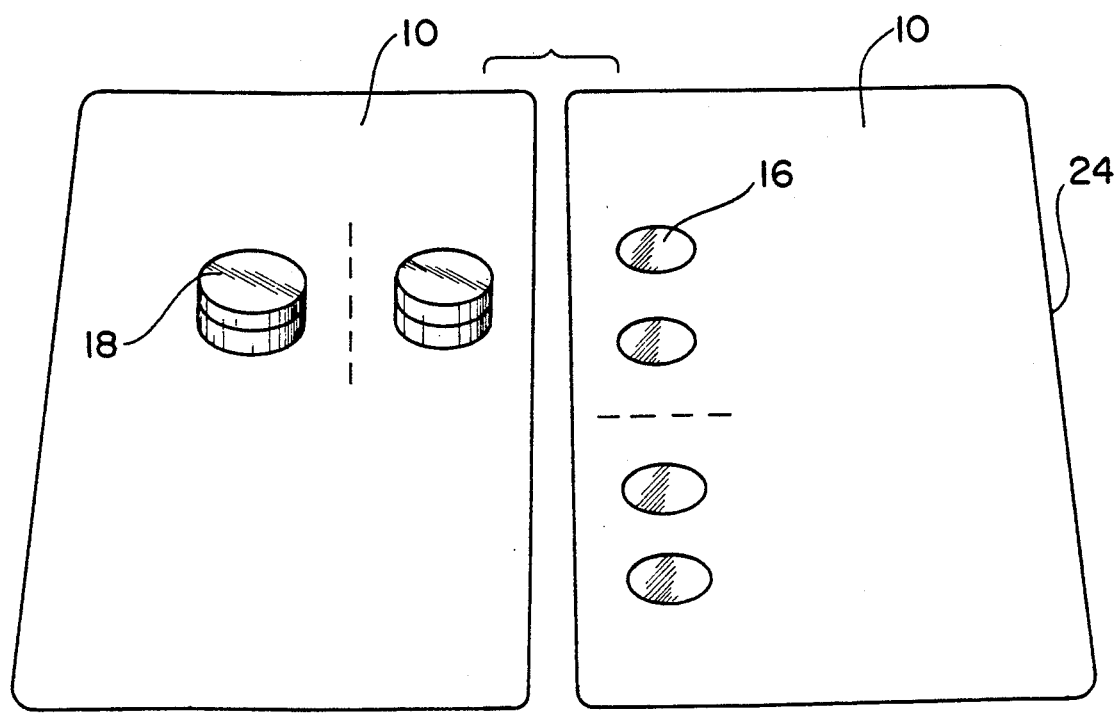
Figure 6H:
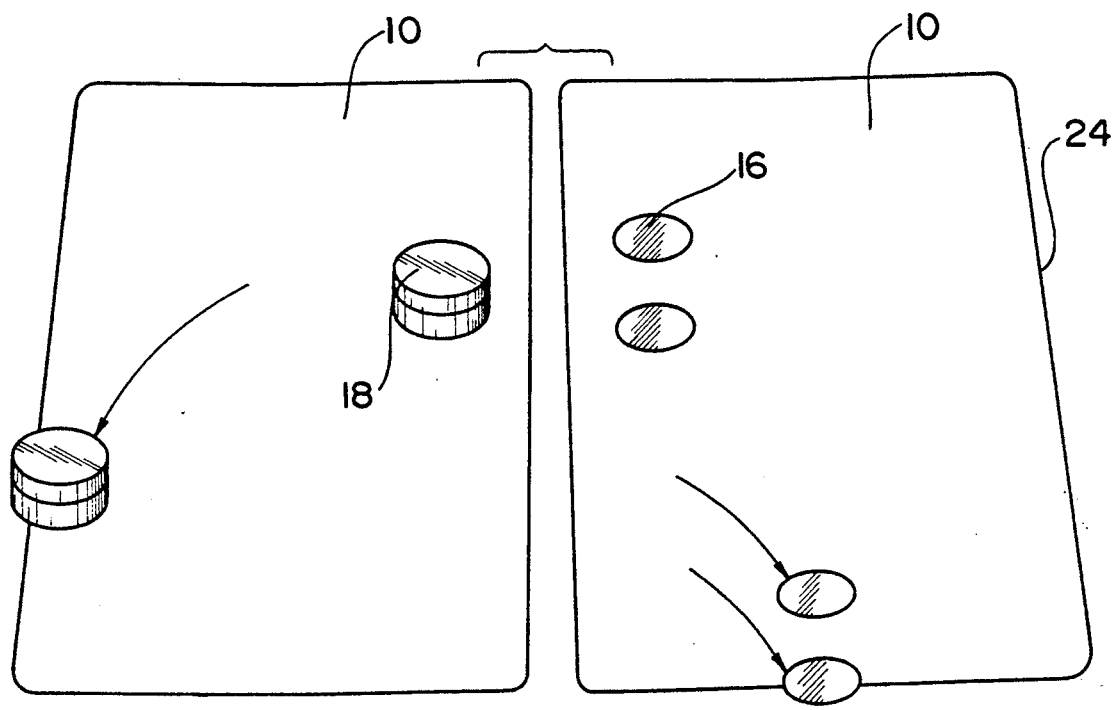
Figure 6I:
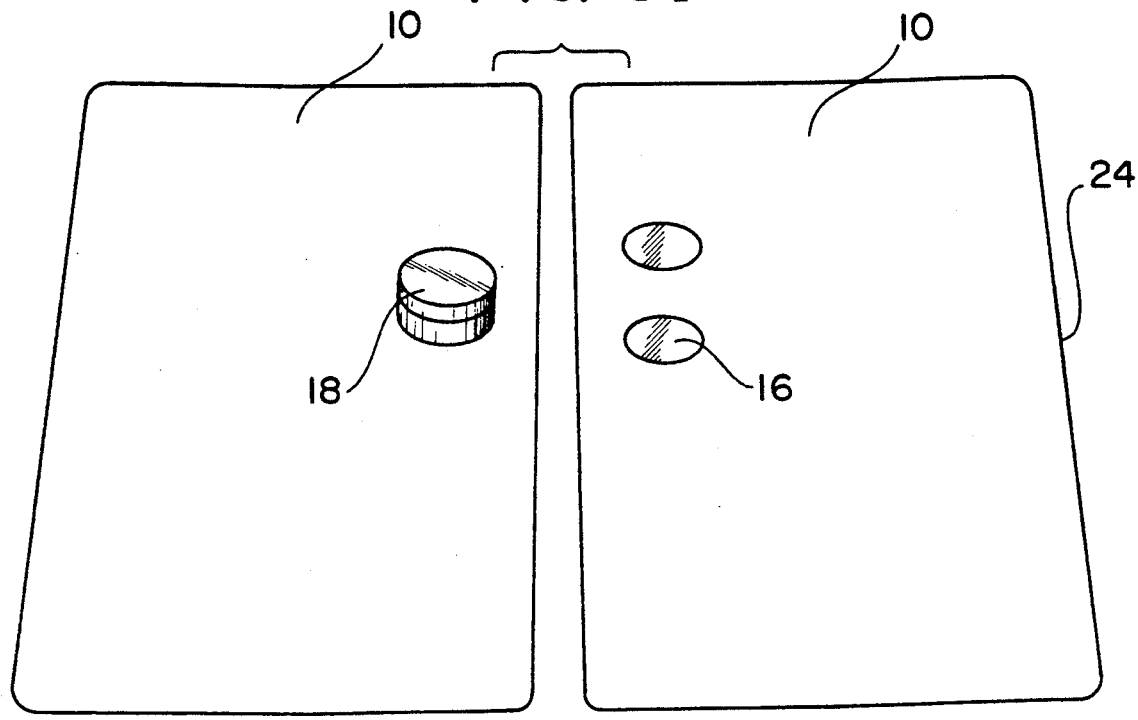

Example 6: FIGS. 6A through I illustrate the solving of a linear equation by using the division property of equality, in which repetitions of a single object are removed equally from each board. FIG. 6A depicts the equation $6c=12d$, or $6x=12$. In FIG. 6B, the objects on each board are arranged in groups of three, yielding the partitioning of FIG. 6C. In FIG. 6D, the repetitions are removed equally from each side, yielding the equivalent equality $2c=4d$, or $2x=4$, in FIG. 6E. In FIG. 6F, the objects on each board are arranged in groups of two, yielding the partitioning of FIG. 6G. In FIG. 6H, the repetitions are removed equally from each board, yielding the solution of $c=2d$, or $x=2$, in FIG. 6I.

Figure 7A:
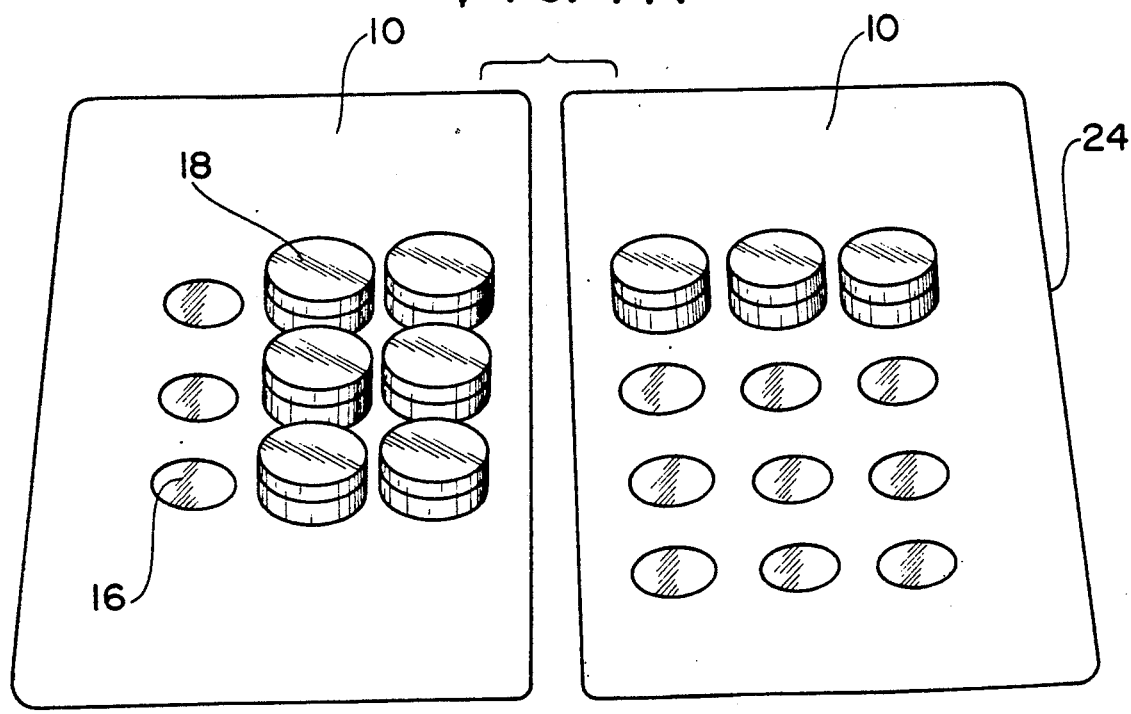
FIGS. 7A through G illustrate a two-board system used for the solution of a linear equation by removing repetitions containing both denominate units.
Figure 7B:
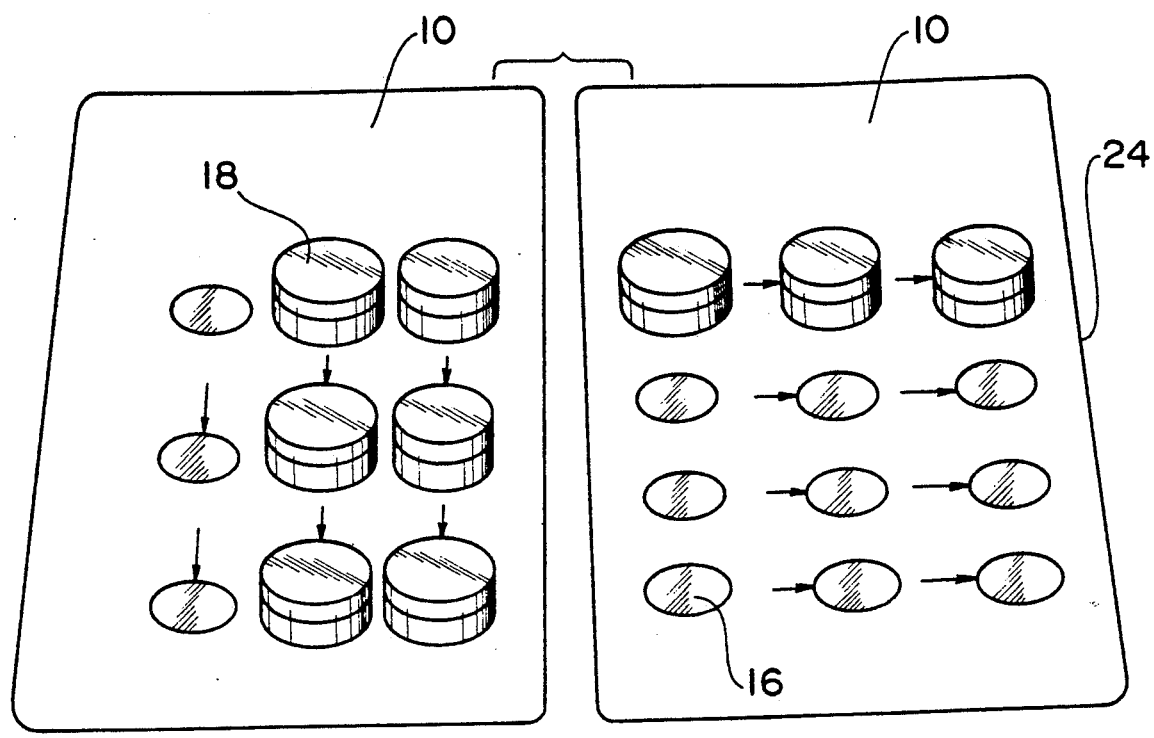
Figure 7C:
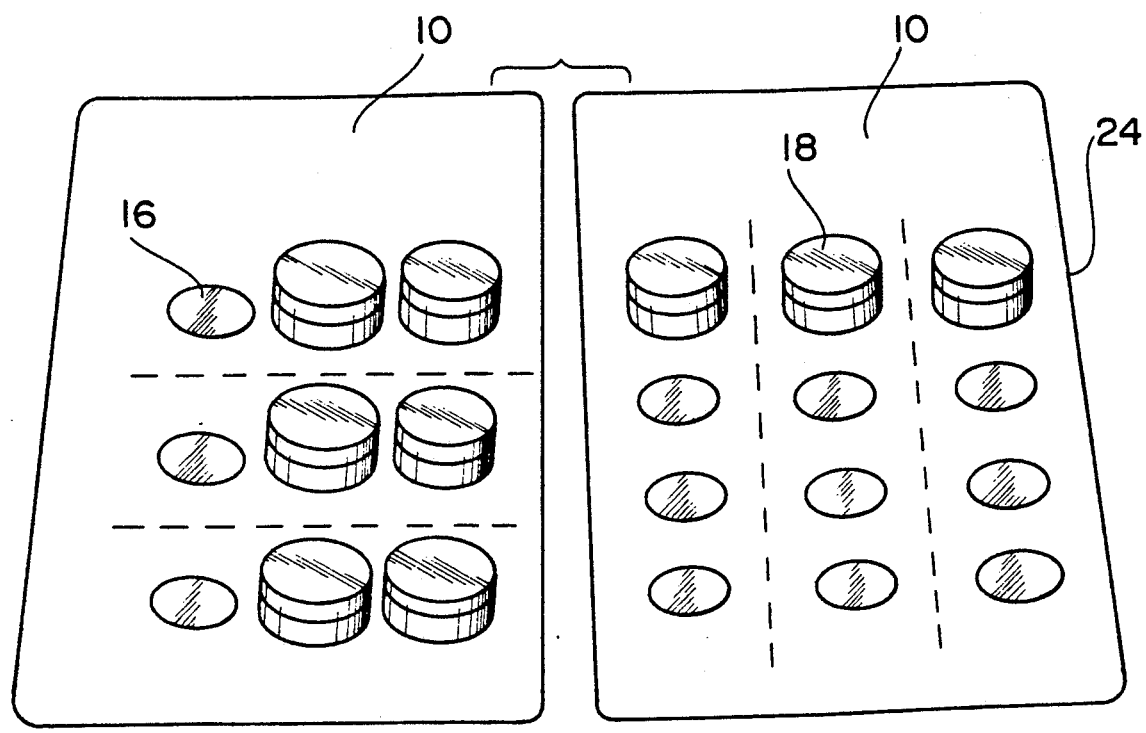
Figure 7D:
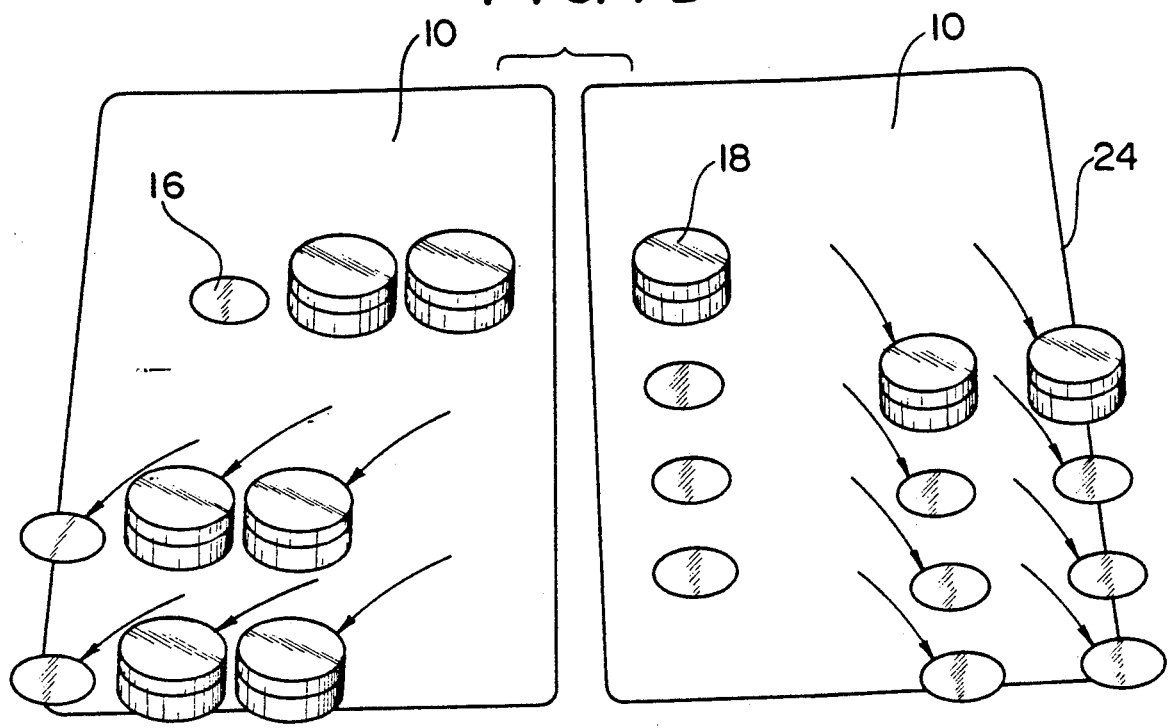
Figure 7E:
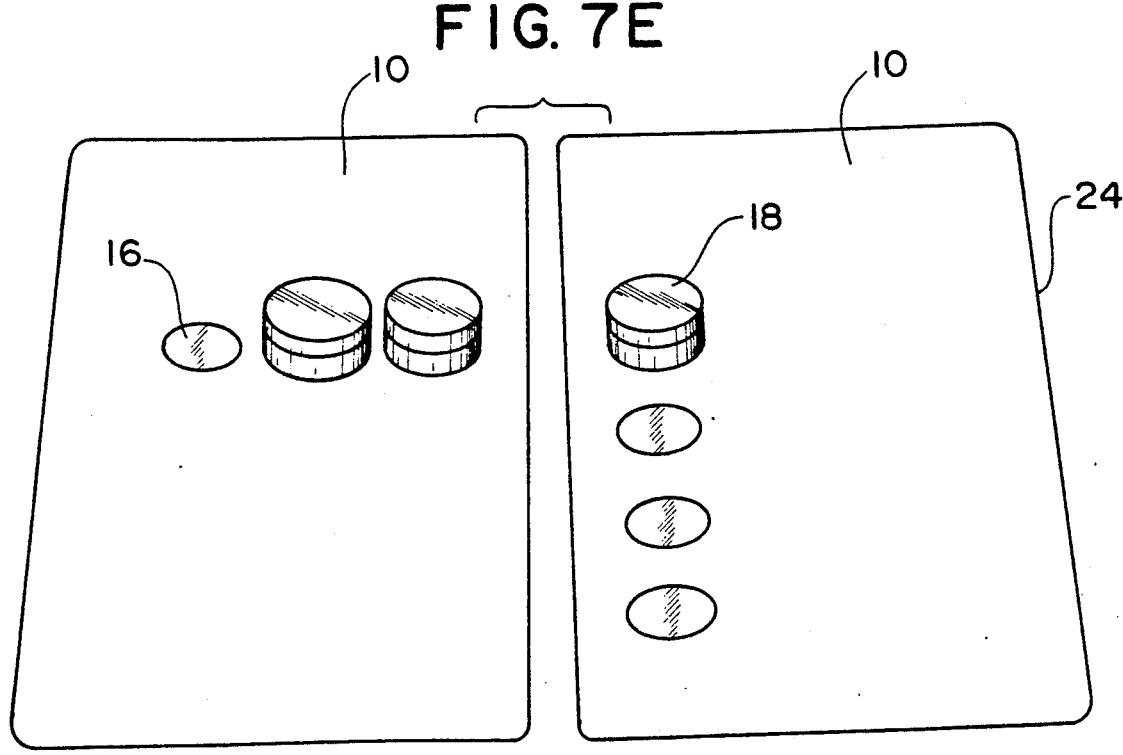
Figure 7F:
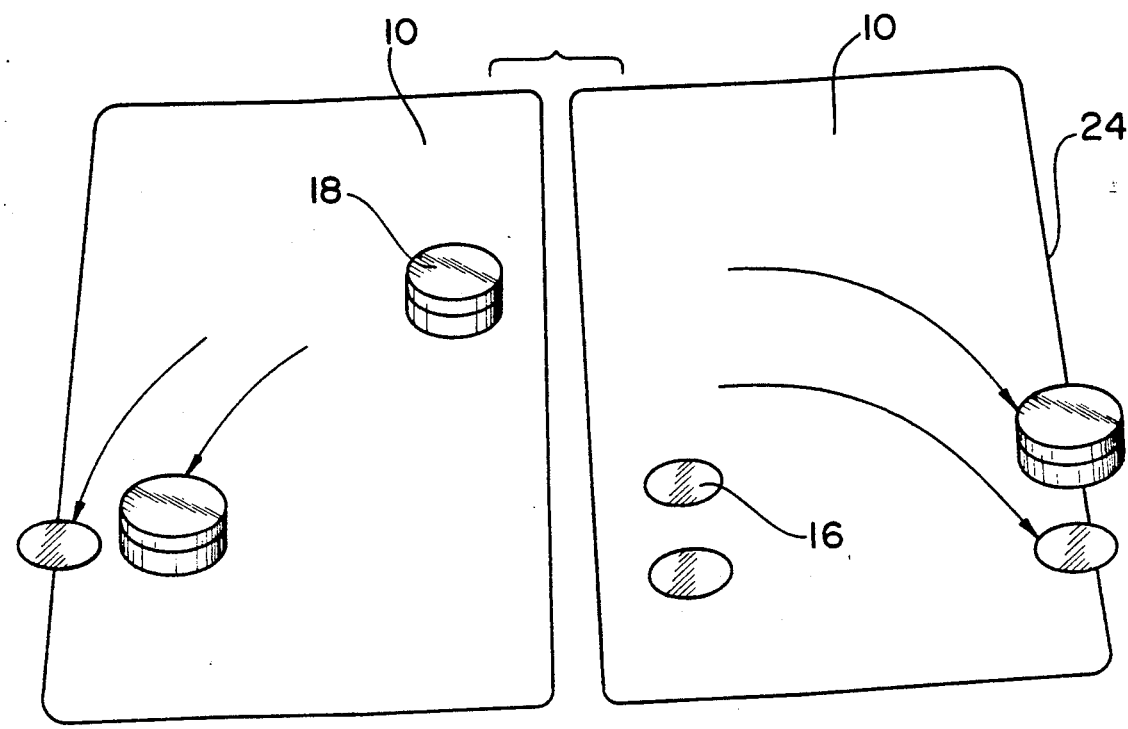
Figure 7G:
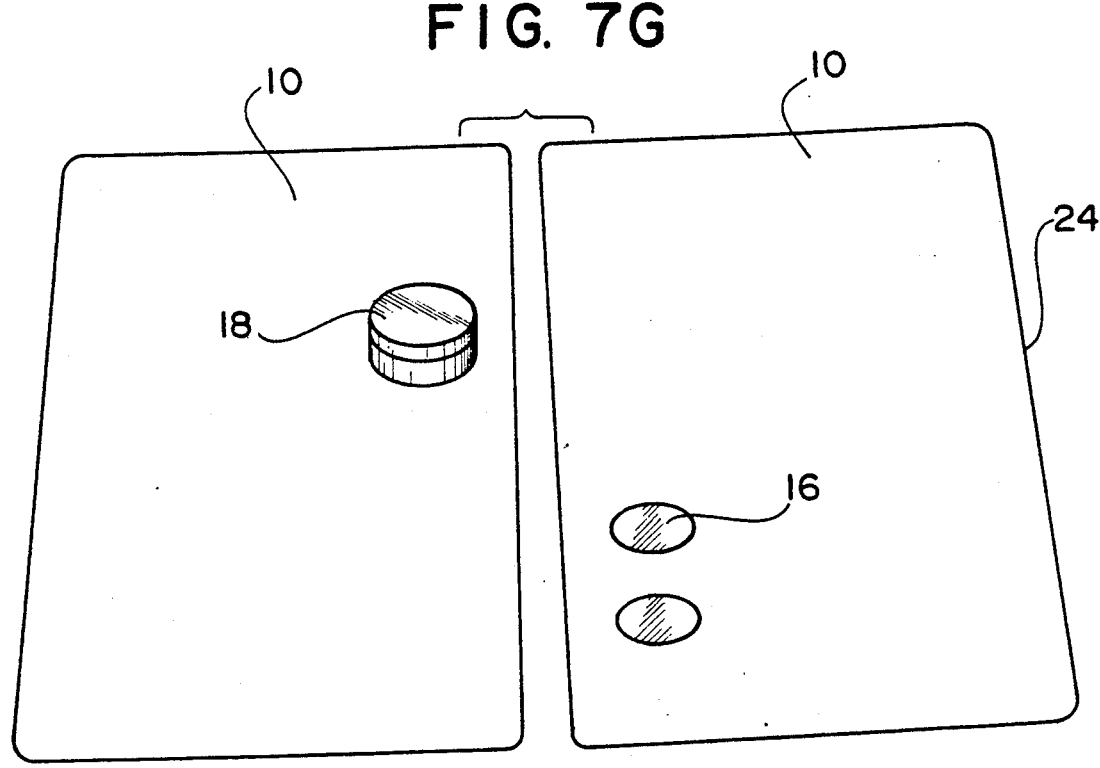

Example 7: FIGS. 7A through G illustrate the application of the invention to solving a linear equation by using the division property of equality, but differ from Example 6 in that the student will be removing repetitions containing both denominate units. FIG. 7A depicts the equation $3d+6c=3c+9d$, or $3+6x=3x+9$. In FIG. 7B, the student recognizes the awareness of a repetition of three, resulting in the partitioning of FIG. 7C, which is equivalent to rewriting the equation as $3(d+2c)=3(c+3d)$ or $3(1+2x)=(x+3)$. In FIG. 7D, the repetitions are removed, yielding the equivalent equality $d+2c=c+3d$, or $1+2x=x+3$, in FIG. 7E. Equal groups are then subtracted from each board in FIG. 7F, yielding the solution of $c=2d$, or $x=2$, in FIG. 7G.

Figure 8A:
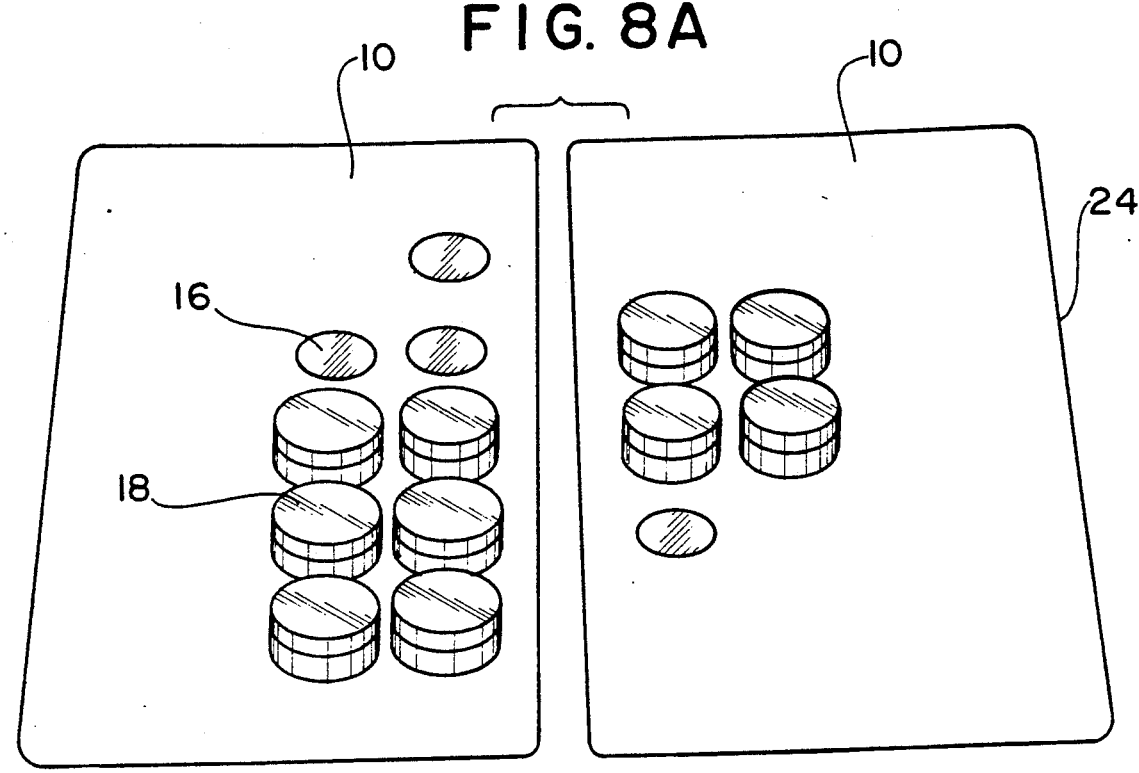
FIGS. 8A through M illustrate a two-board system used for the solution of a linear equation requiring the addition of equal numbers of a denominate unit to create a repetition. Those figures also illustrate the occurrence of a negative solution.
Figure 8B:
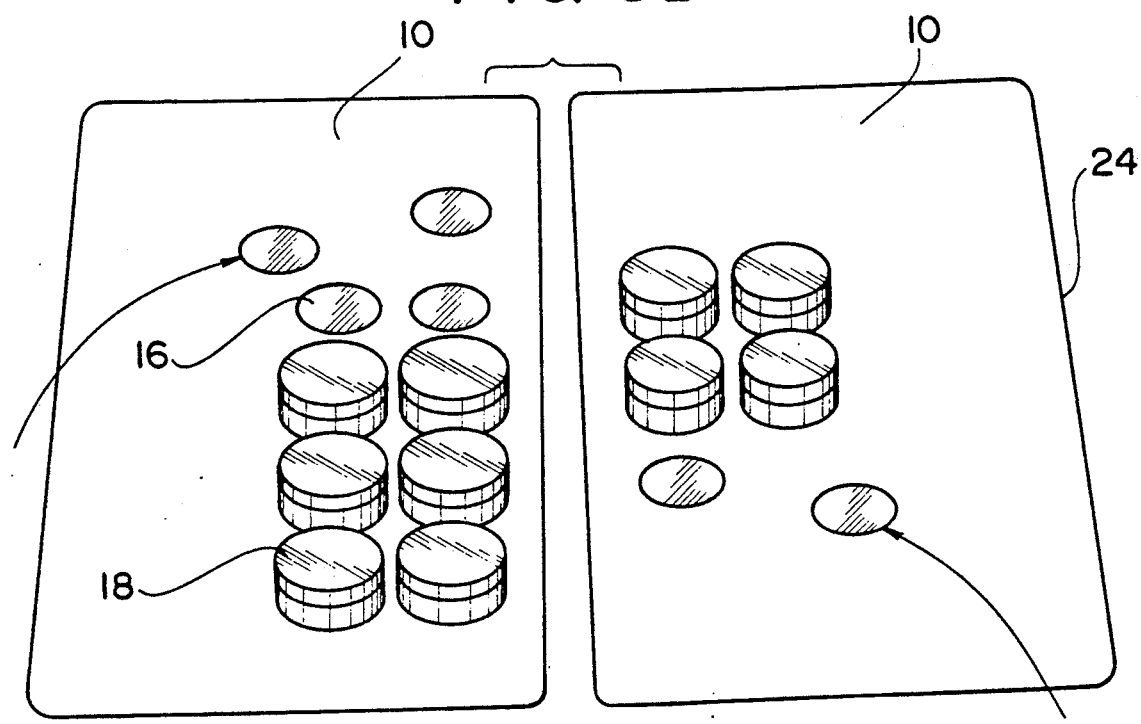
Figure 8C:
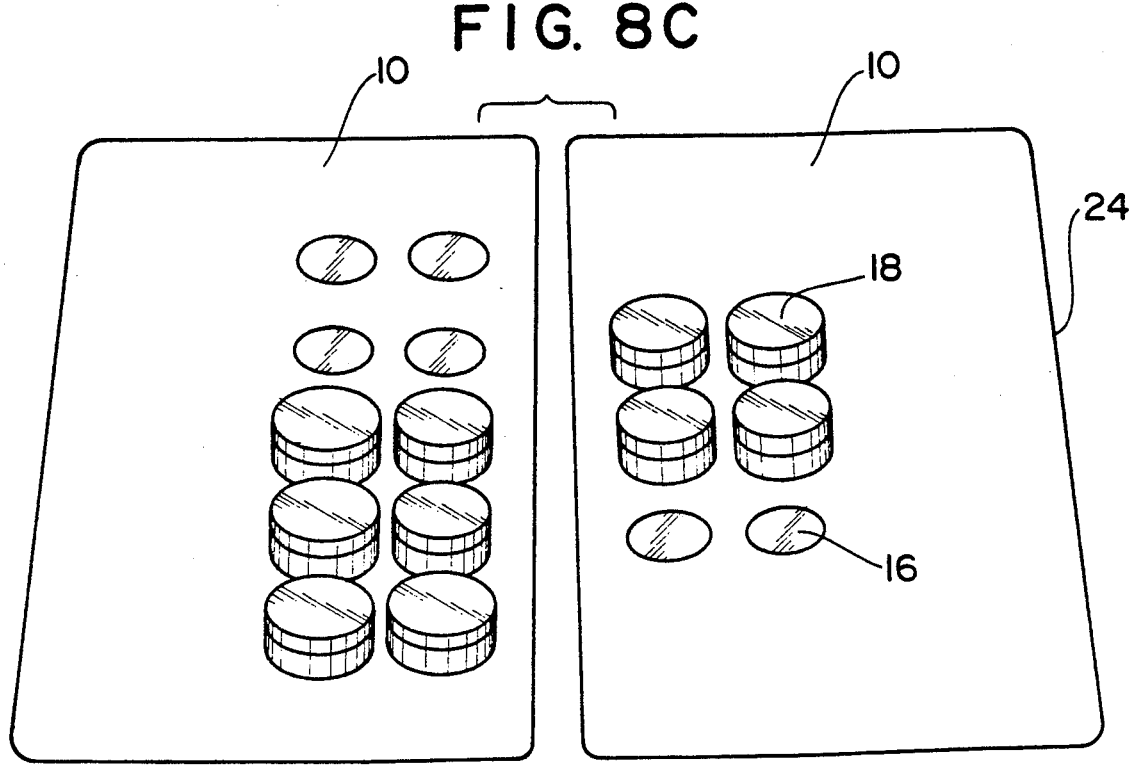
Figure 8D:
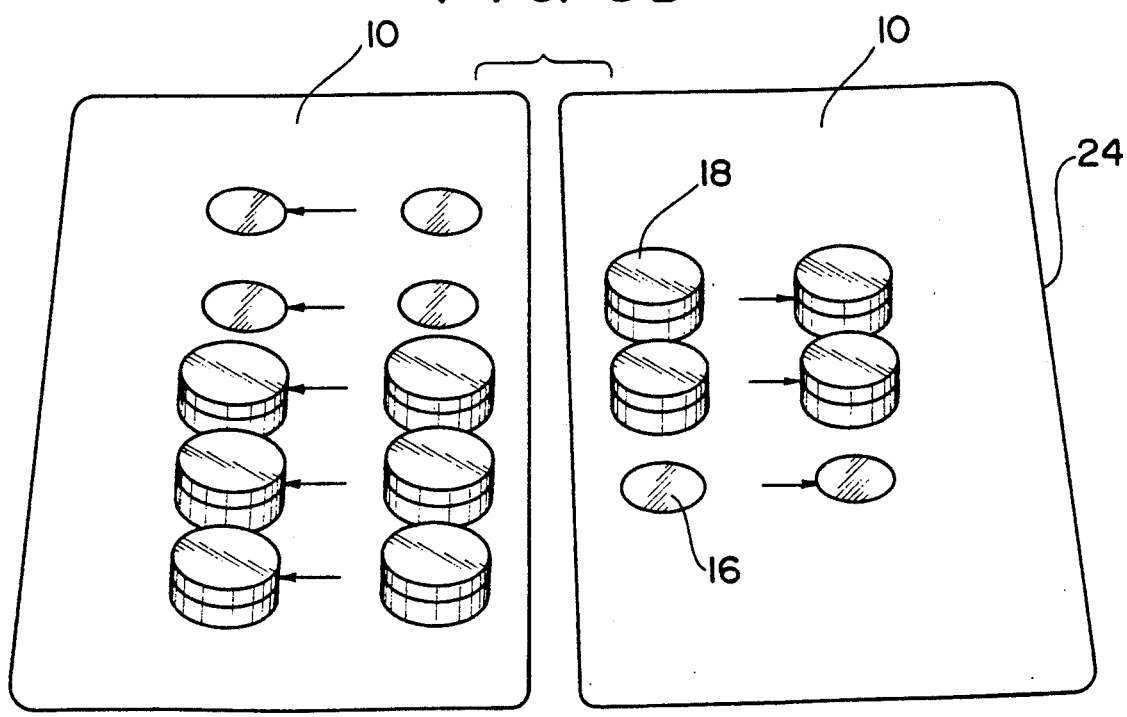
Figure 8E:
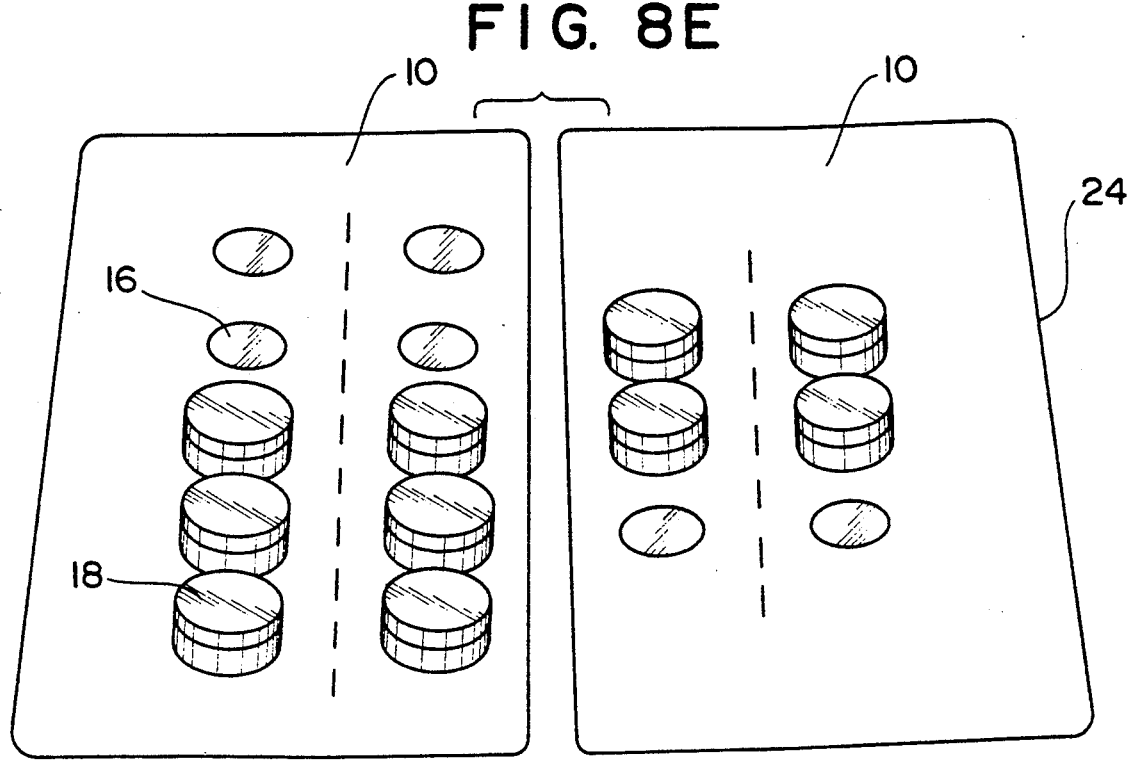
Figure 8F:
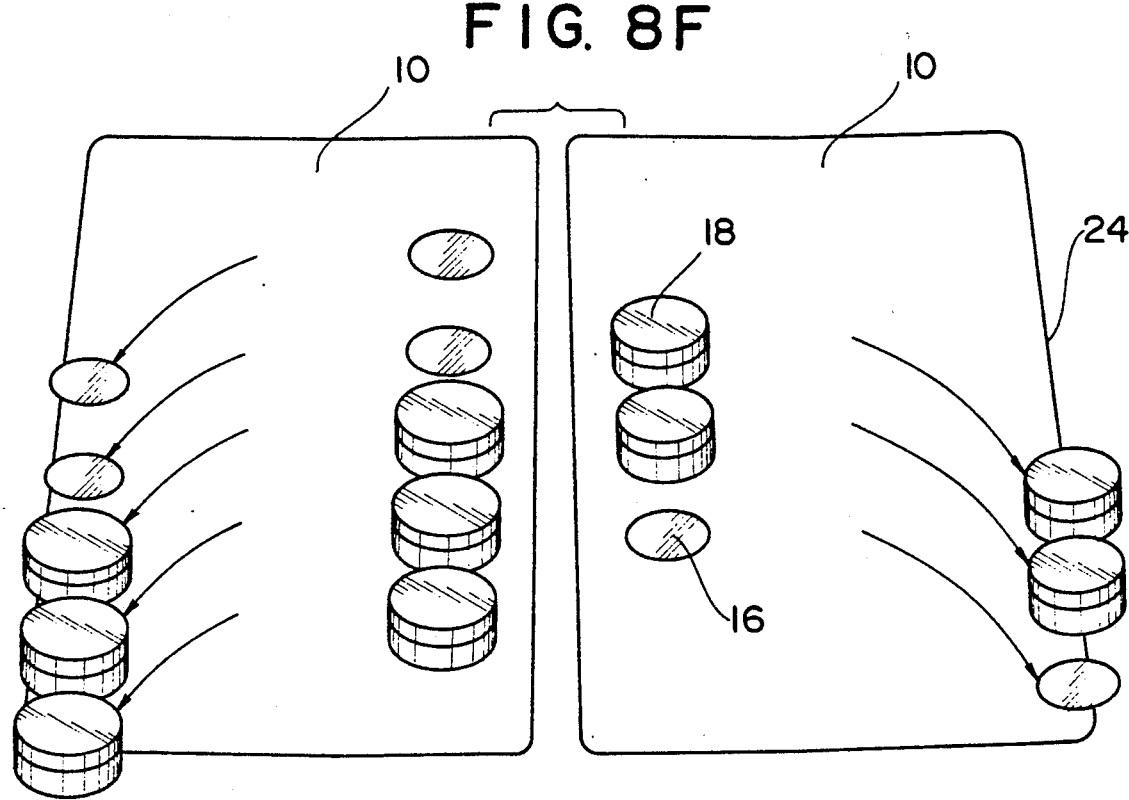
Figure 8G:
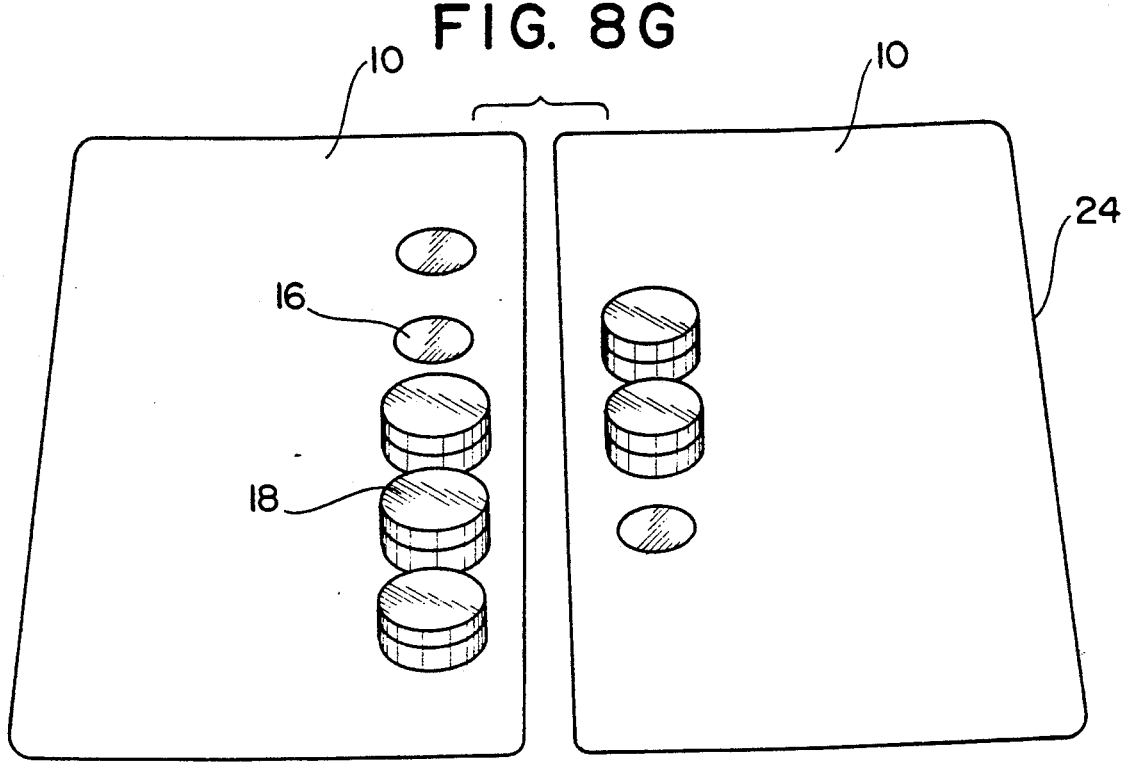
Figure 8H:
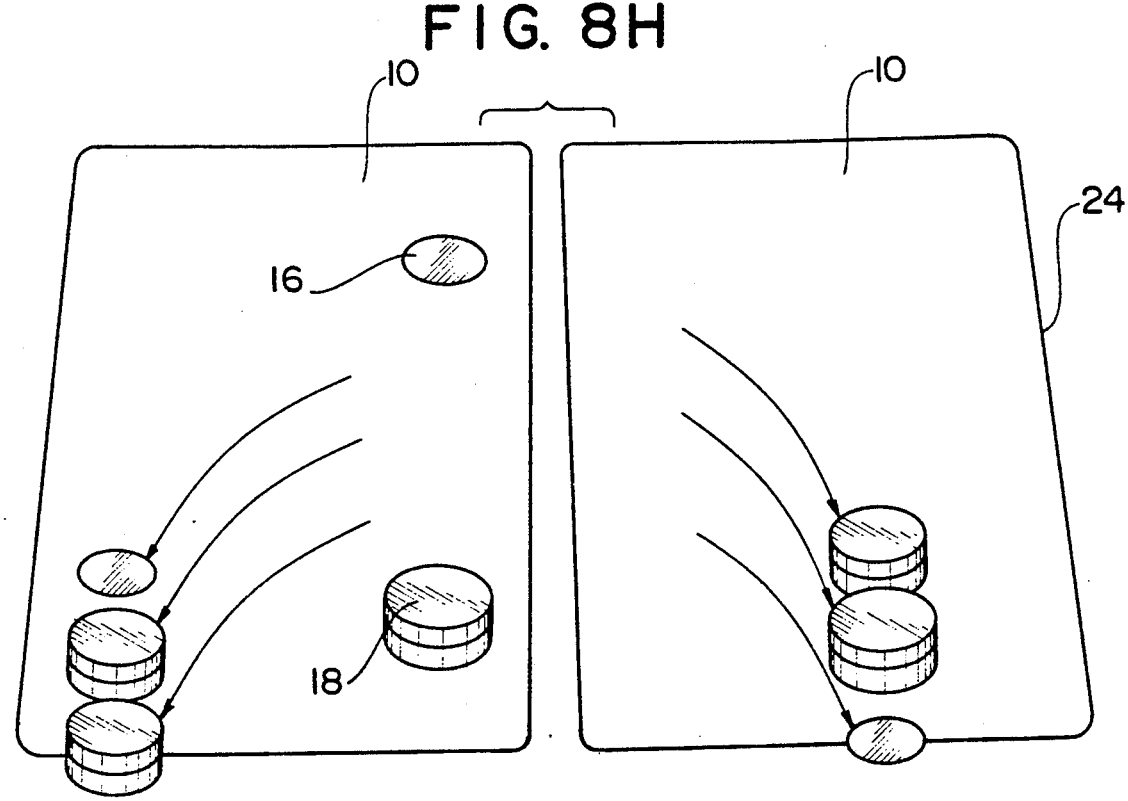
Figure 8I:
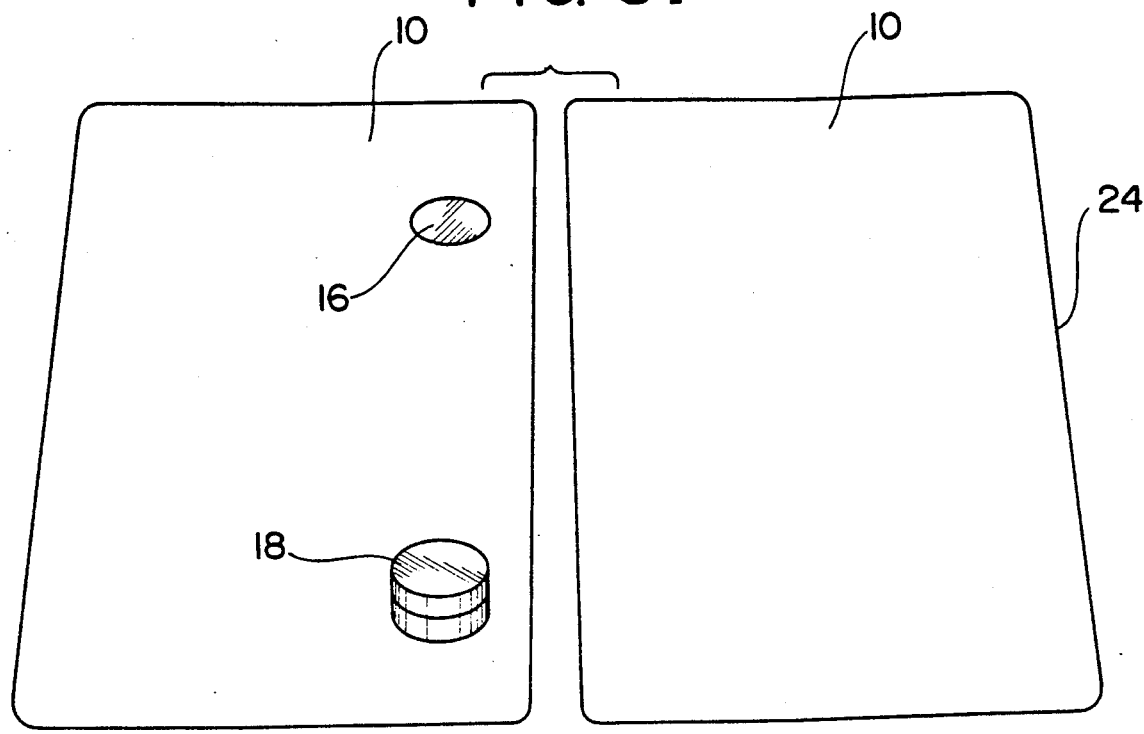
Figure 8J:
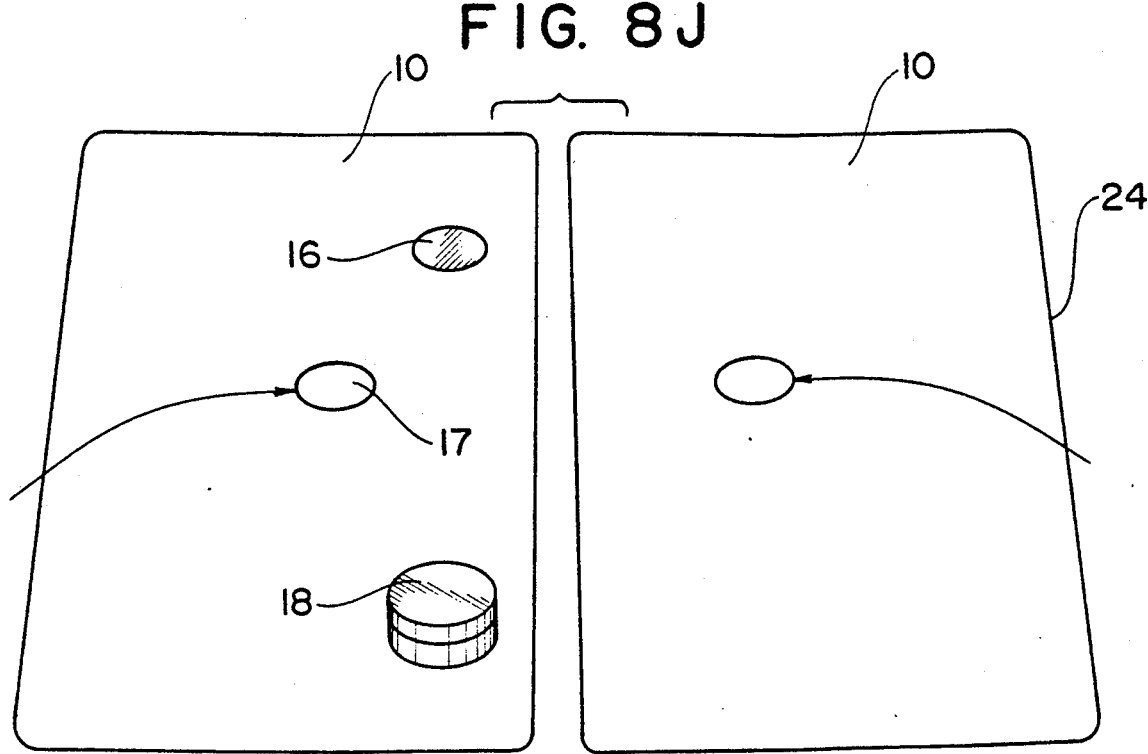
Figure 8K:
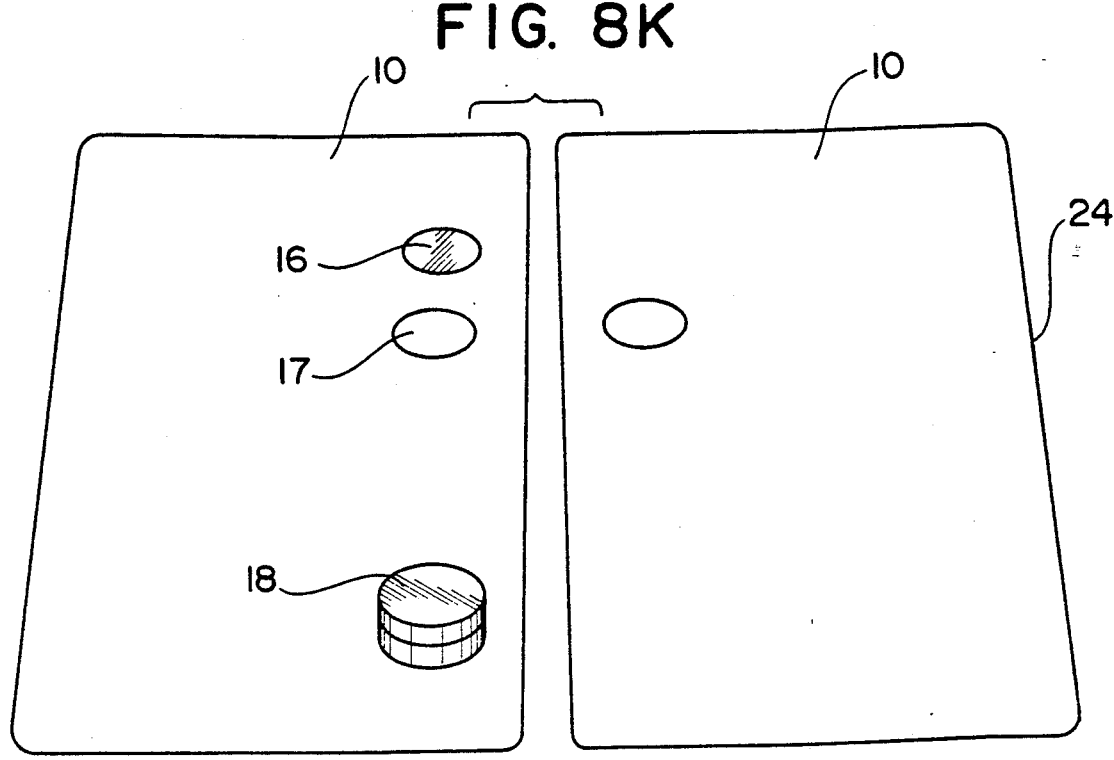
Figure 8L:
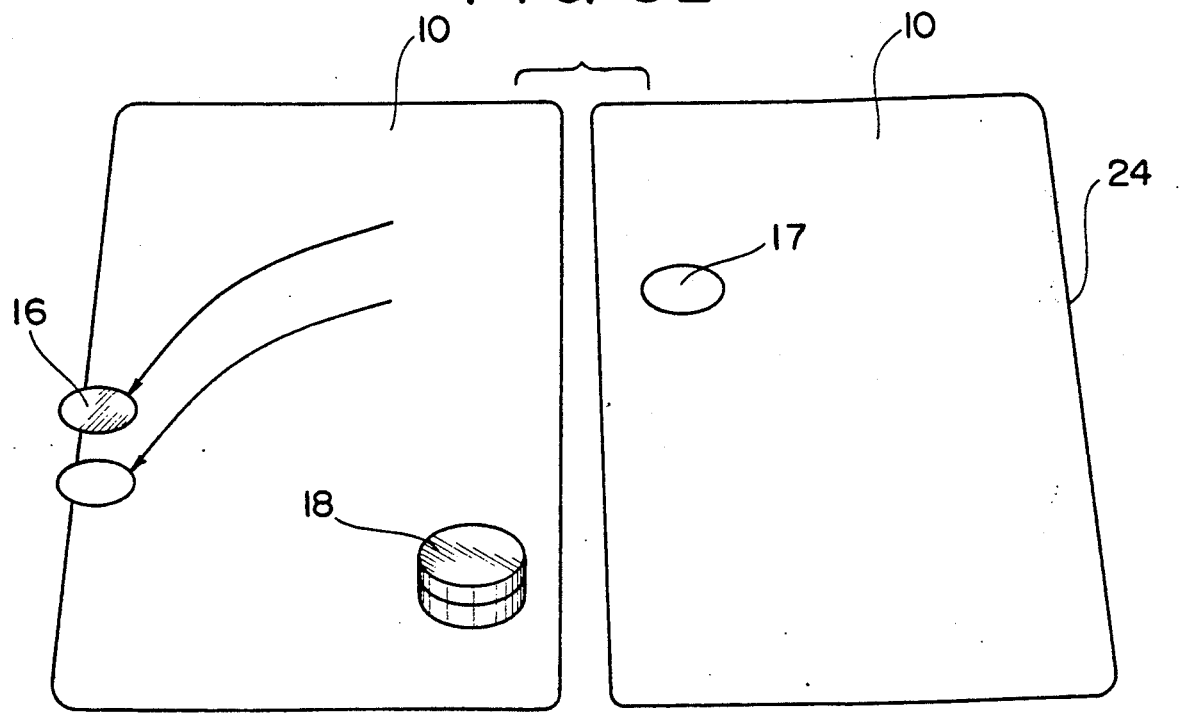
Figure 8M:
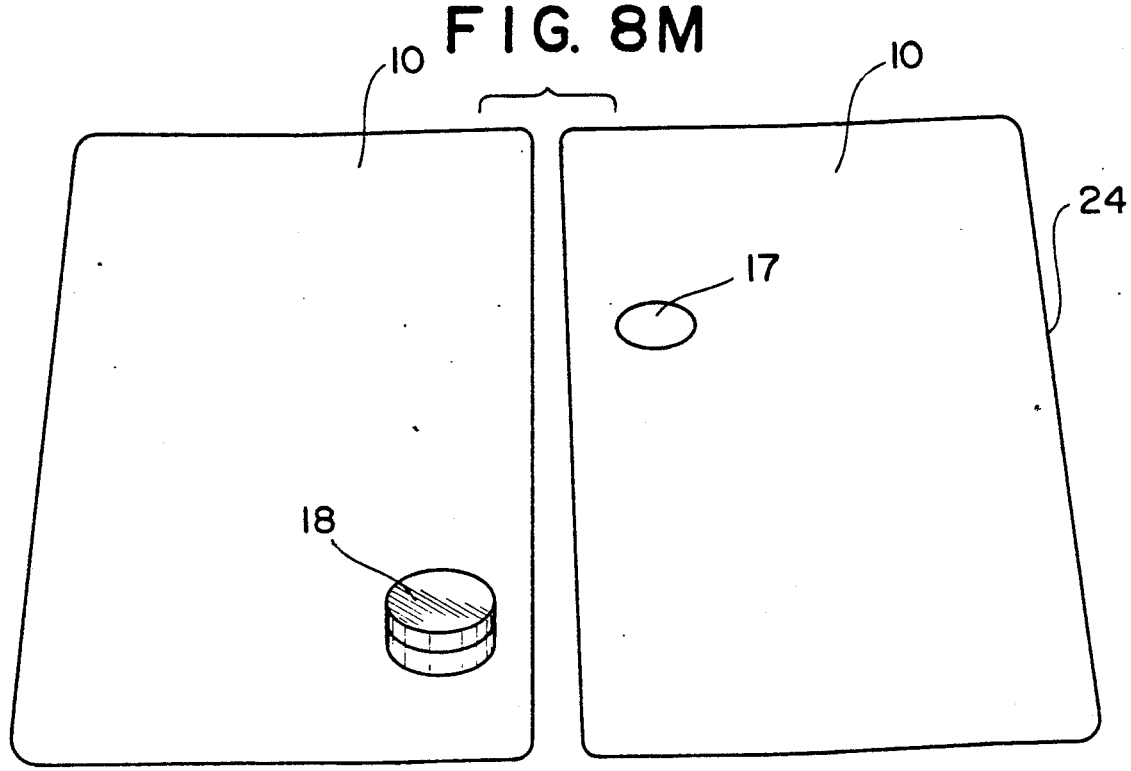

Example 8: FIGS. 8A through M illustrate the application of the invention to solving a linear equation by using the addition property of equality in which an object is to be added to each board to create a repetition. These figures also illustrate how a negative solution can be incorporated. FIG. 8A depicts the equation $3d+6c=4c+d$, or $3+6x=4x+1$. in FIG. 8B, a single dot is added to each board, creating the equivalent equality of FIG. 8C. In FIG. 8D, the awareness of two is recognized, resulting in the partitioning of FIG. 8E. In FIG. 8F, the repetition is removed, yielding the equivalent equality $2d+3c=2c+d$, or $2+3x=2x+1$, in FIG. 8G. Equal groups are then subtracted from each board in FIG. 8H, yielding the equivalent equality $d+c=0$, or $x+1=0$, in FIG. 8I. A dot of contrasting feature (in this case, texture) is then added to each board in FIg. 8J, yielding the equivalent equality $d+(-d)+c=(-d)$, or $1+(-1)+x=-1$, in FIG. 8K. In FIG. 8L, a dot with its corresponding negative dot can be properly removed from the left board (since together they have a value of zero), yielding the solution $c=-d$, or $x=-1$, in FIG. 8M.

Figure 9A:
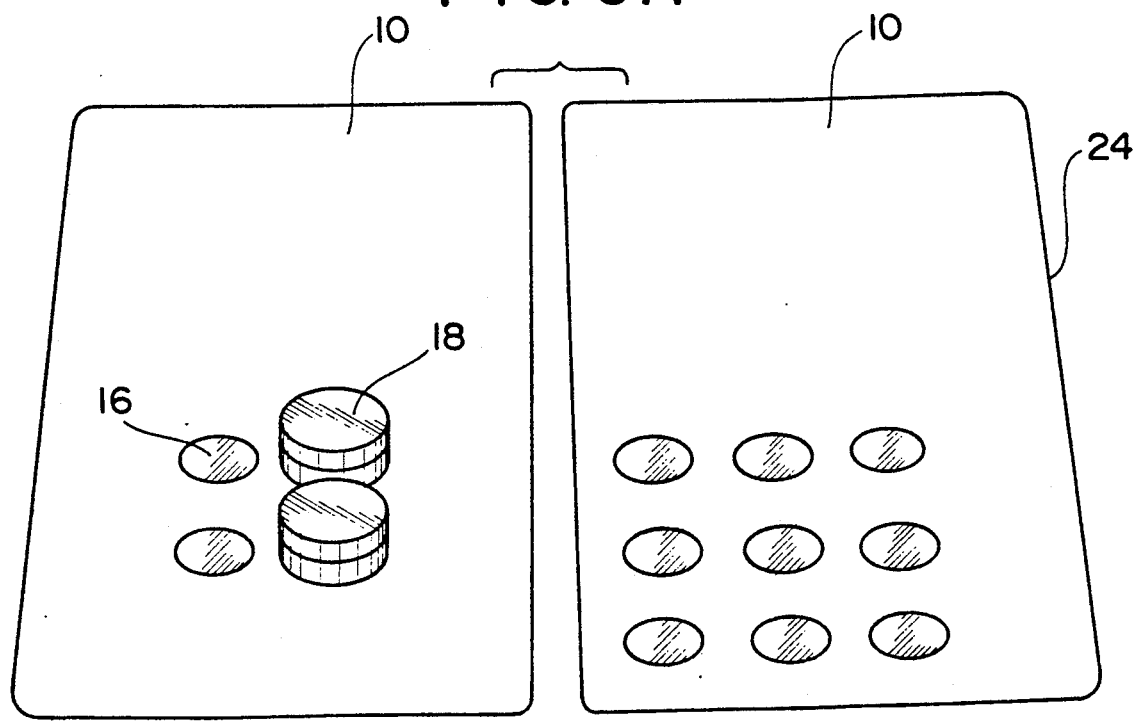
FIGS. 9A through K illustrate the solution of a linear equation involving a fractional solution, requiring subtracting before dividing.
Figure 9B:
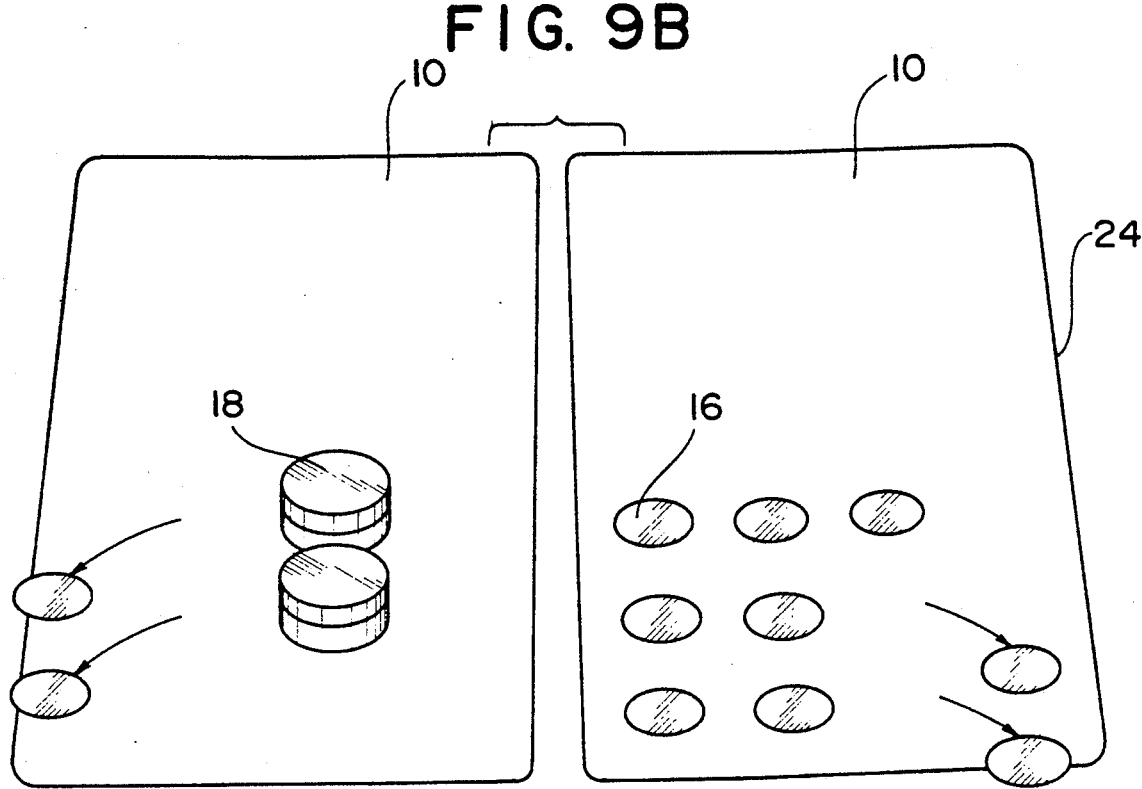
Figure 9C:
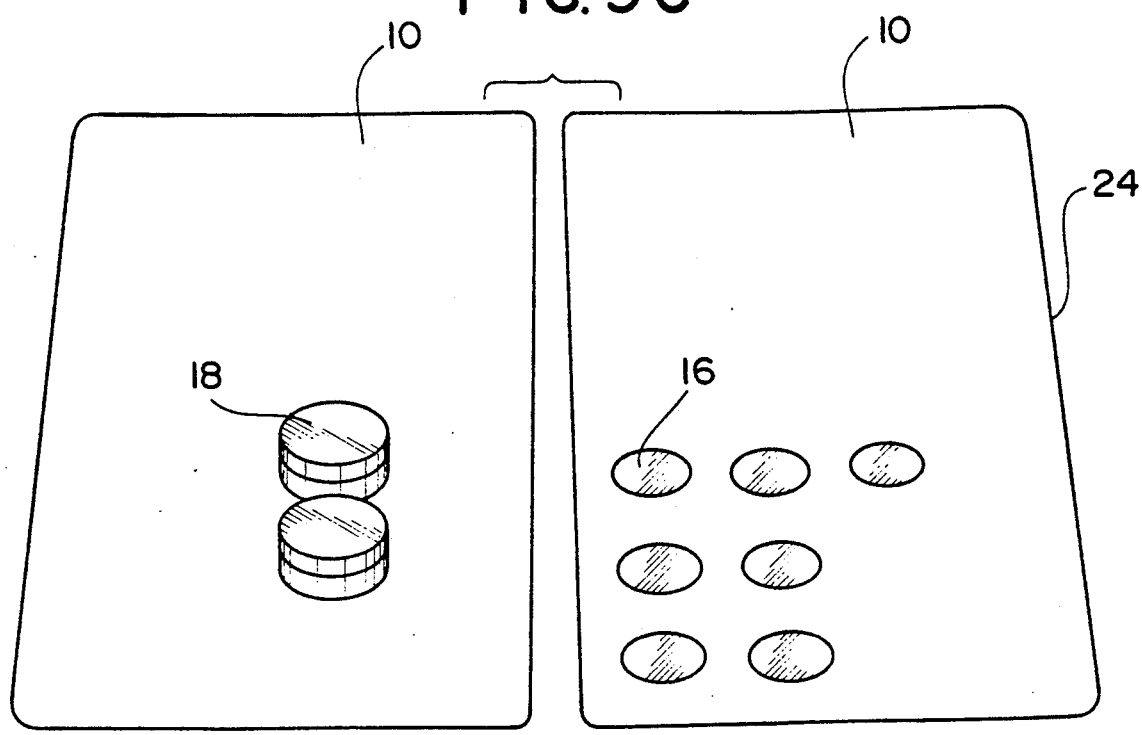
Figure 9D:
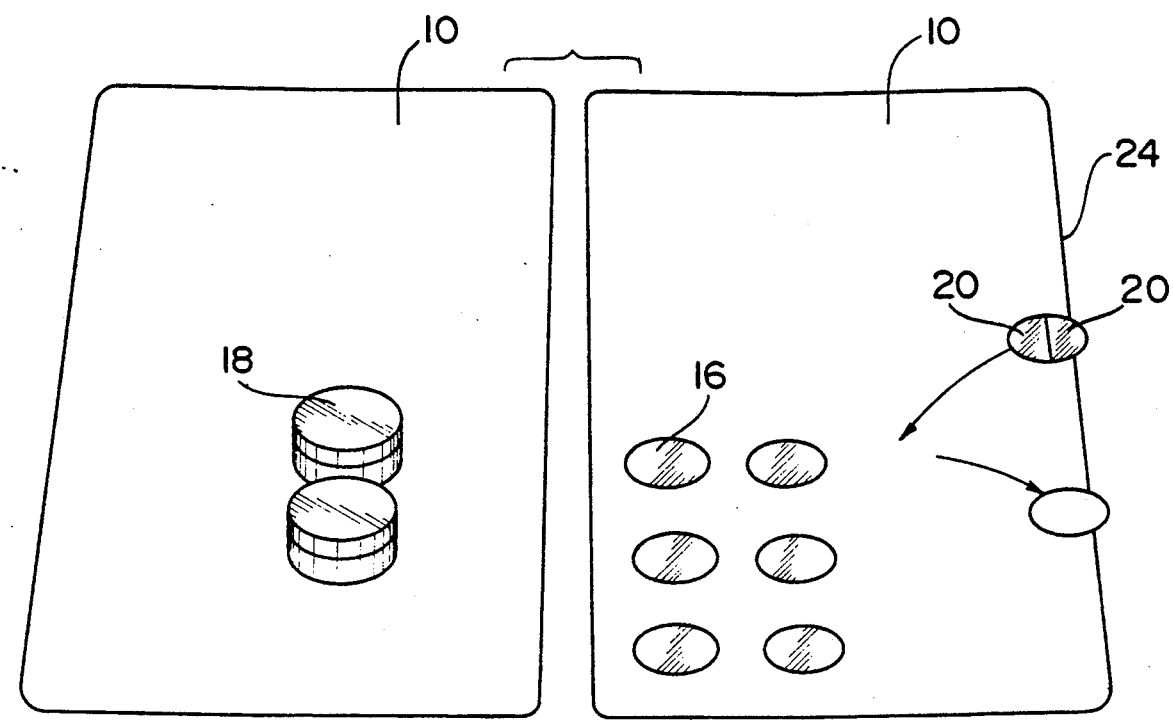
Figure 9E:
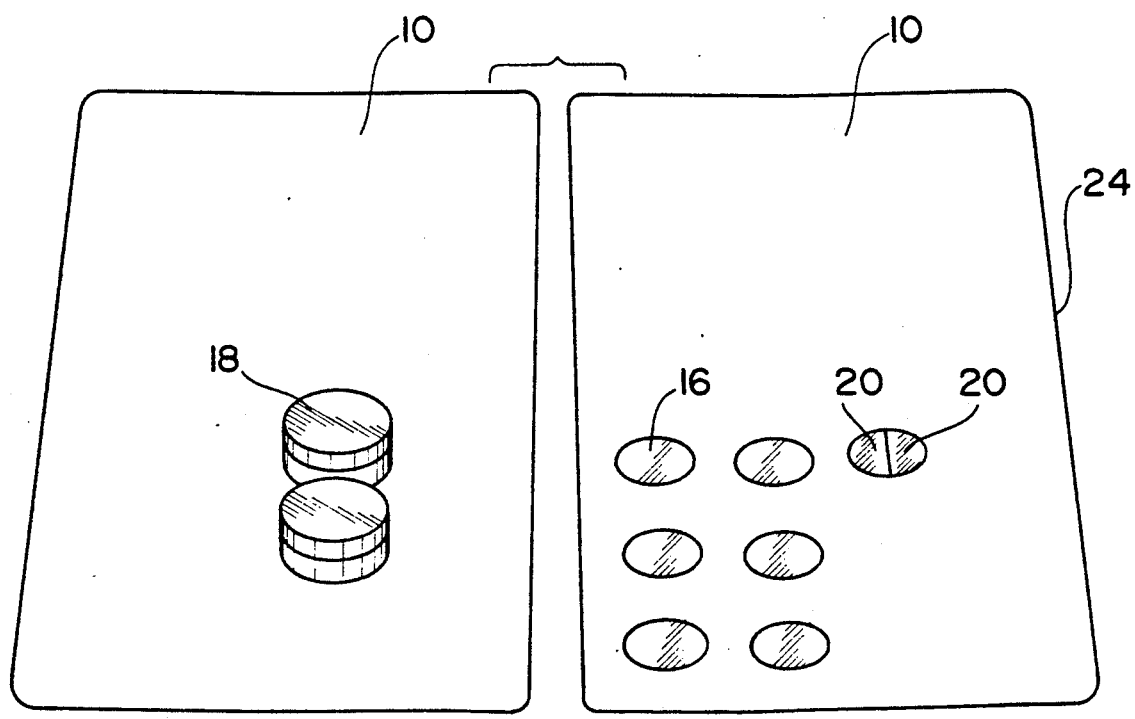
Figure 9F:
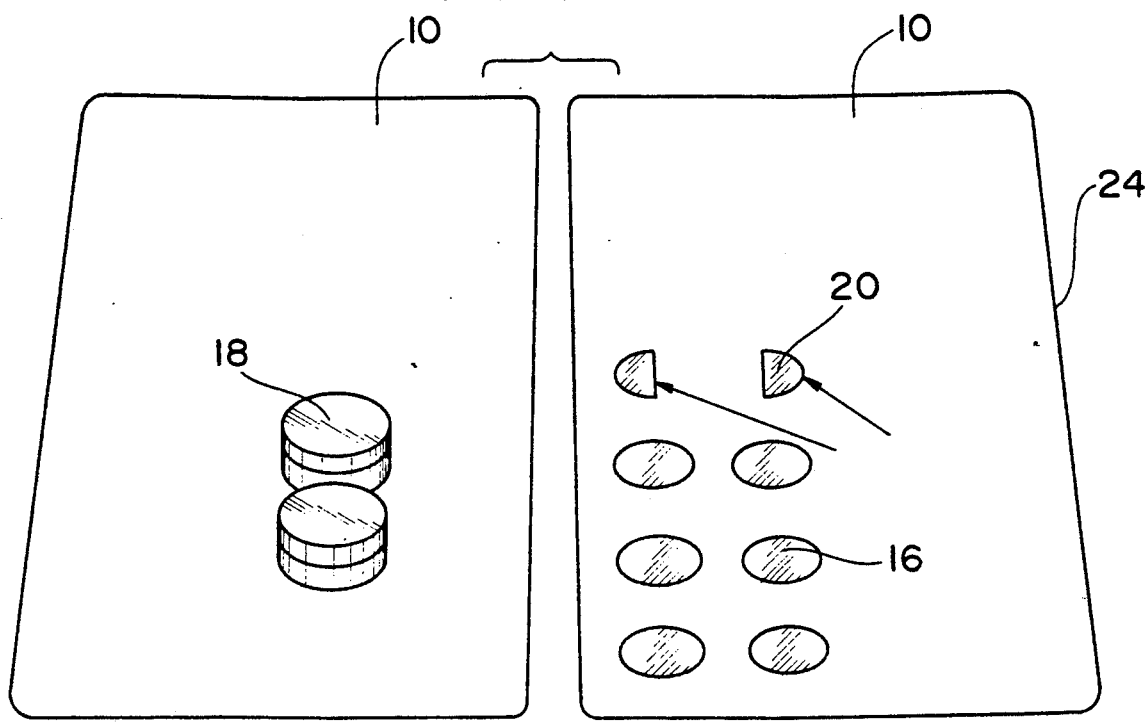
Figure 9G:
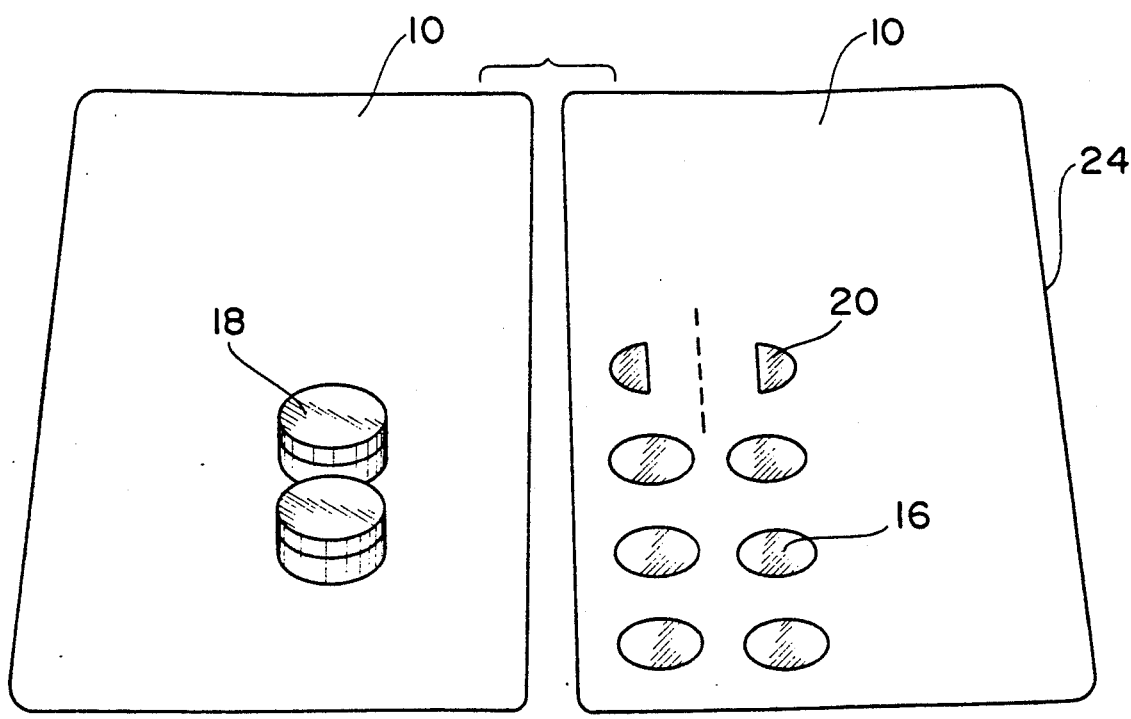
Figure 9H:
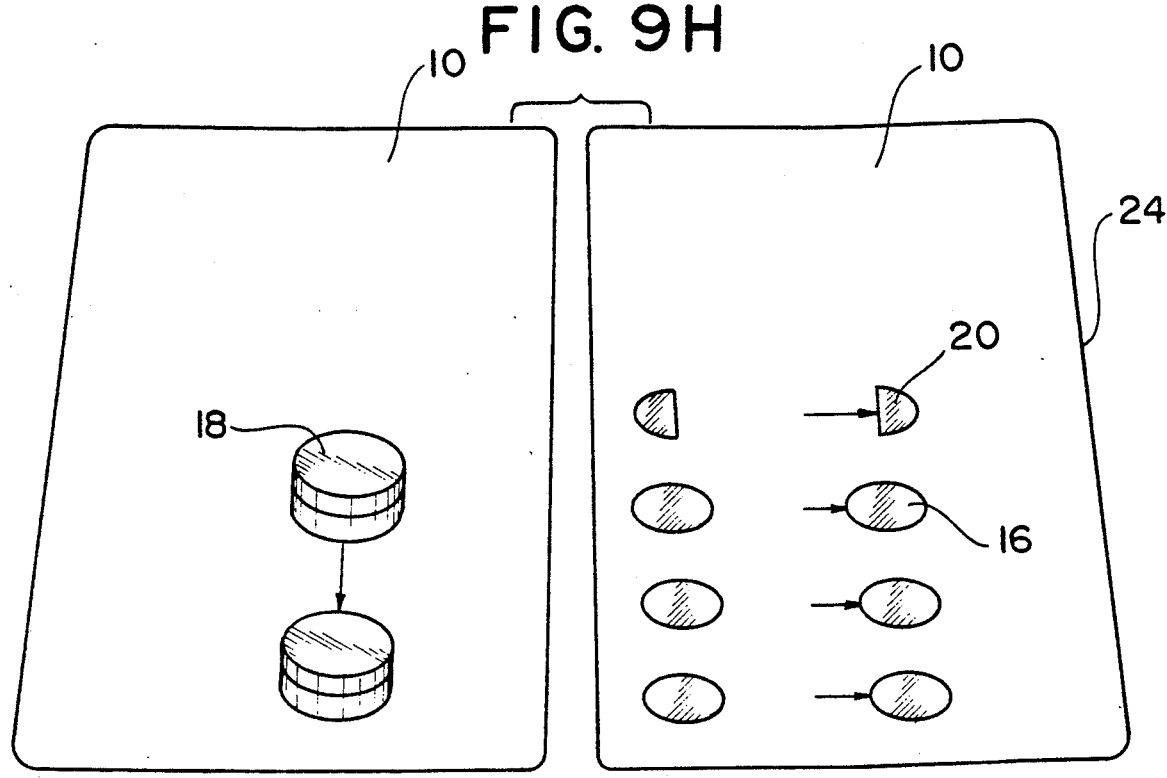
Figure 9I:
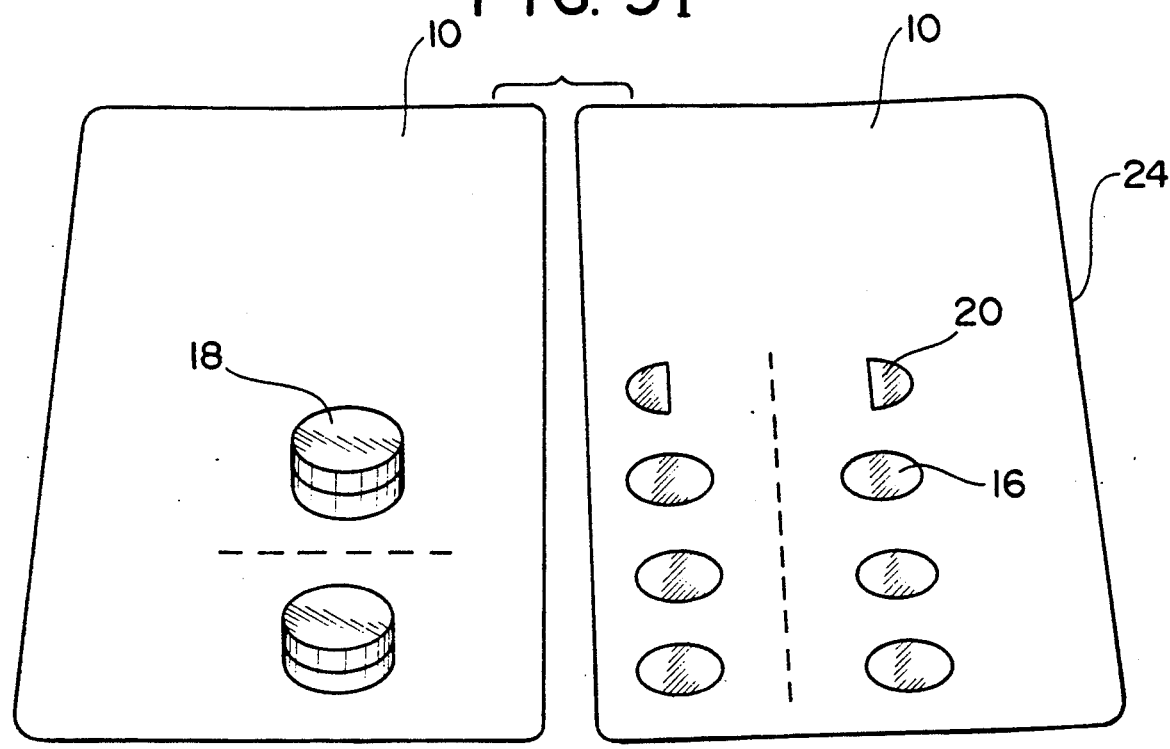
Figure 9J:
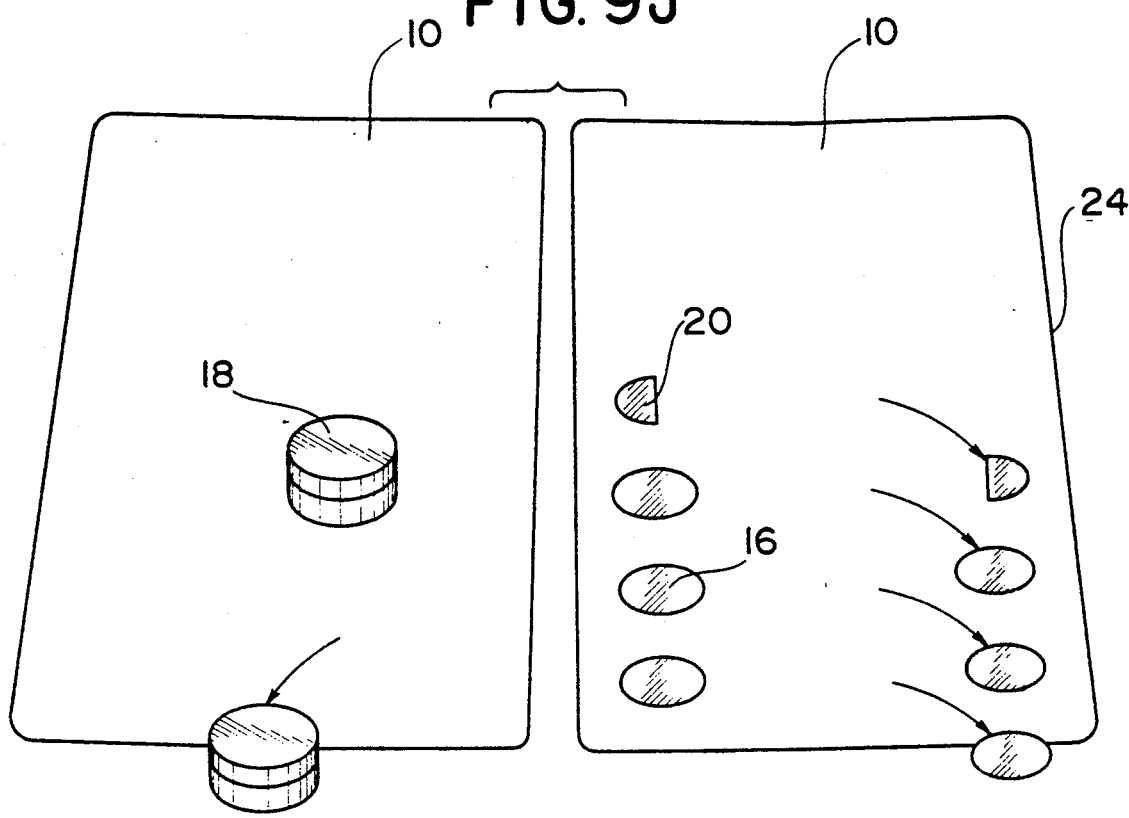
Figure 9K:
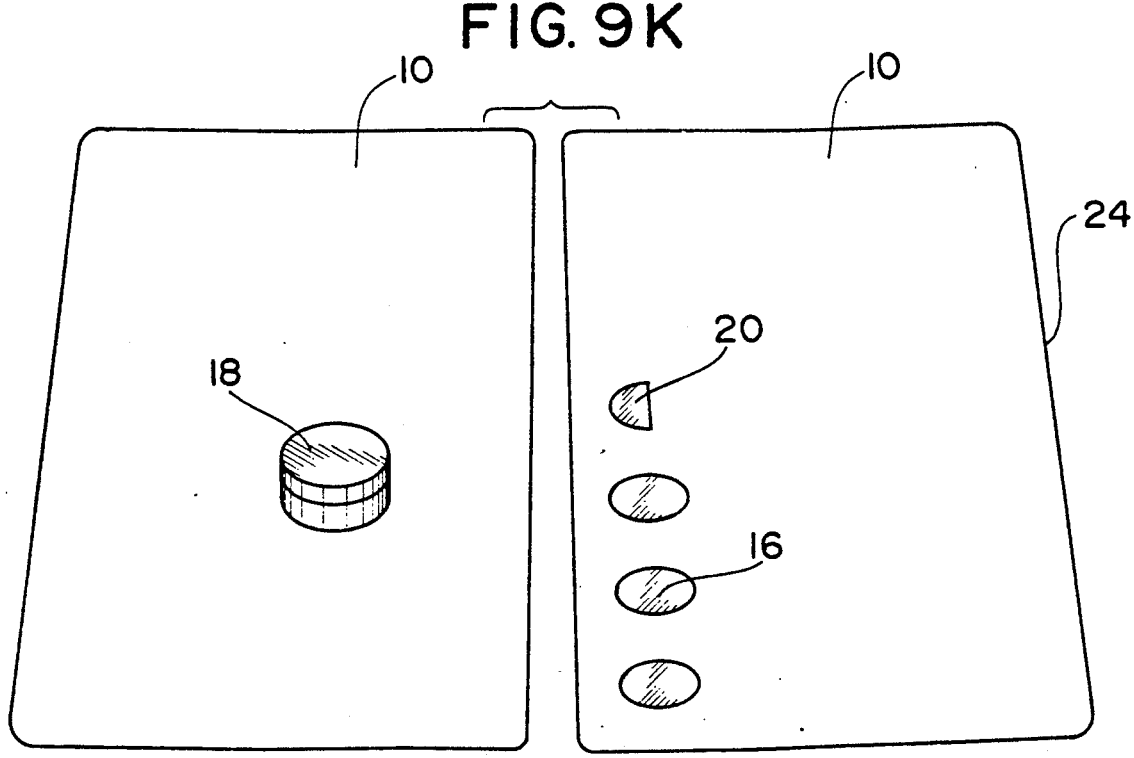

Example 9: FIGS. 9A through K illustrate the application of the invention to solving a linear equation which has a fractional solution using a strategy of applying the subtraction property of equality before applying the division property of equality. FIG. 9A depicts the equation $2d+2c=9d$, or $2+2x=9$. In FIG. 9B, two dots are removed from each board, yielding the equivalent equality $2c=7d$, or $2x=7$, in FIG. 9C. In FIG. 9D, a dot is exchanged for a dot which can be partitioned into two equal sections, yielding FIG. 9E. In FIG. 9F, the halves are physically separated, to produce FIG. 9G. In FIG. 9H, an awareness of two is recognized, resulting in the partitioning of FIG. 9I. In FIG. 9J, the repetition is removed from each board, yielding the solution of $c=3.5d$, or $x=3.5$, in FIG. 9K.

Figure 10A:
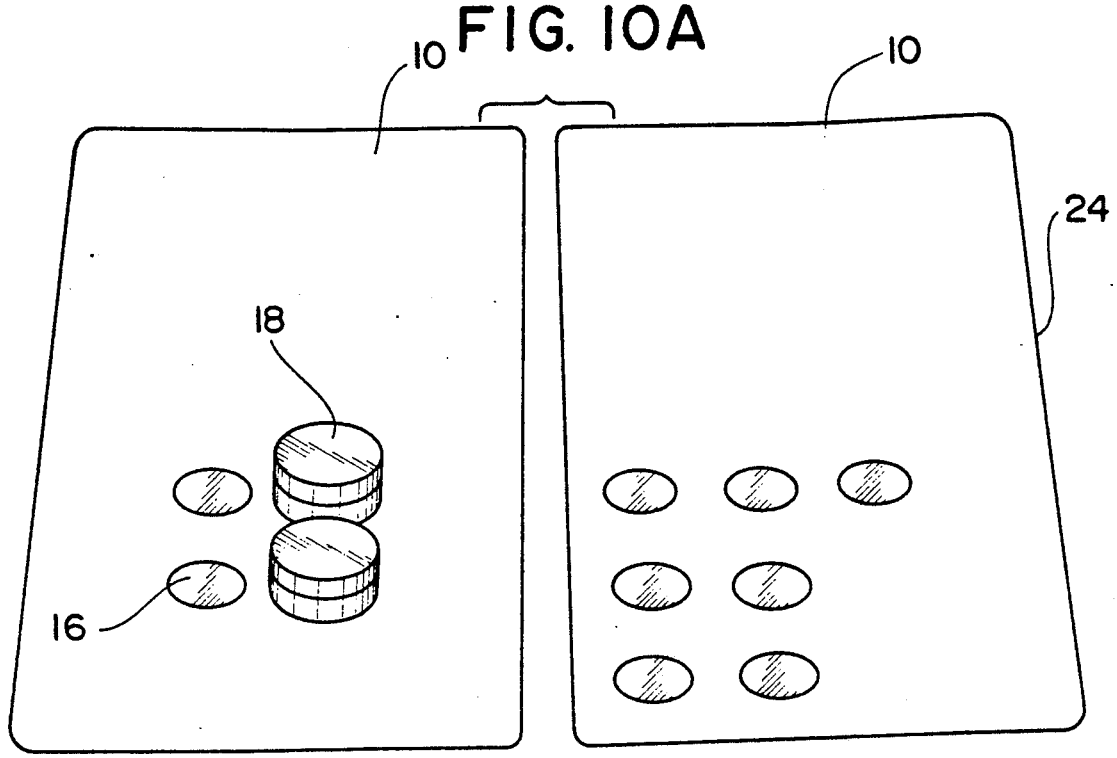
FIGS. 10A through K are similar to FIGS. 9A through K but change the perspective and illustrate a two-board system used for solving a linear equation using a strategy of division before subtraction.
Figure 10B:
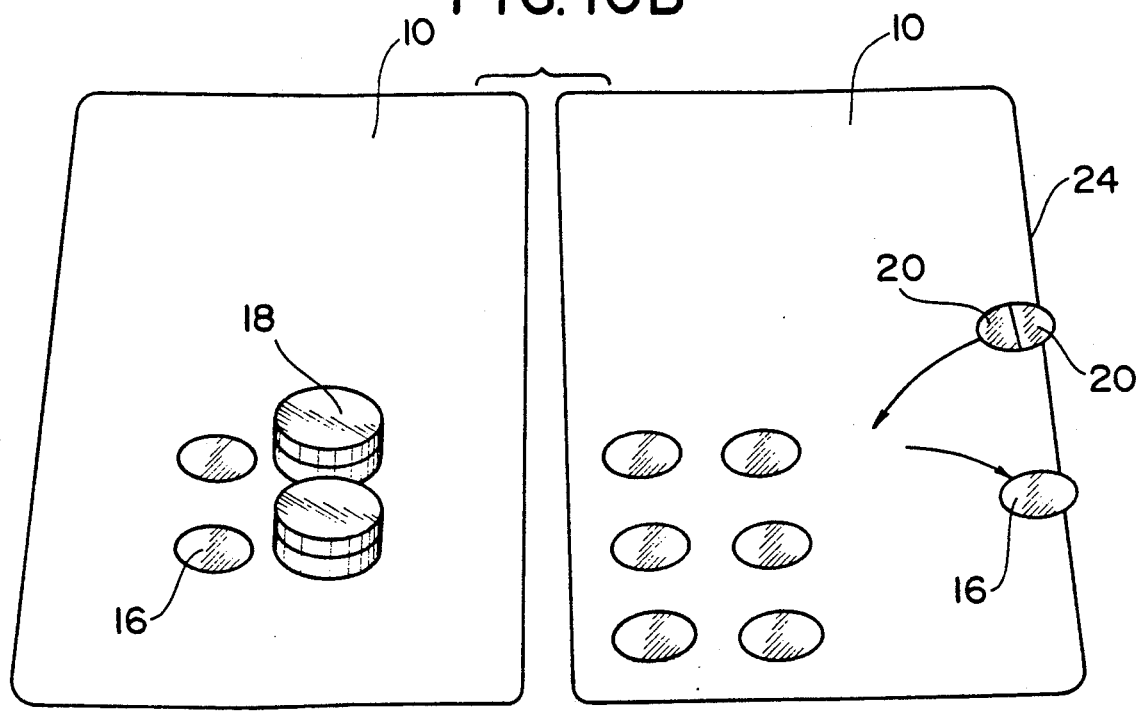
Figure 10C:
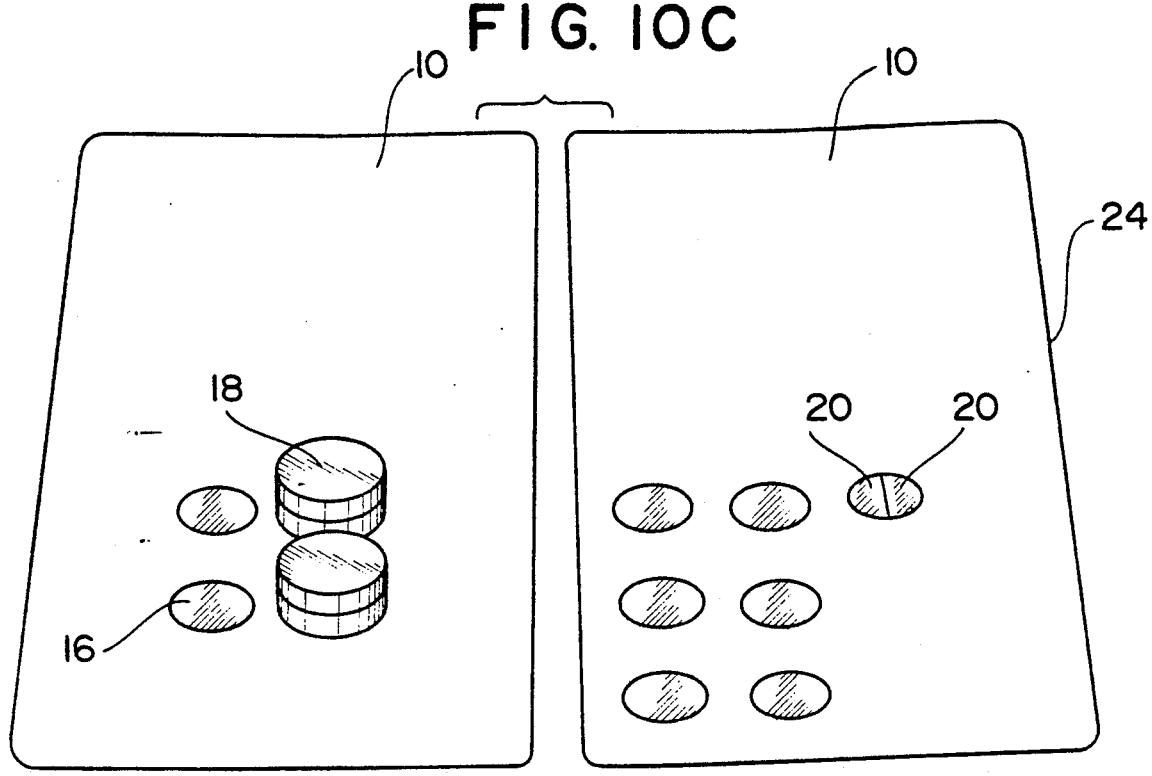
Figure 10D:
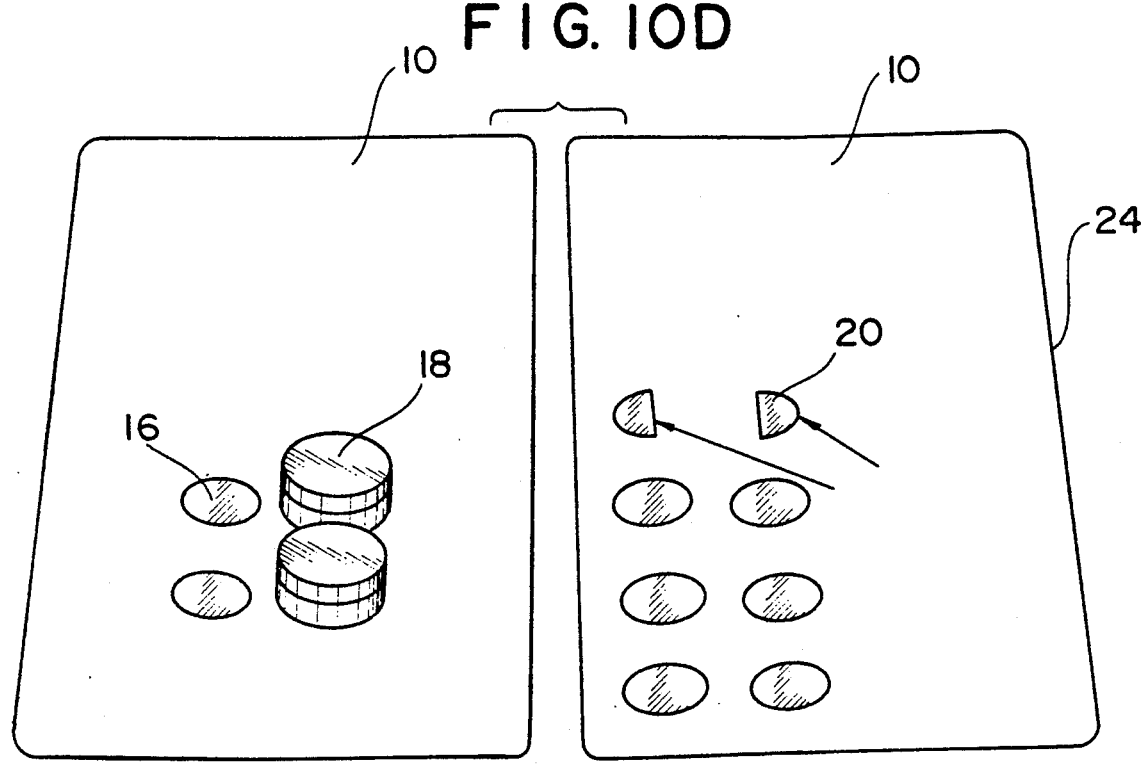
Figure 10E:
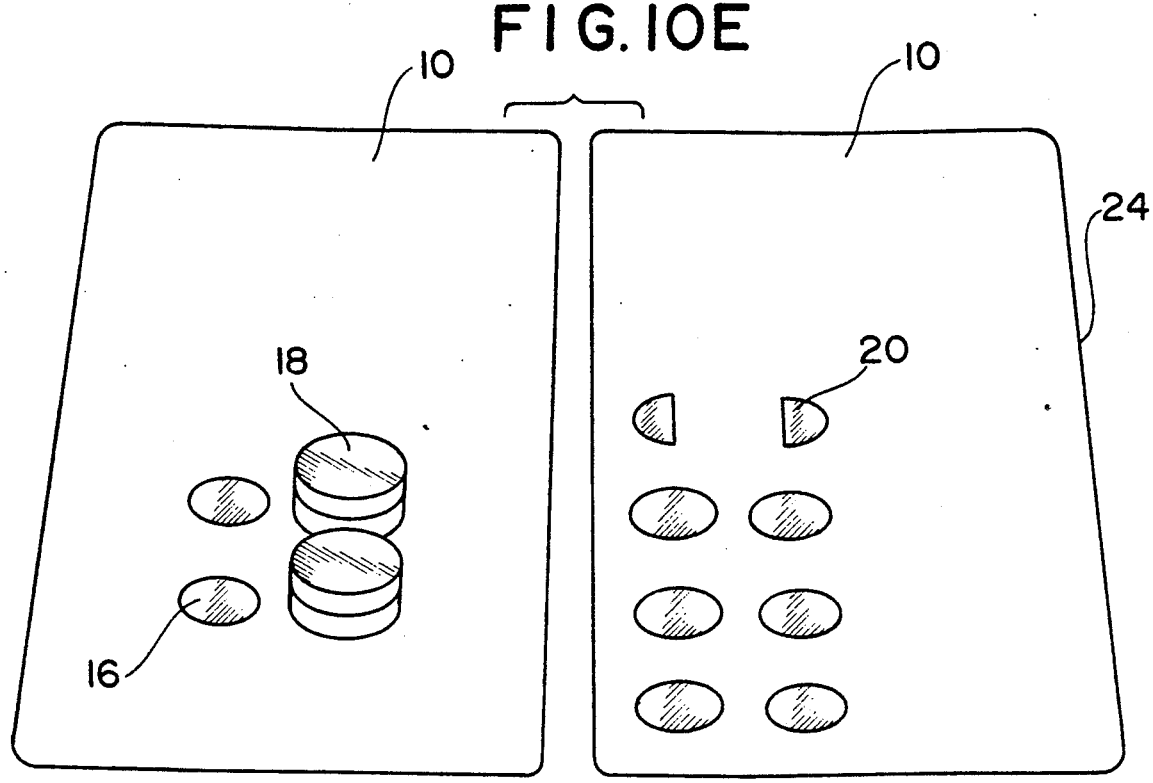
Figure 10F:
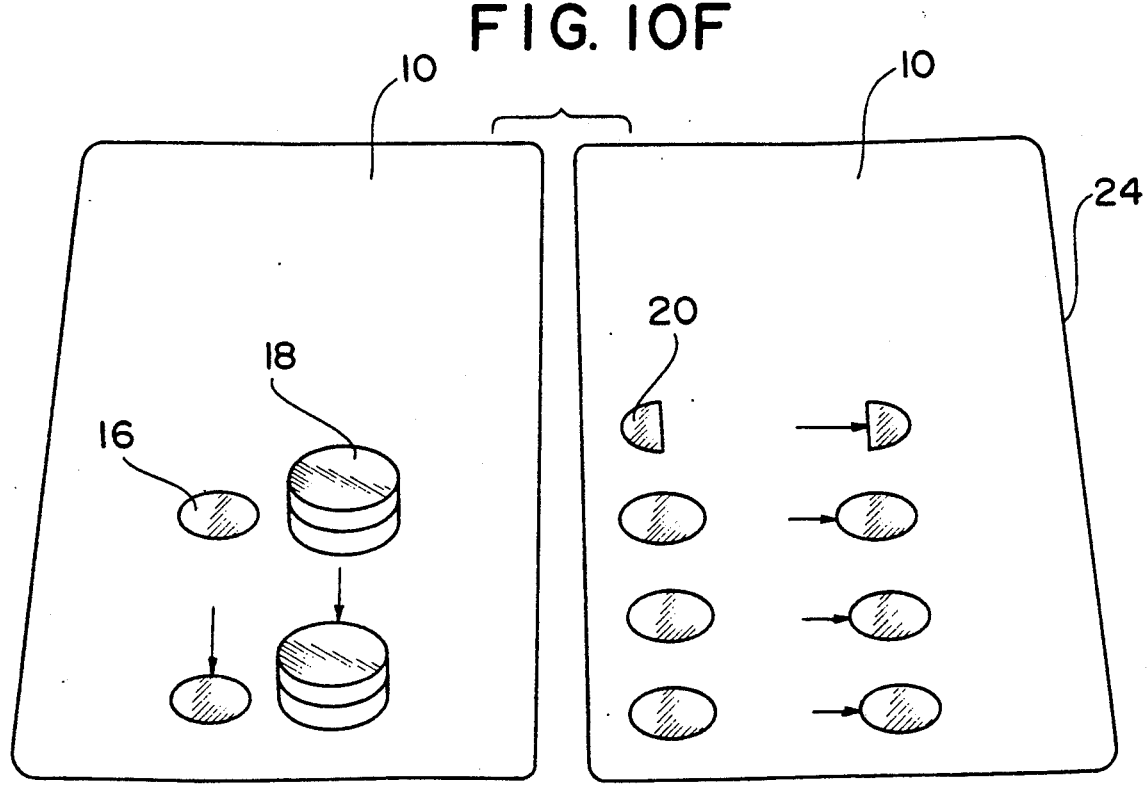
Figure 10G:
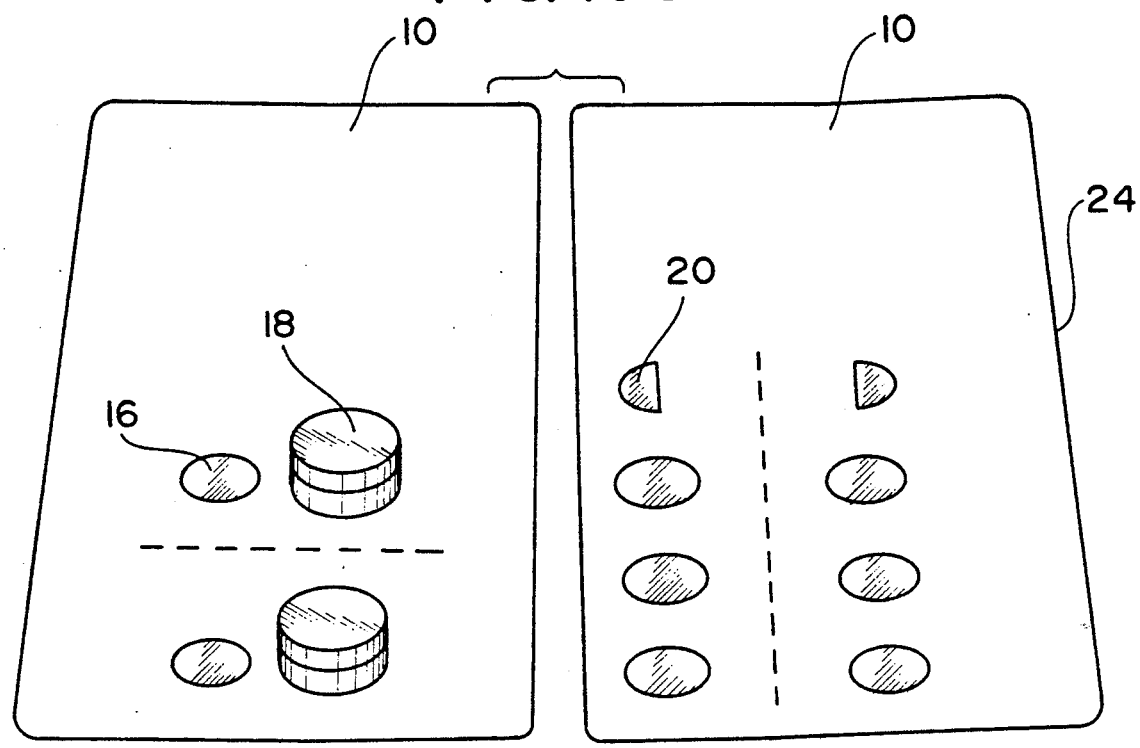
Figure 10H:
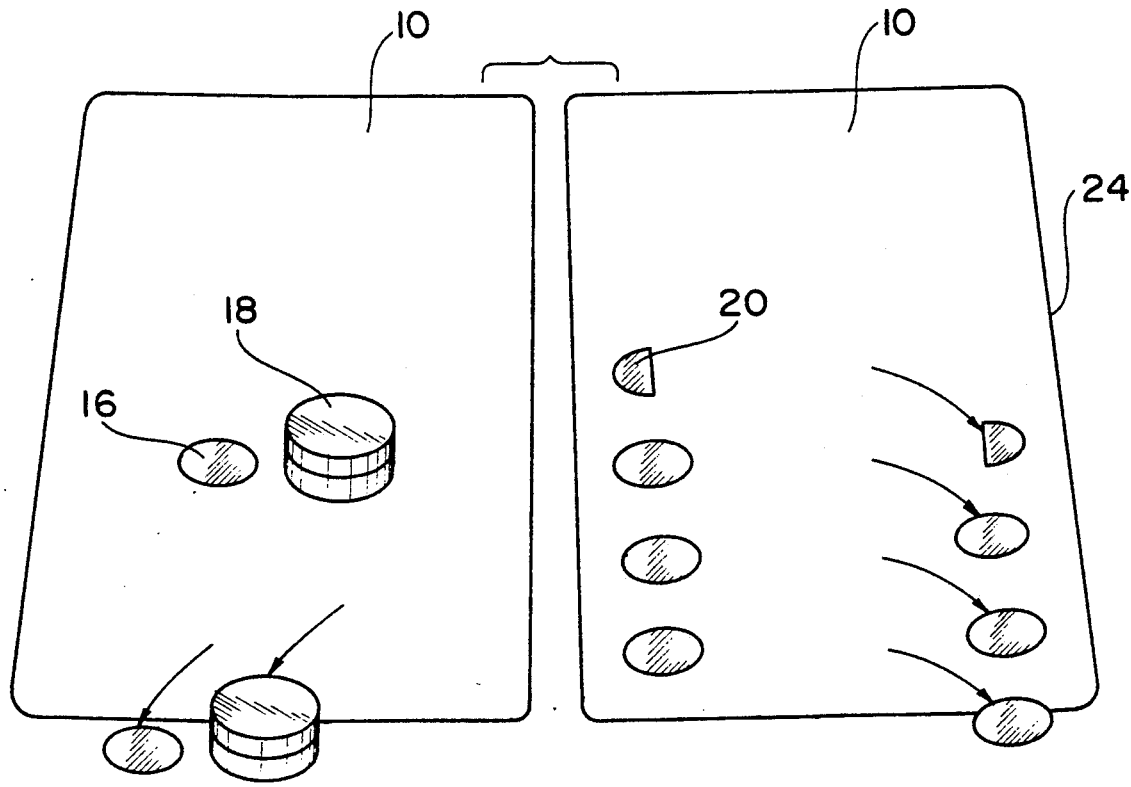
Figure 10I:
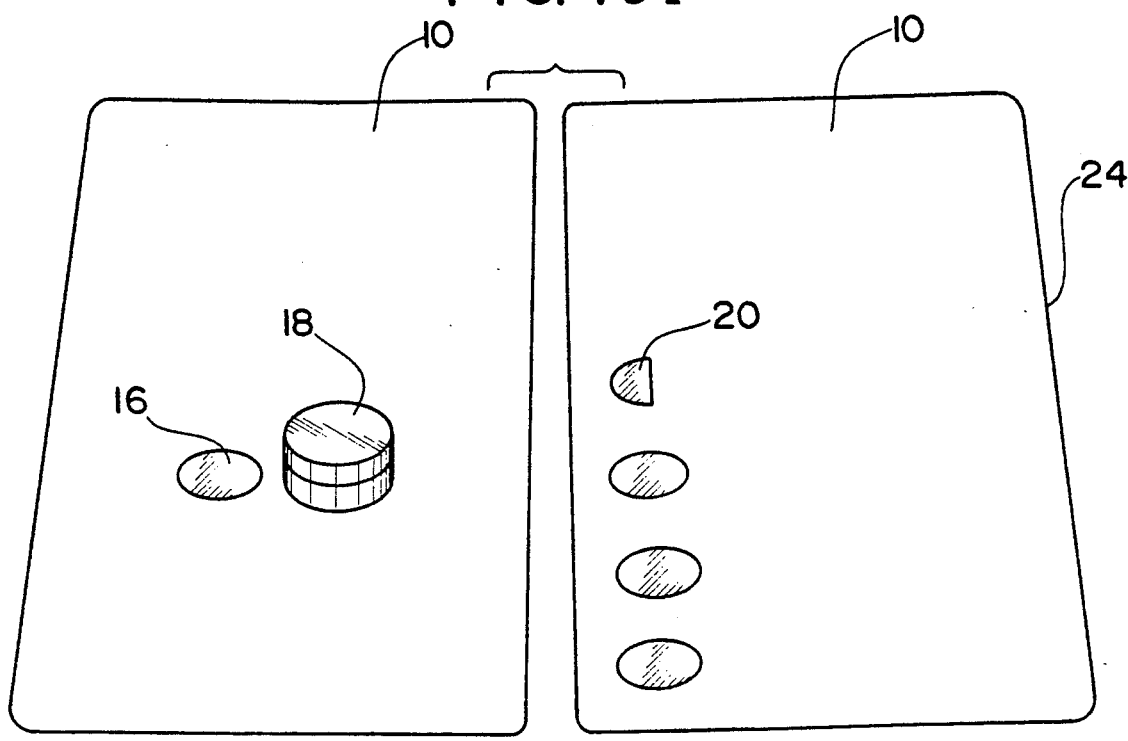
Figure 10J:
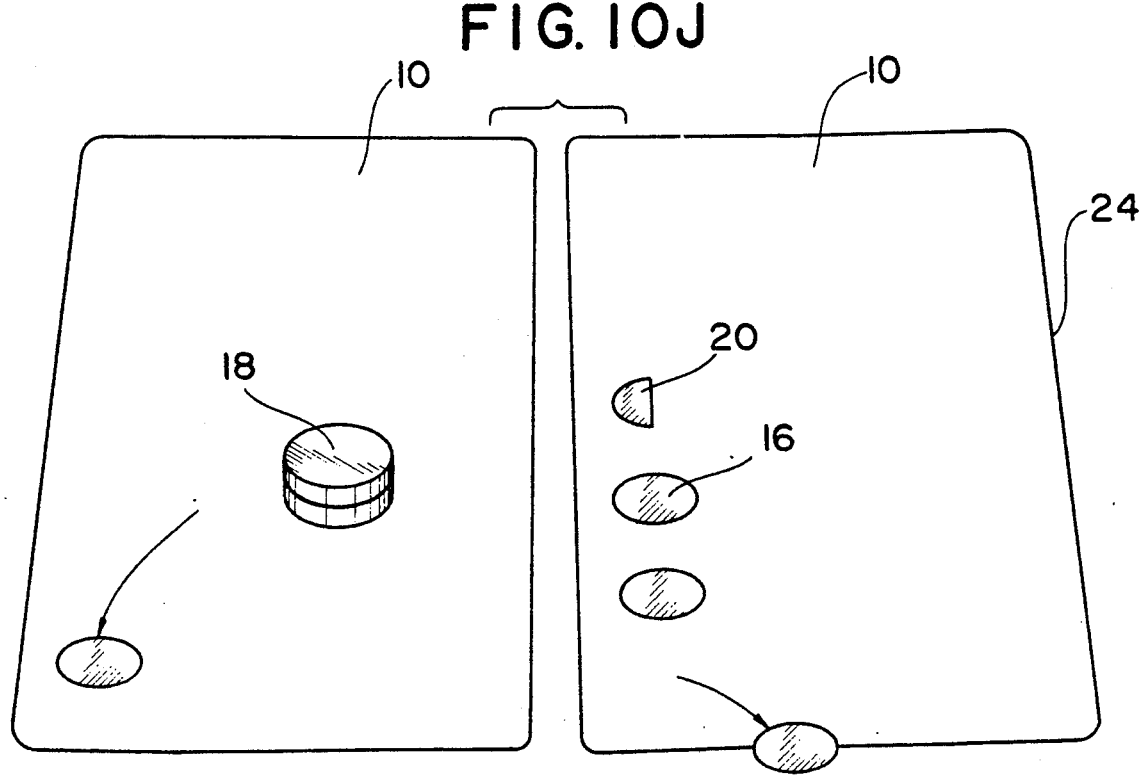
Figure 10K:
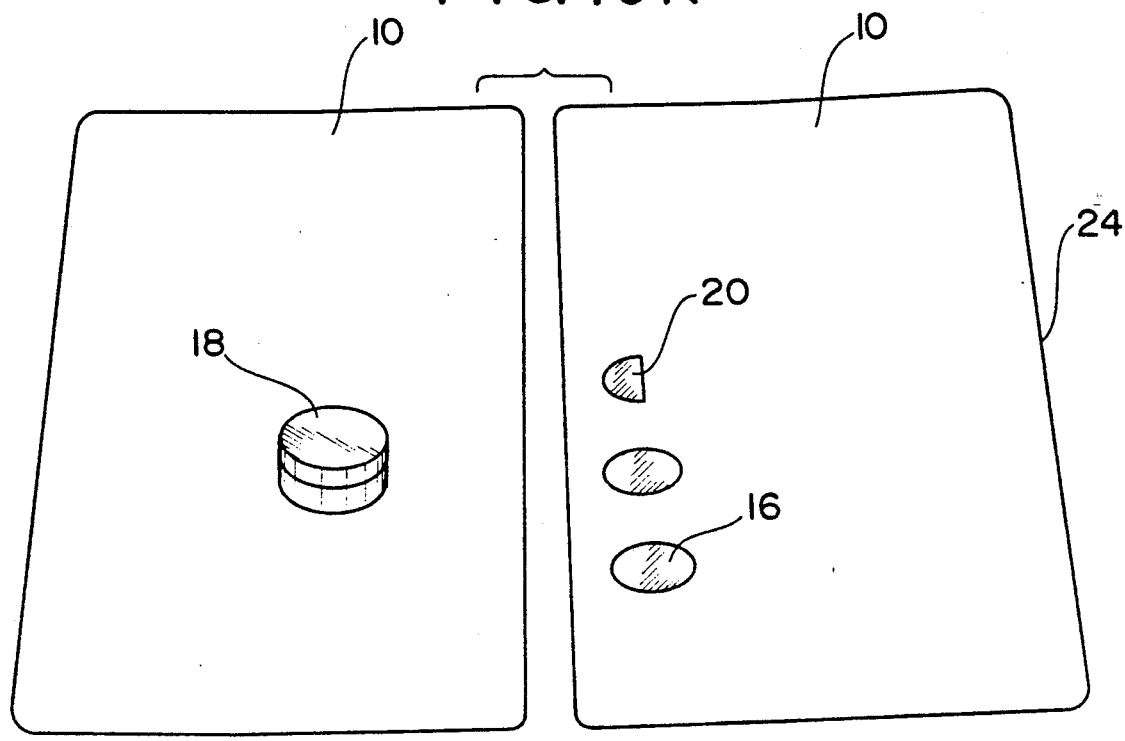

Example 10: FIGS. 10A through K illustrate the application of the invention to solving a linear equation which has a fractional solution, using a strategy which requires the student to approach the problem from a different perspective, namely by applying the division property of equality before applying the subtraction property of equality. FIG. 10A depicts the equation $2d+2c=7d$, or $2+2x=7$. in FIG. 10B, the student must recognize and establish that one of the dots on the right board can be partitioned into two parts, yielding FIG. 10C. In FIG. 10D, the two halves are physically separated, resulting in FIG. 10E. In FIG. 10F, an awareness of two is recognized, yielding the partitioning of FIG. 10G. In FIG. 10H, the repetitions are removed, establishing the equivalent eqality $d+c=3.5d$, or $1+x=3.5$, in FIG. 10I. In FIG. 10J, a dot is removed from each side, yielding the solution $c=2.5d$, or $x=2.5$, in FIG. 10K. Examples 9 and 10 are thus designed to teach the student not to be rigidly tied to one method of solving an equation, but to explore and understand various successful strategies.

Figure 11A:
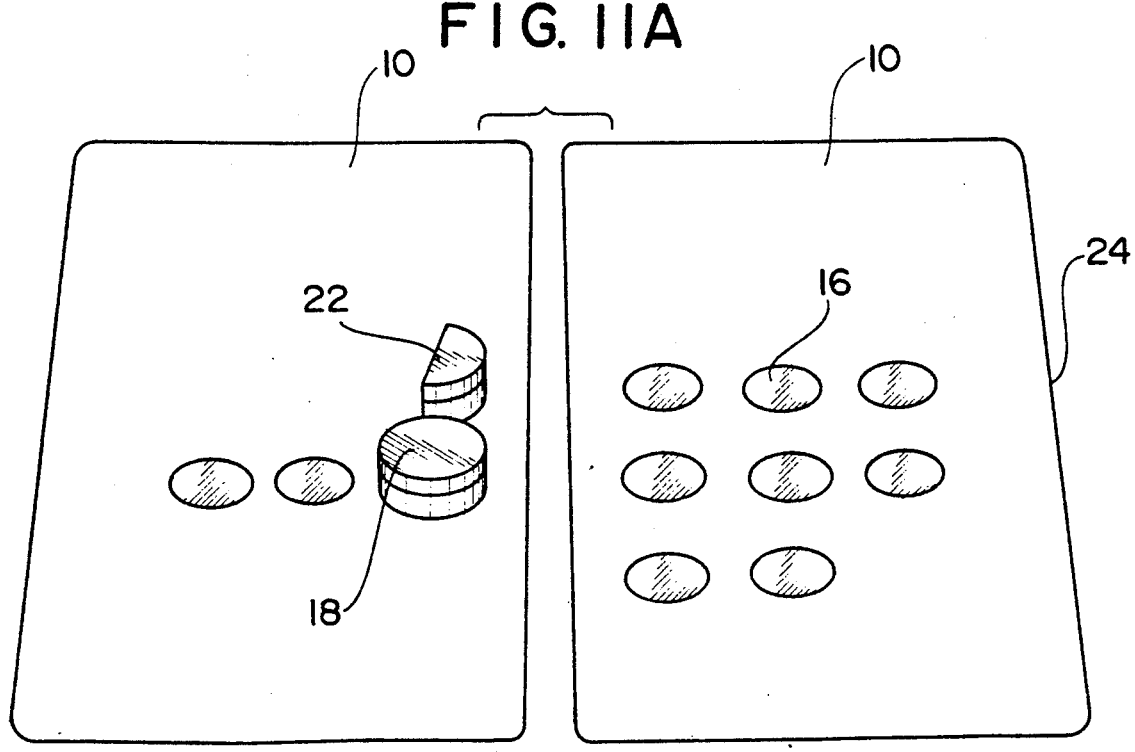
Figure 11B:
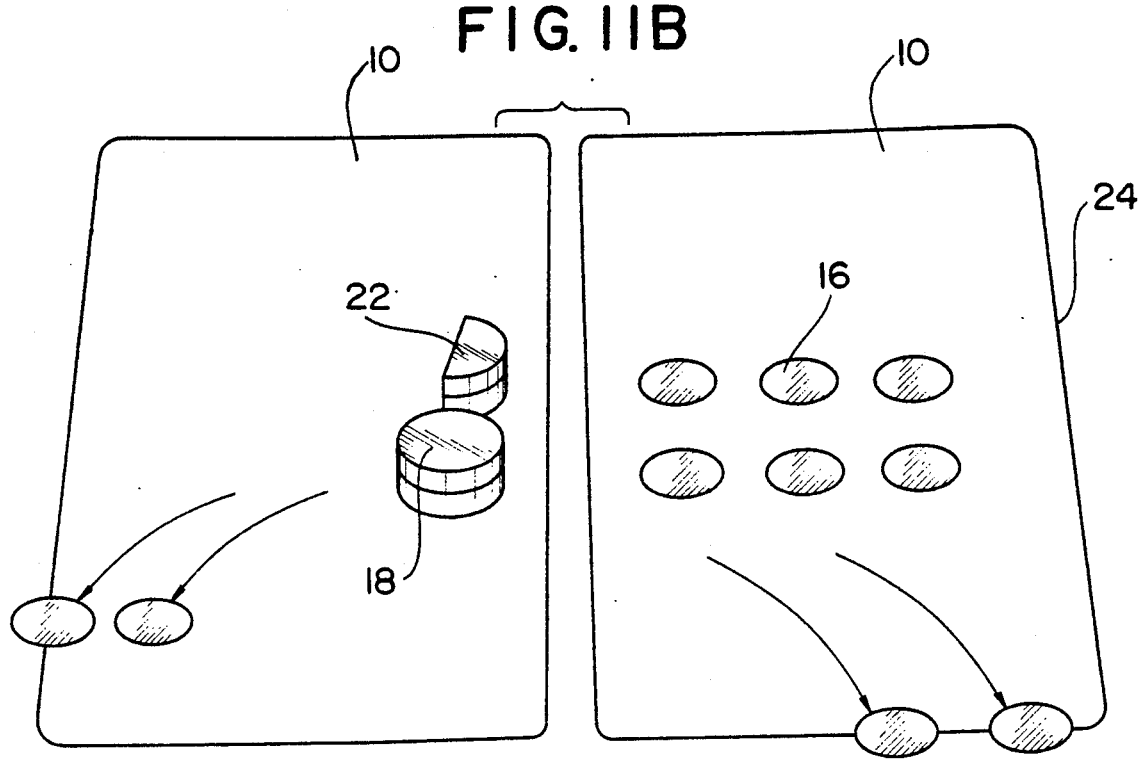
Figure 11C:
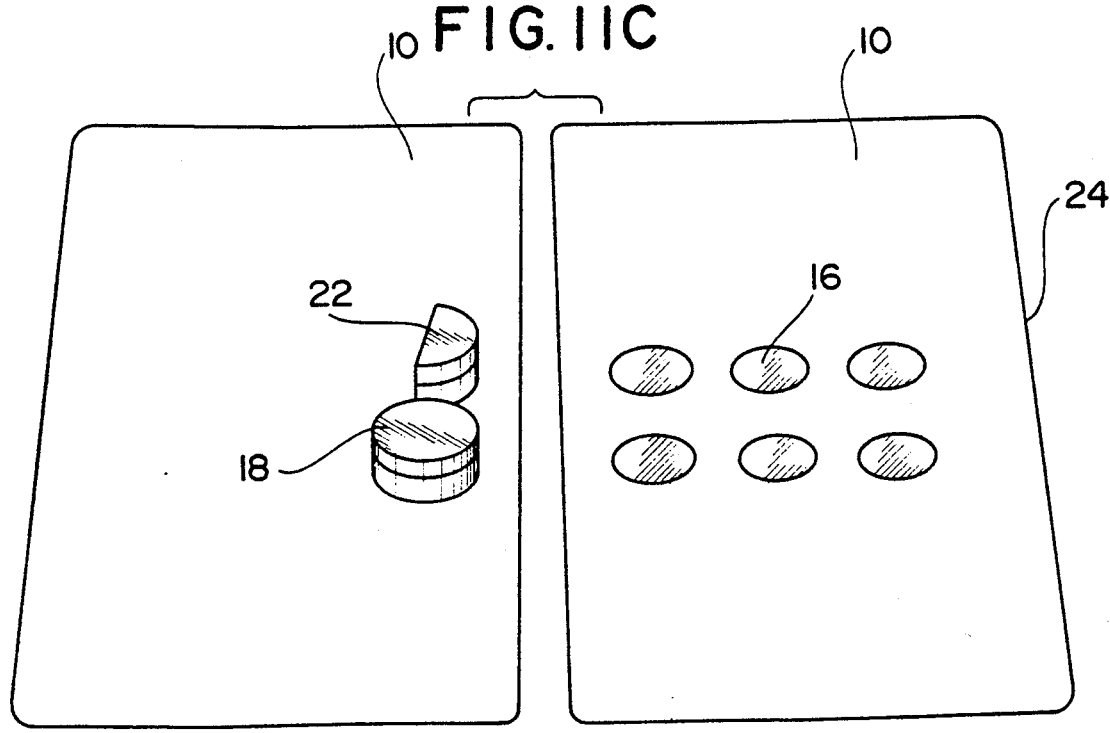
Figure 11D:
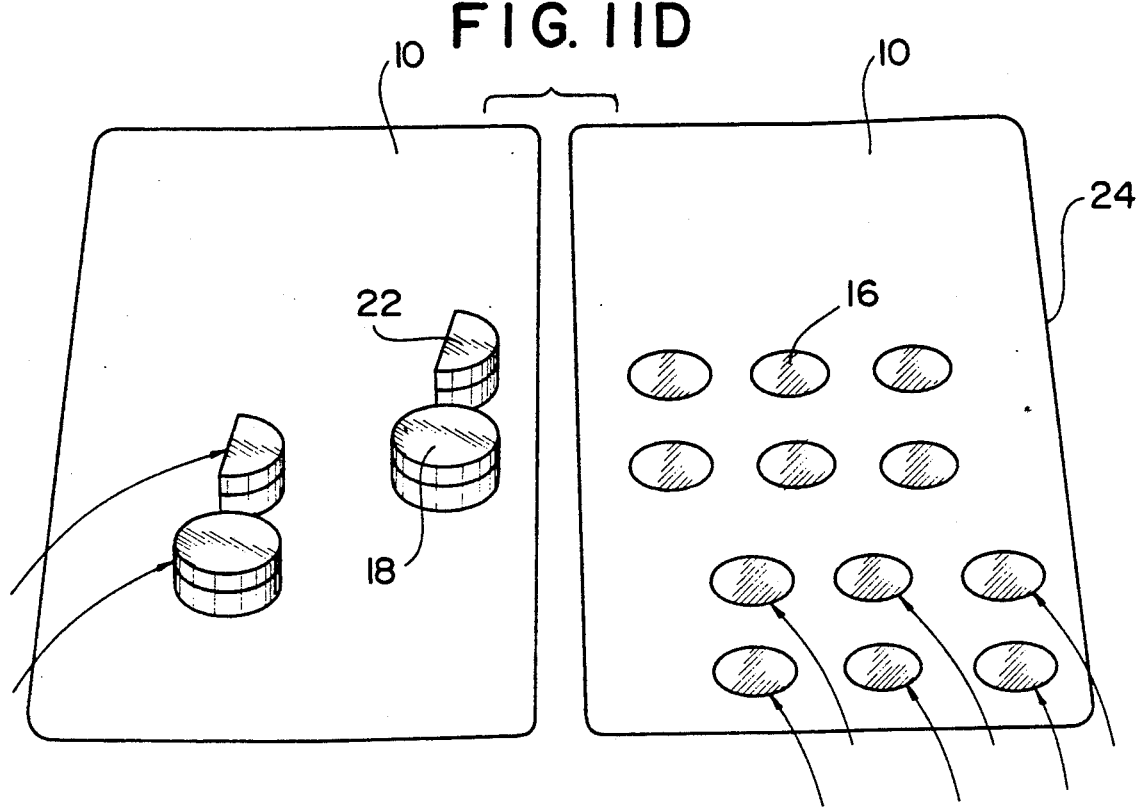
Figure 11E:
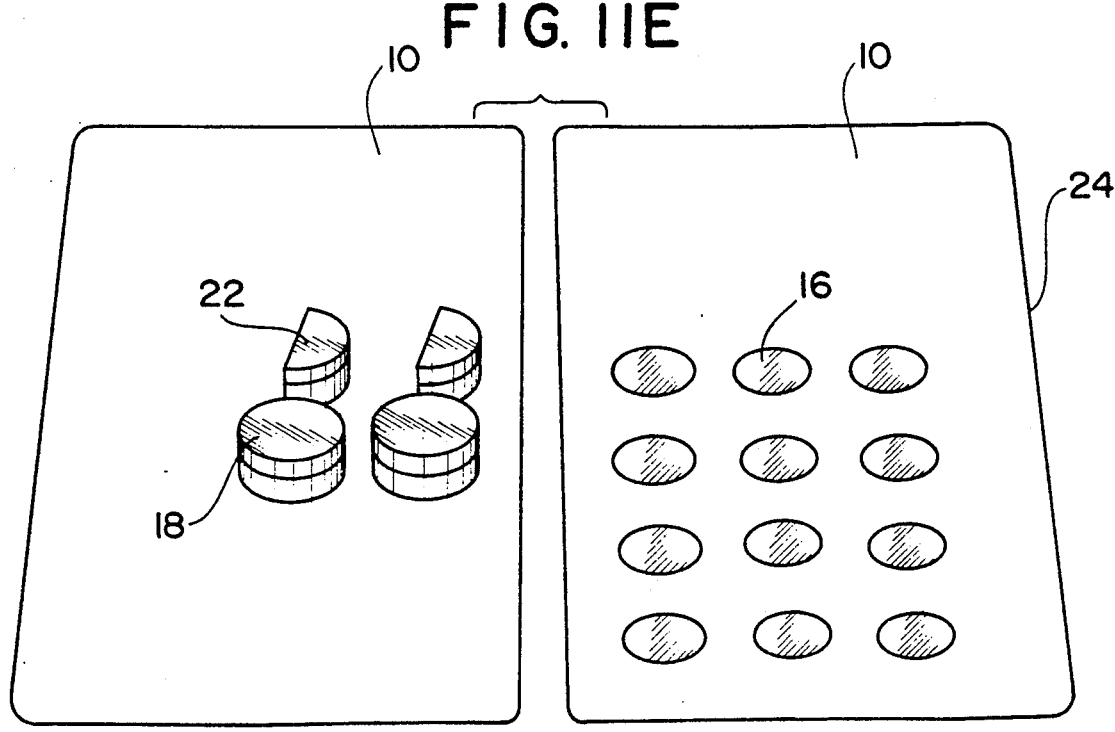
Figure 11F:
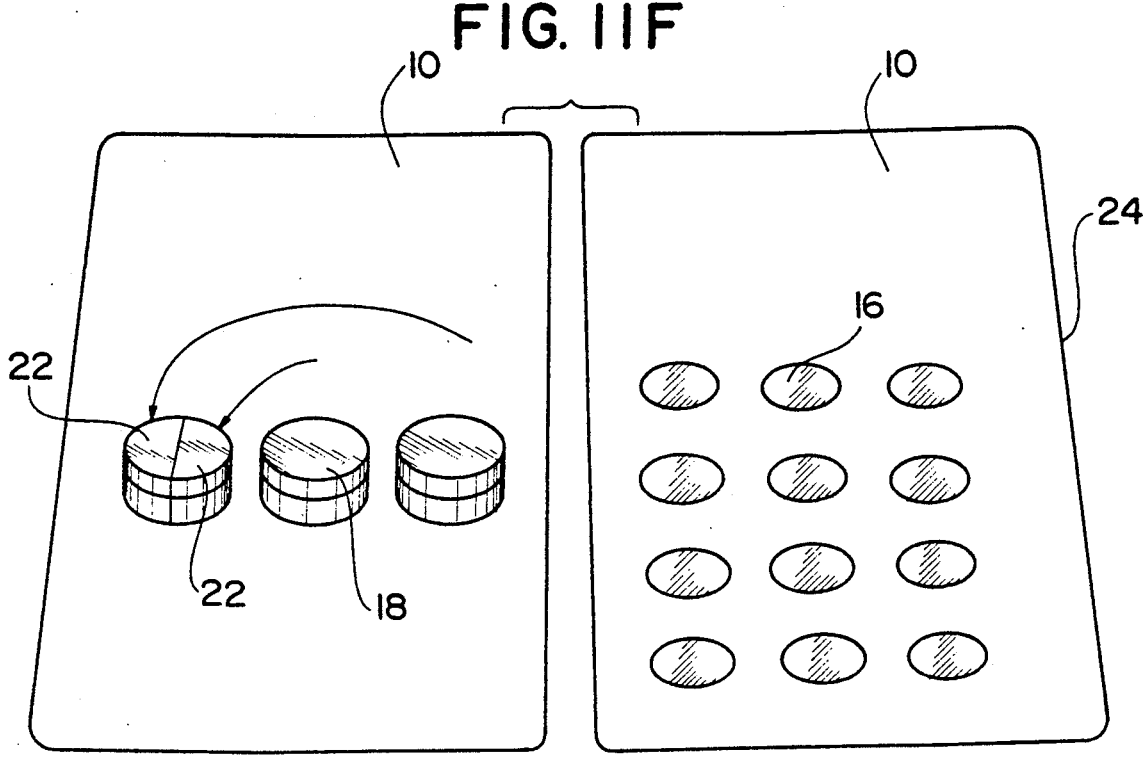
Figure 11G:
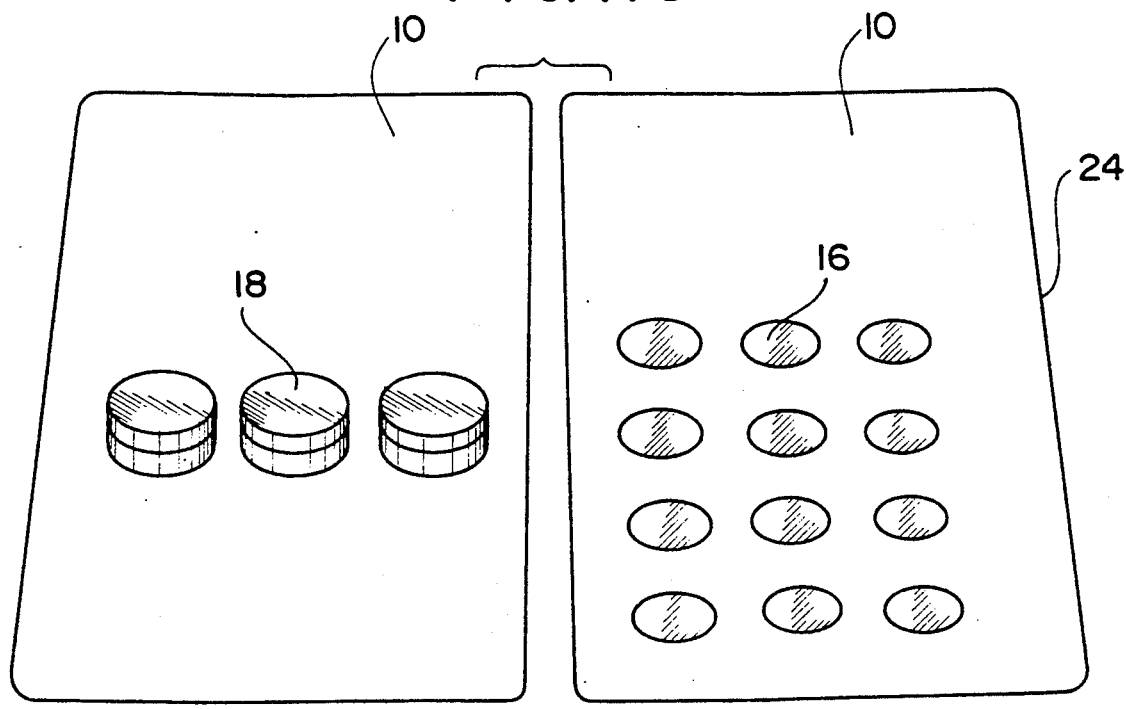
Figure 11J:
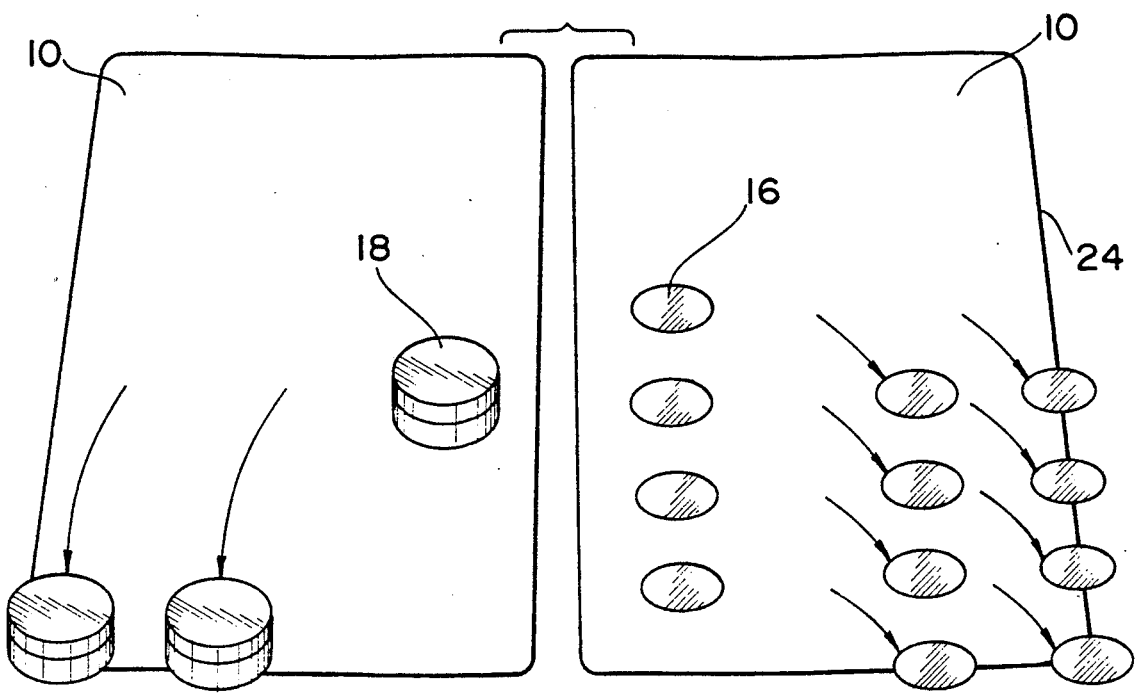
Figure 11K:
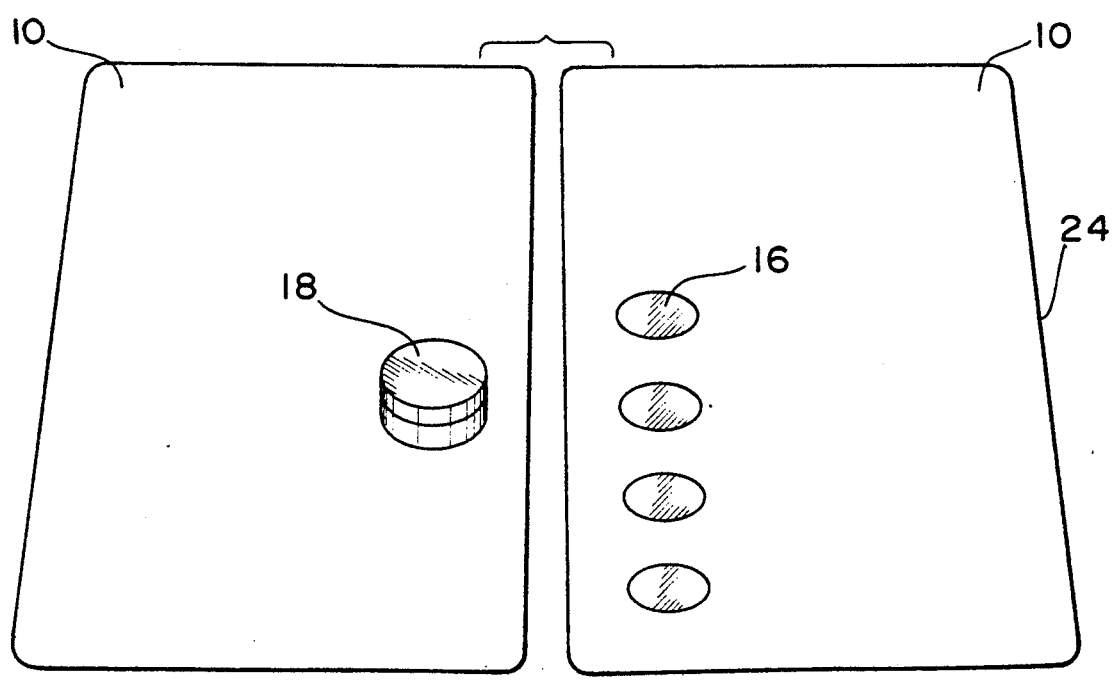

Example 11: FIGS. 11A through K illustrate the application of the invention to solving a linear equation by using the multiplication property of equality, in which both boards are to be equally replicated. FIG. 11A depicts the equation $2d+1.5c=8d$, or $3$ $1.5x=8$. In FIG. 11B, two dots are removed from each board, yielding the equivalent equality $1.5c=6d$, or $1.5x=6$, of FIG. 11C. In FIG. 11D, it is recognized that each board must be duplicated to create an integral number of cans on the left board. This is performed, resulting in FIG. 11E. In FIG. 11F, the two half cans are physically joined to create the equivalent equality $3c=12d$, or $3x=12$, of FIG. 11G. In FIG. 11H, an awareness of three repetitions is recognized, resulting in the partitioning of FIG. 11I. In FIG. 11J, the repetitions are removed from each board, yielding the solution $c=4d$, or $x=4$, in FIg. 11K. As with Examples 9 and 10, the student could replicate before subtracting as an alternative strategy.

Figure 12A:
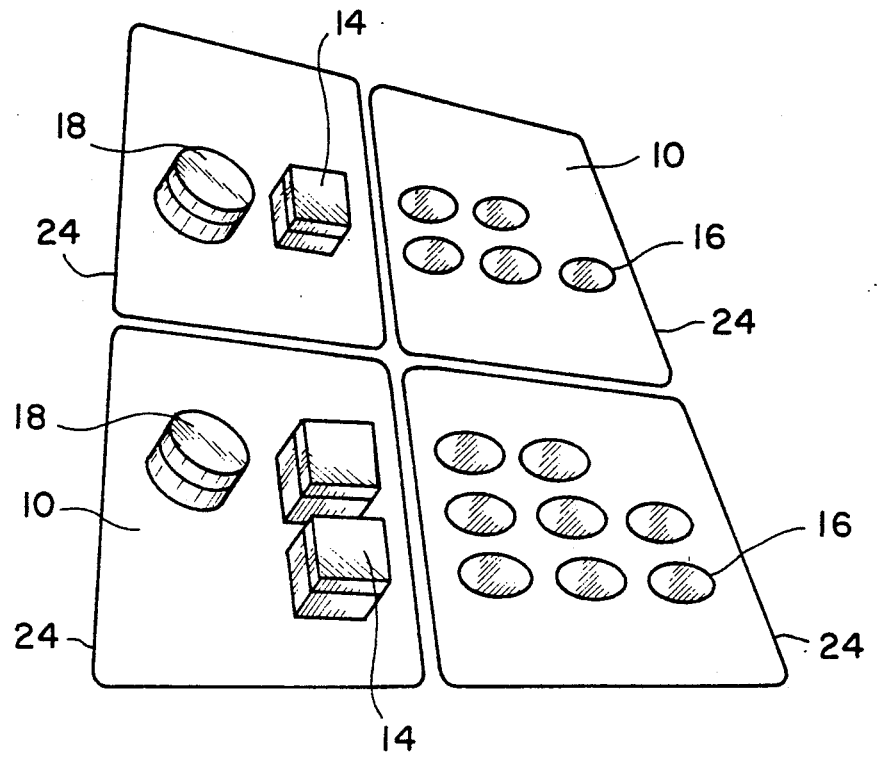
FIGS. 12A through G illustrate a four-board system used for the solution of a system of two linear equations requiring as an initial step a technique commonly known as "linear combinations".
Figure 12B:
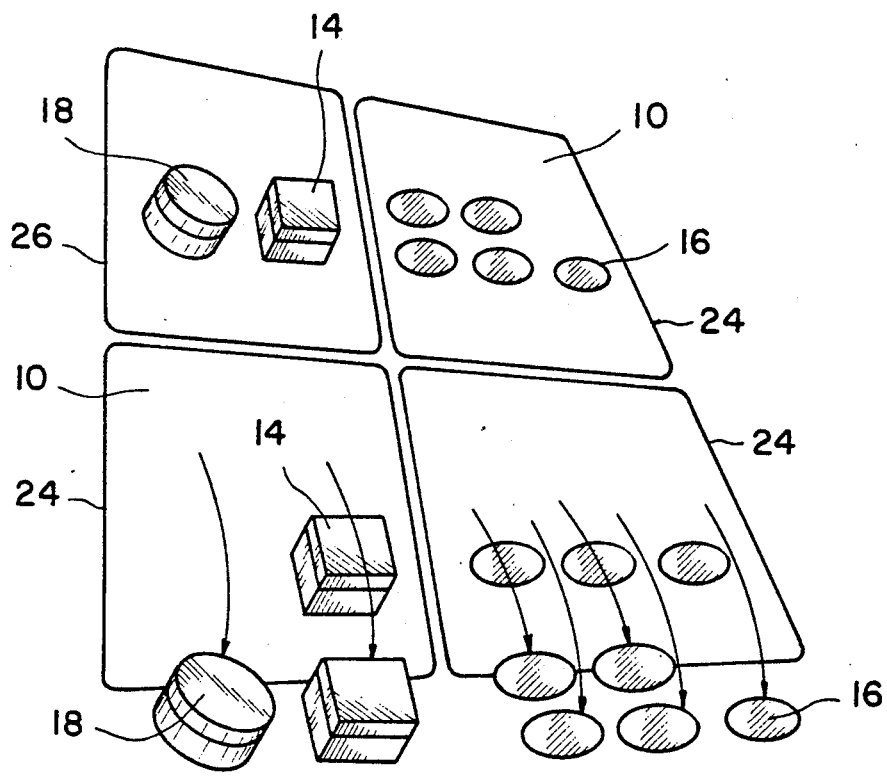
Figure 12:
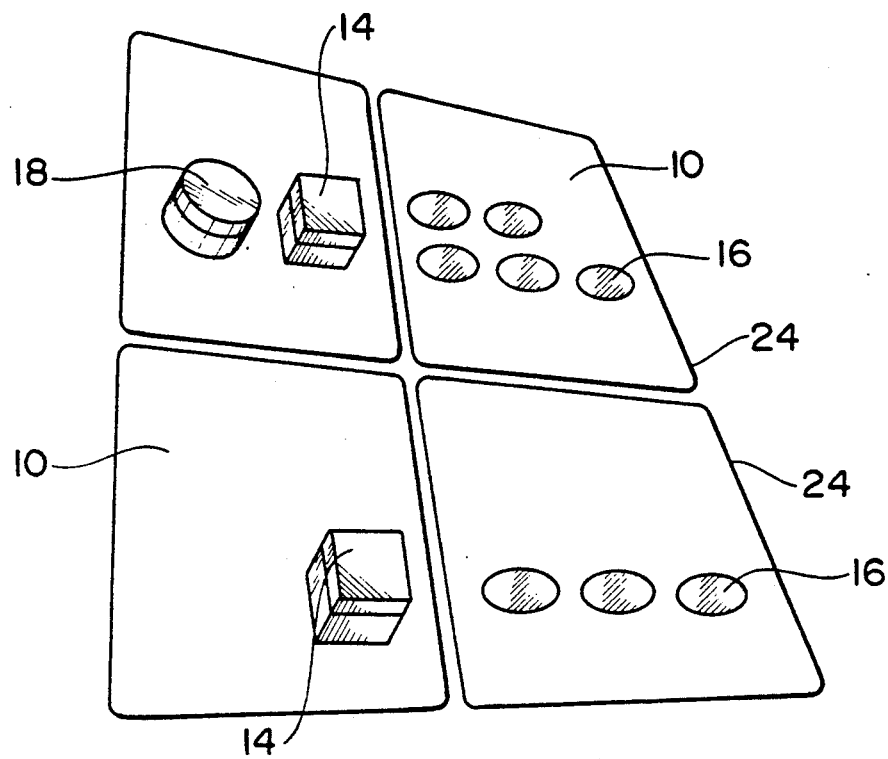
Figure 12:
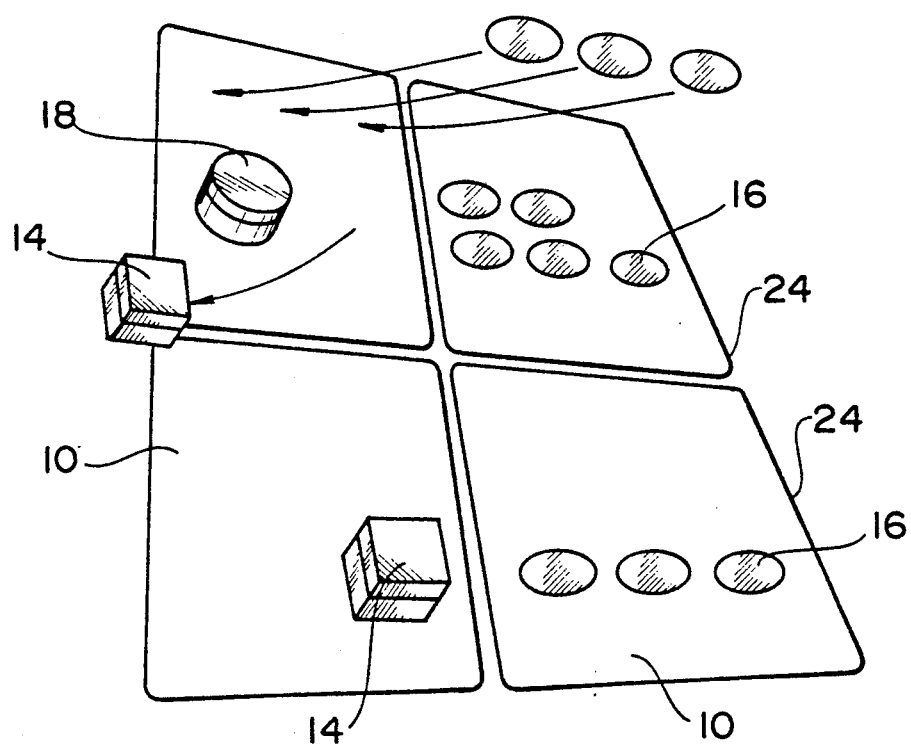
Figure 12E:
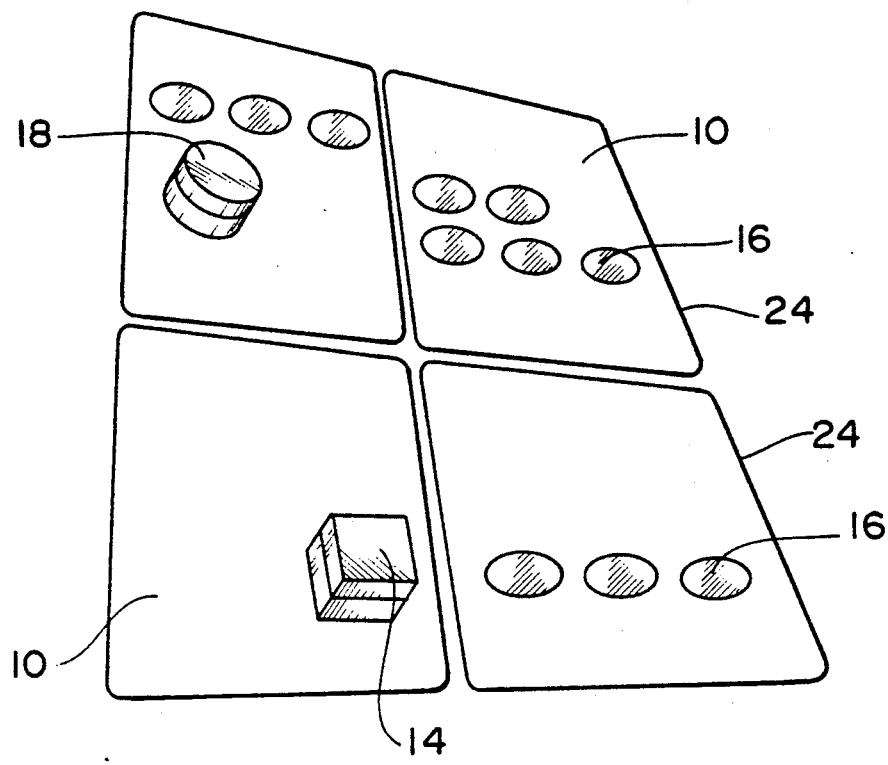
Figure 12F:
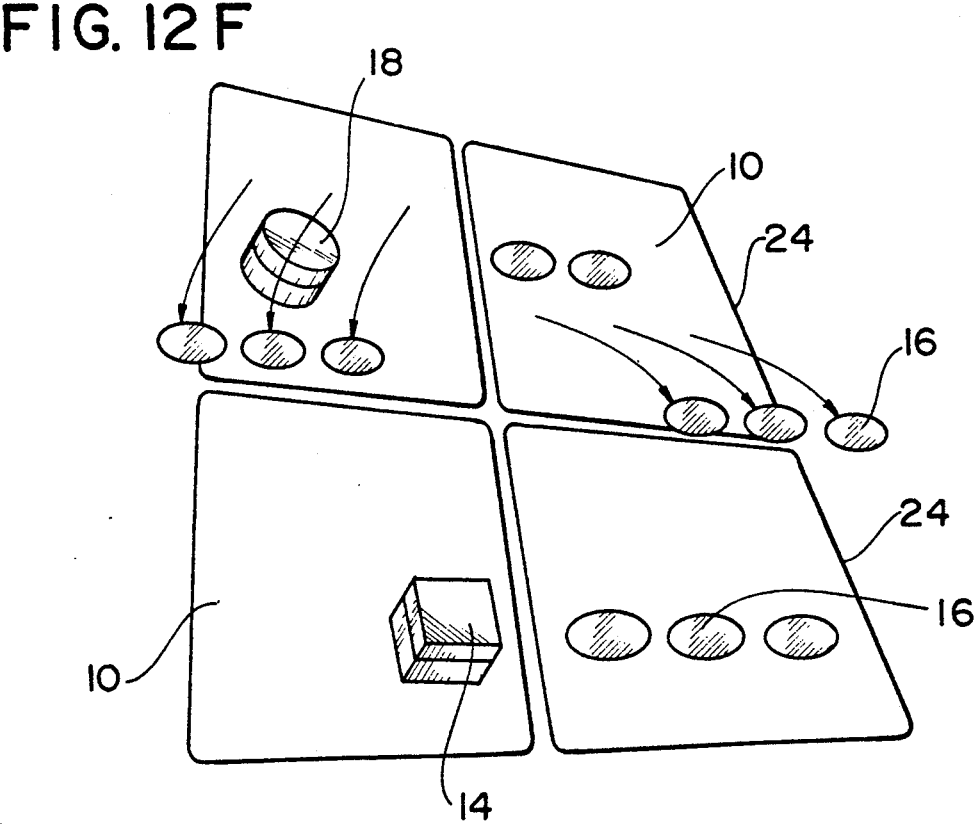
Figure 12G:
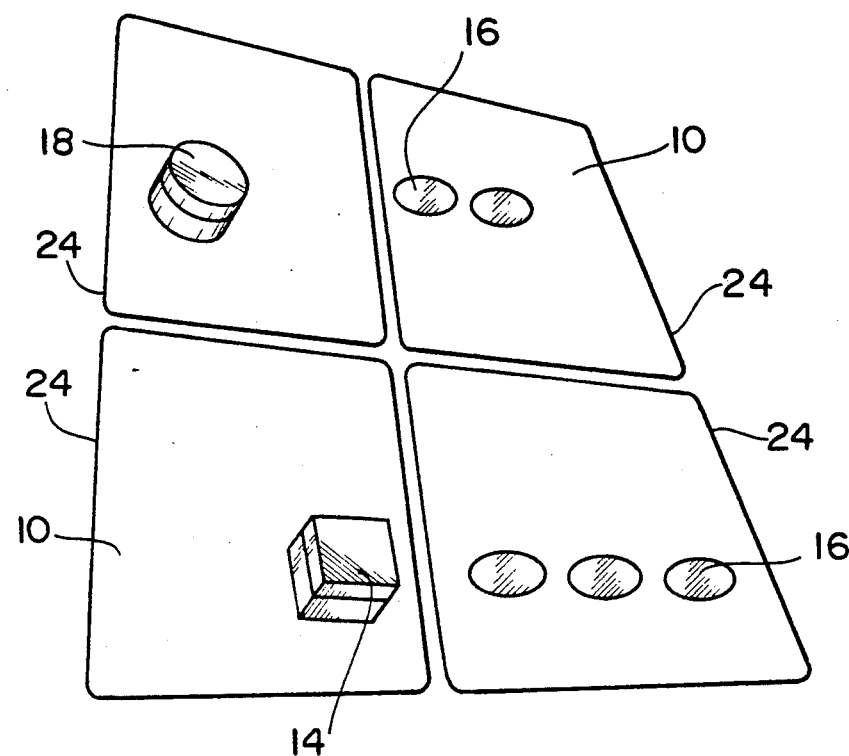

Example 12: FIGS. 12A through G illustrate the application of the invention to solving a system of two linear equations, using a strategy commonly known as "linear combinations". The boards are interpreted horizontally in pairs to indicate each equation. FIG. 12A depicts the system ($c+b$ $=5d$ and $c+2b=8d$), or $\{x+y=5$ and $x+2y=8\}$. The student will recognize that because of the equality represented by the upper boards, a subtraction can be made in either form (i.e. a can and a box, or five dots) from each side of the equation represented by the lower boards. This is the essence of the linear combination method. Accordingly, in FIG. 12B, the equivalent groups of the upper boards are subtracted respectively from the lower boards, yielding the equivalent system $\{c+b=5d$ and $b=3d\}$, or $\{x+y=5$ and $y=3\}$, in FIG. 12C. Since it is now known that $b=3d$, or $y=3$, is one of the solutions, a substitution can be made on the upper left board in FIG. 12D, replacing the box with the three dots and yielding the equivalent system $\{c+3d=5d$ and $b=3d\}$, or $\{x+3=5$ and $y=3\}$, in FIG. 12E. Three dots are removed from each of the upper boards in FIG. 12F, resulting in the solution $\{c=2d$ and $b=3d\}$, or $\{x=2$ and $y=3\}$, in FIg. 12G. In the lower grade levels, the cans and boxes can be actually opened to reveal the correct number of dots.

Figure 13A:
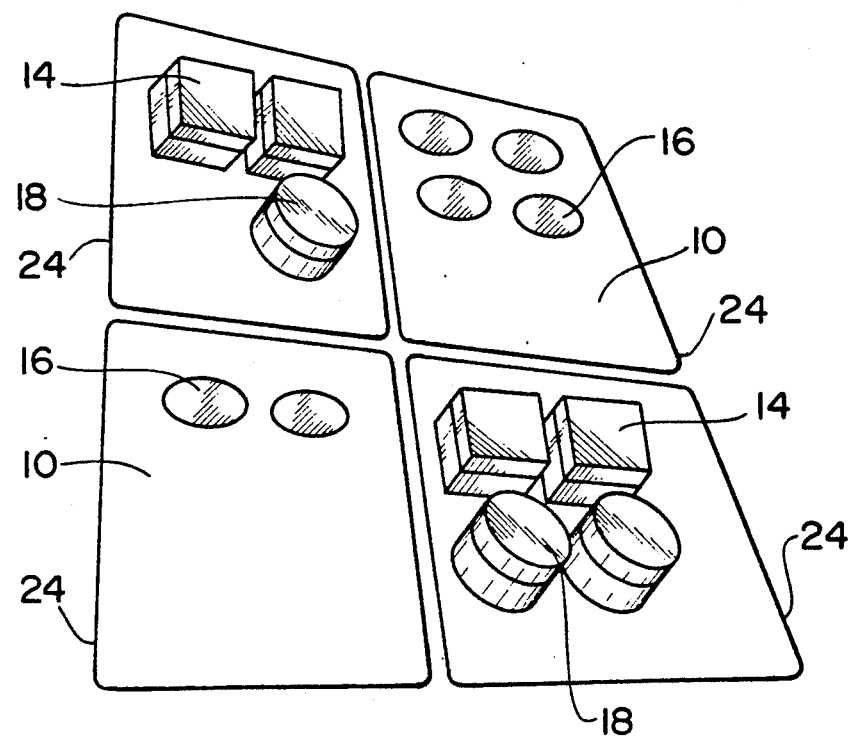
FIGS. 13A through S illustrate a four-board system used for the solution of a system of linear equations requiring as an initial step a technique commonly known as "substitution".
Figure 13B:
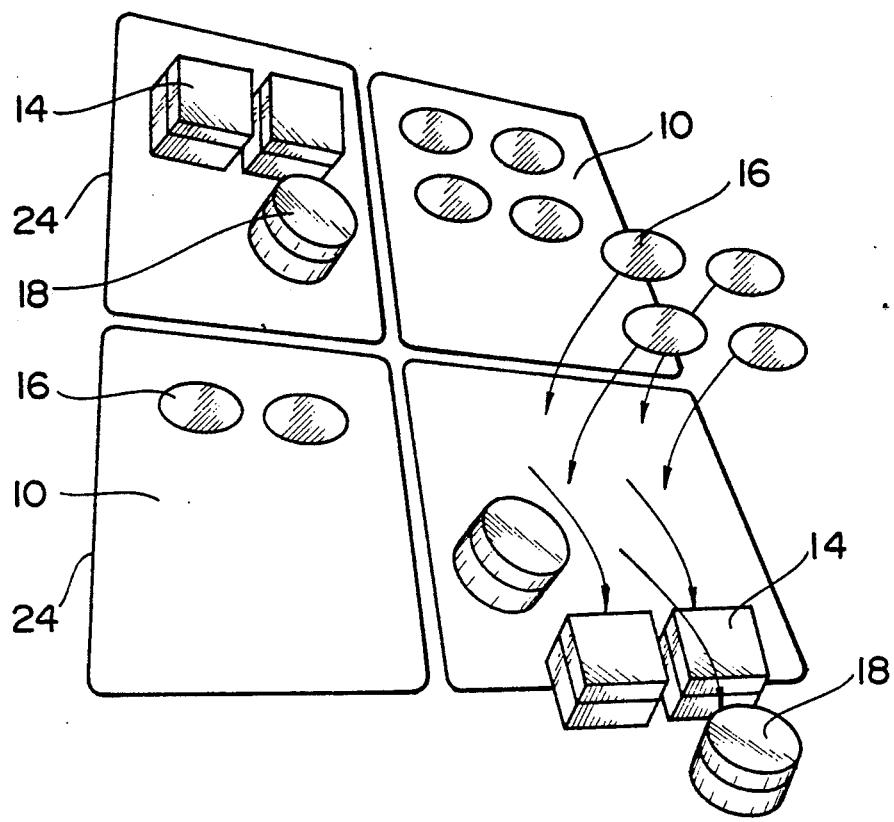
Figure 13C:
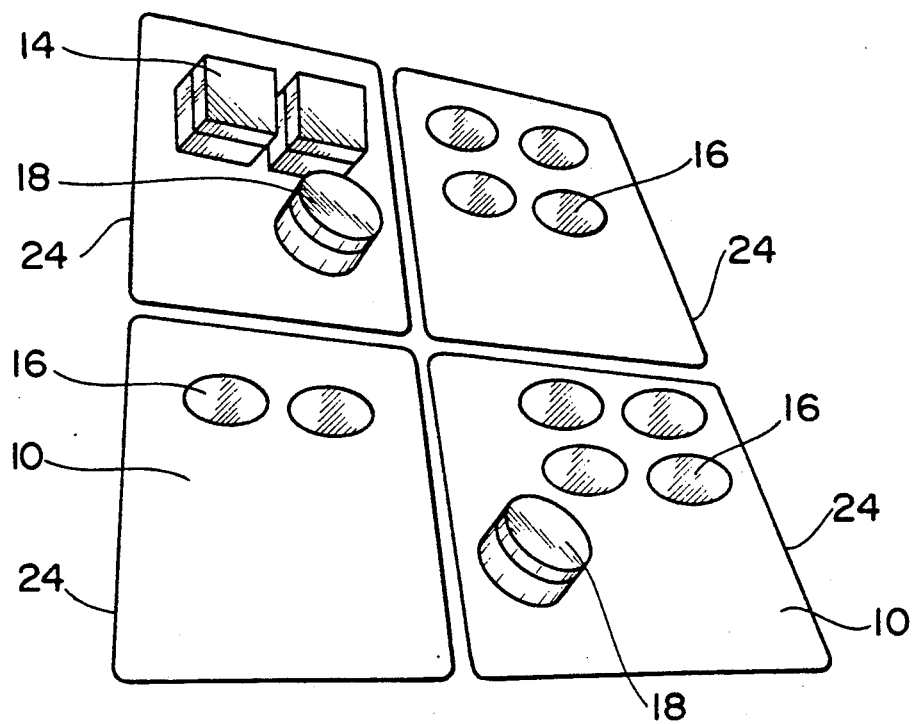
Figure 13D:
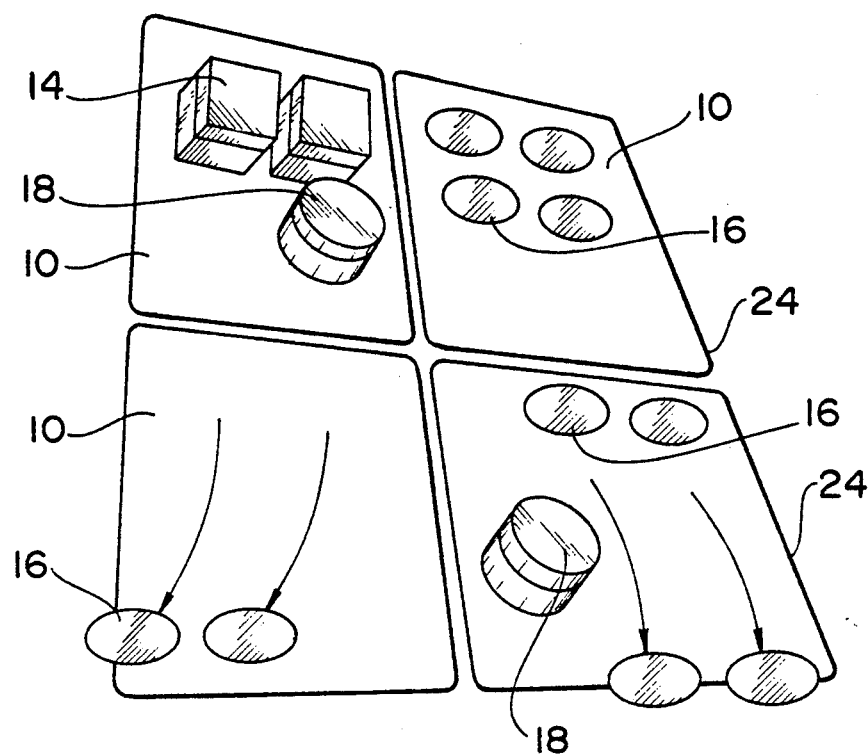
Figure 13E:
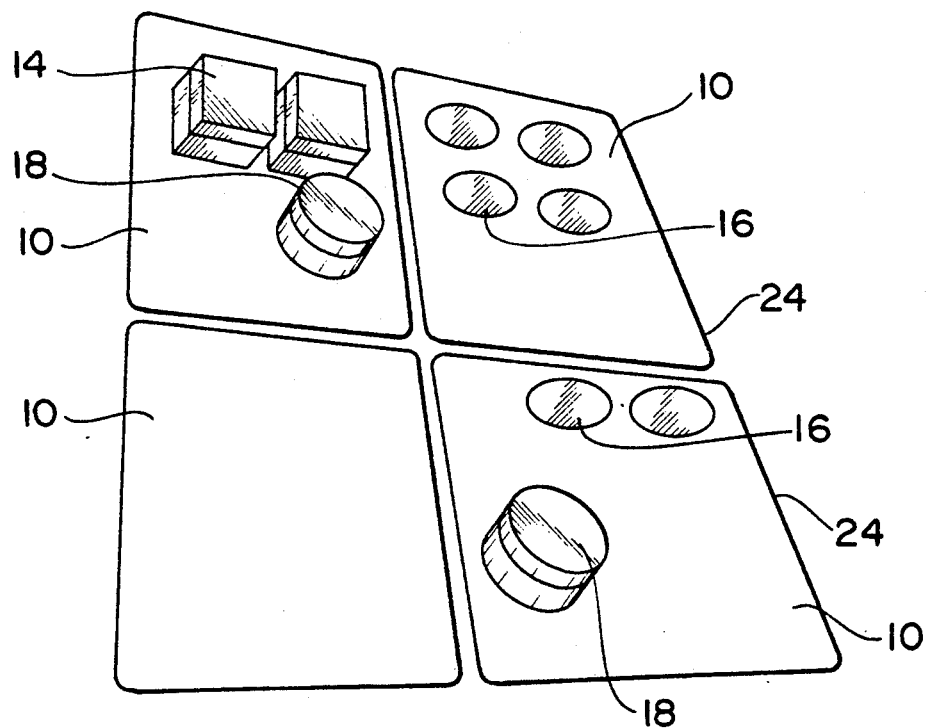
Figure 13F:
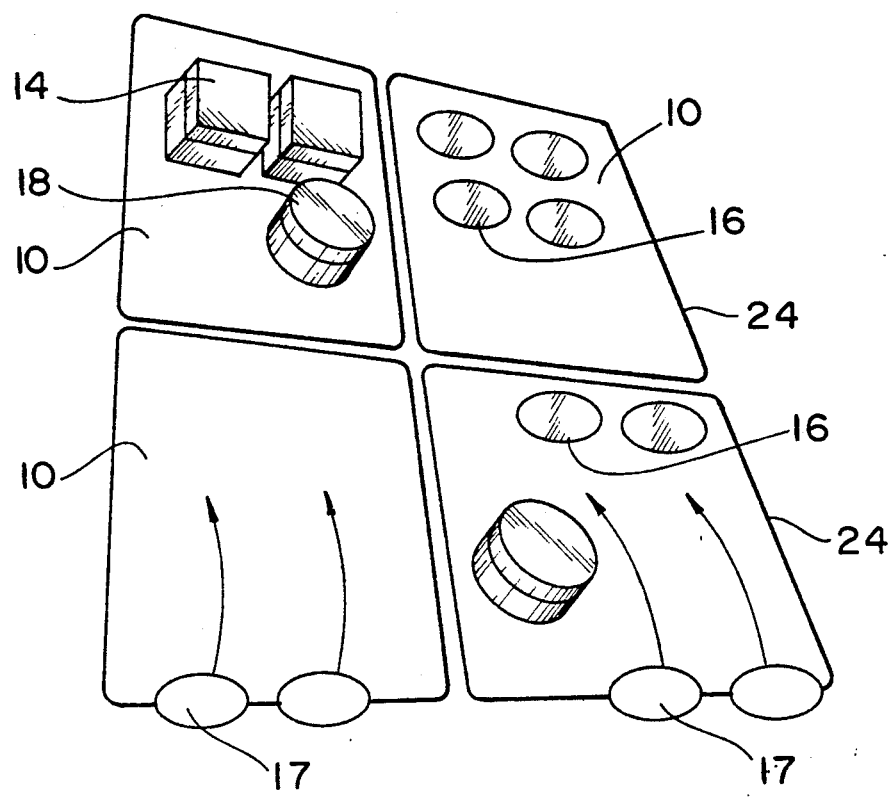
Figure 13G:
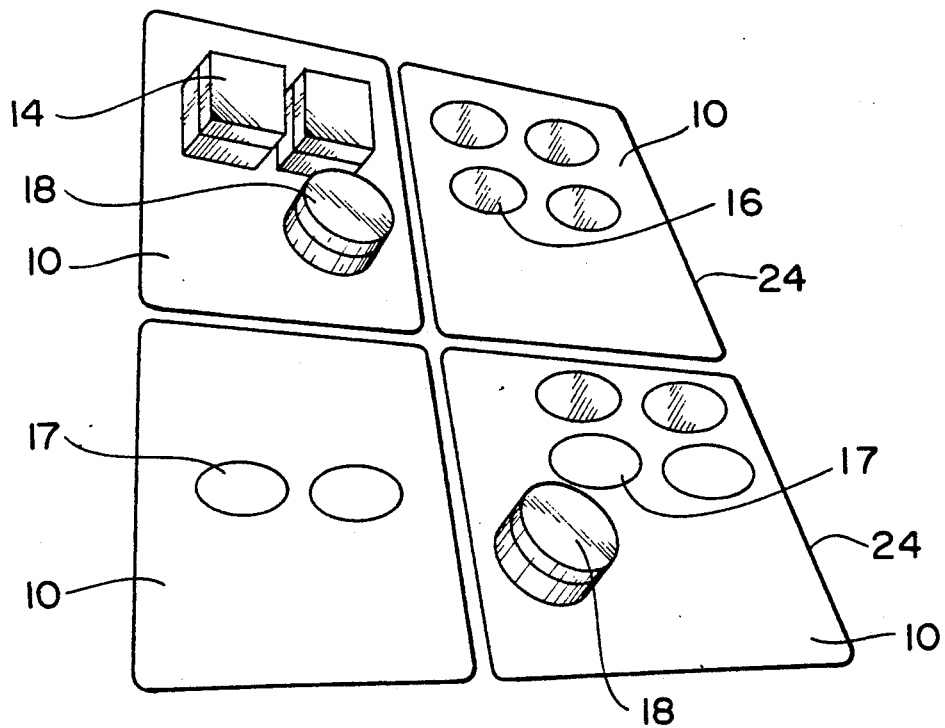
Figure 13:
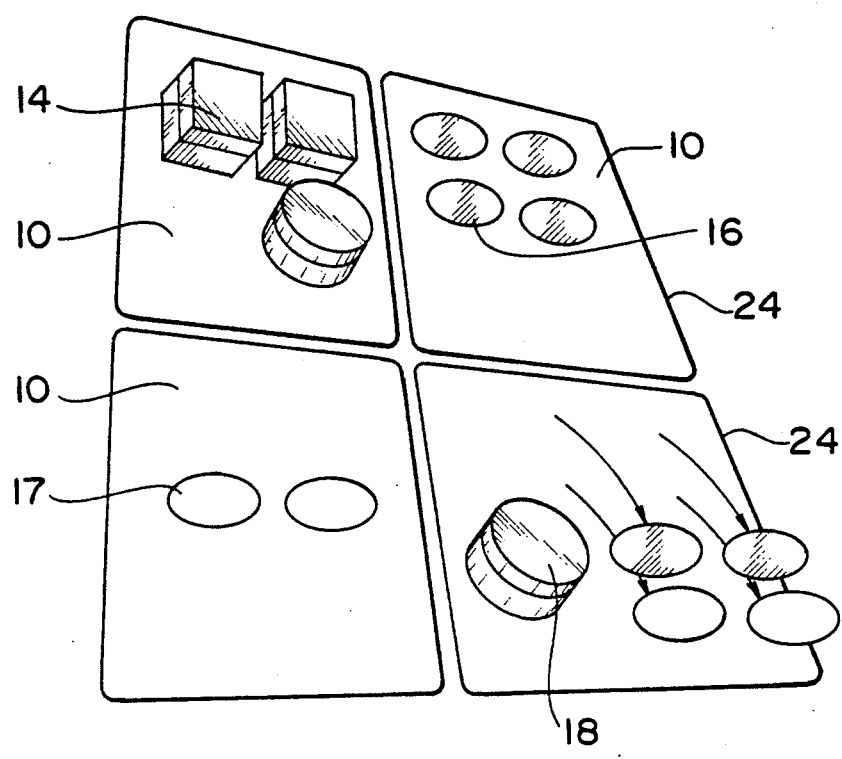
Figure 13:
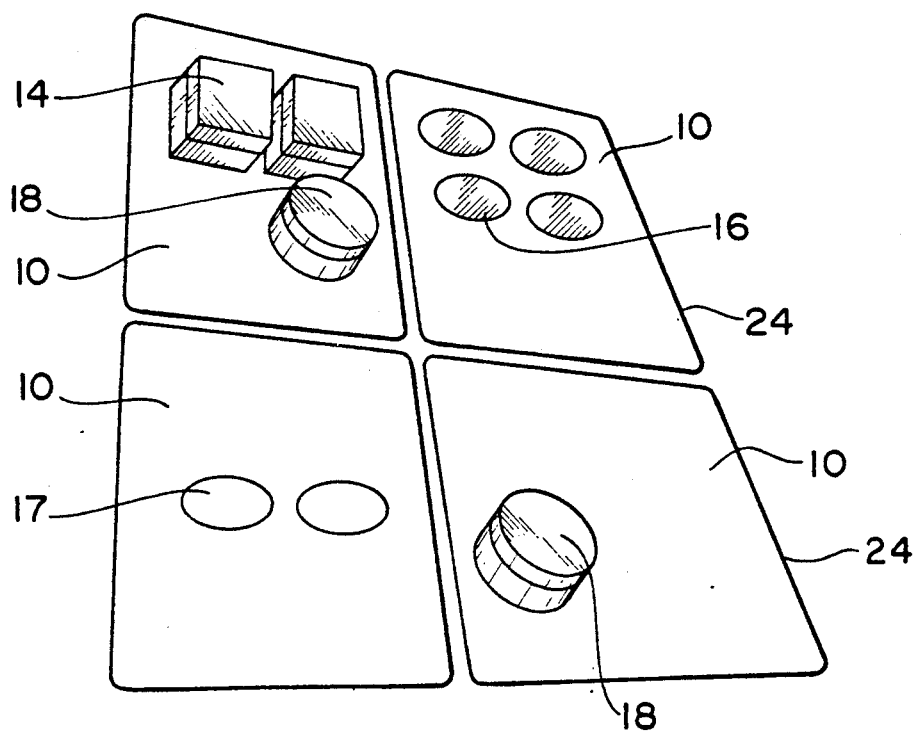
Figure 13:
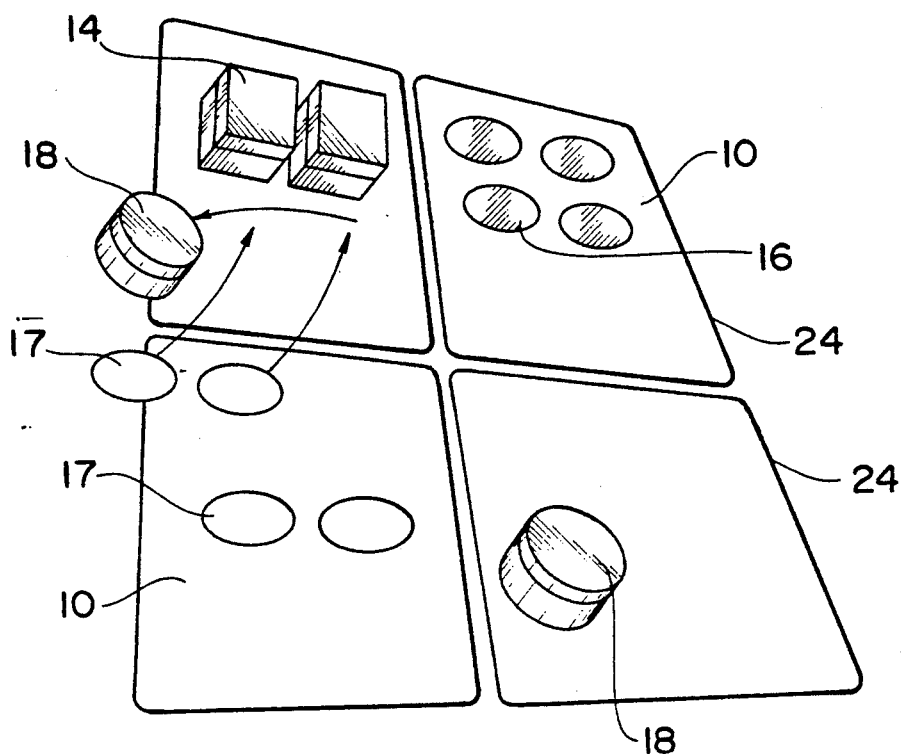
Figure 13:
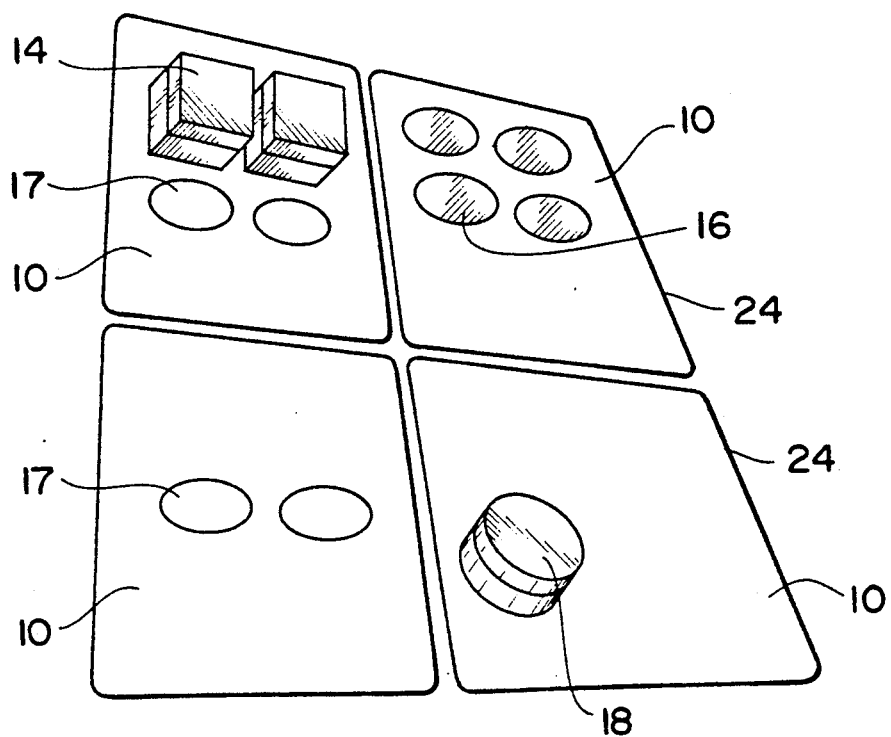
Figure 13L:
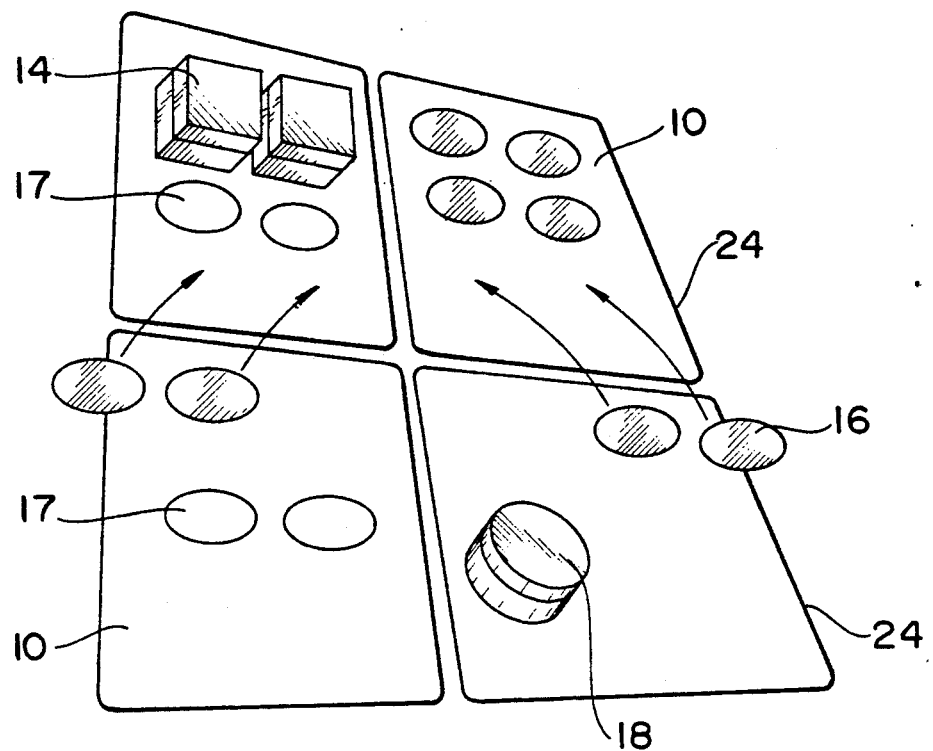
Figure 13M:
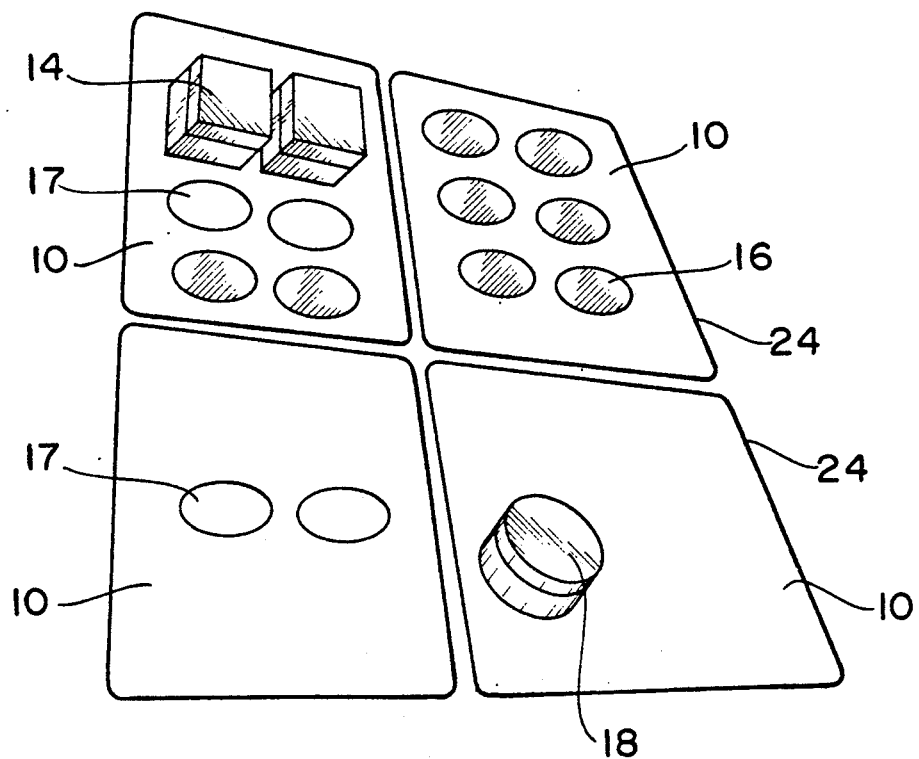
Figure 13:
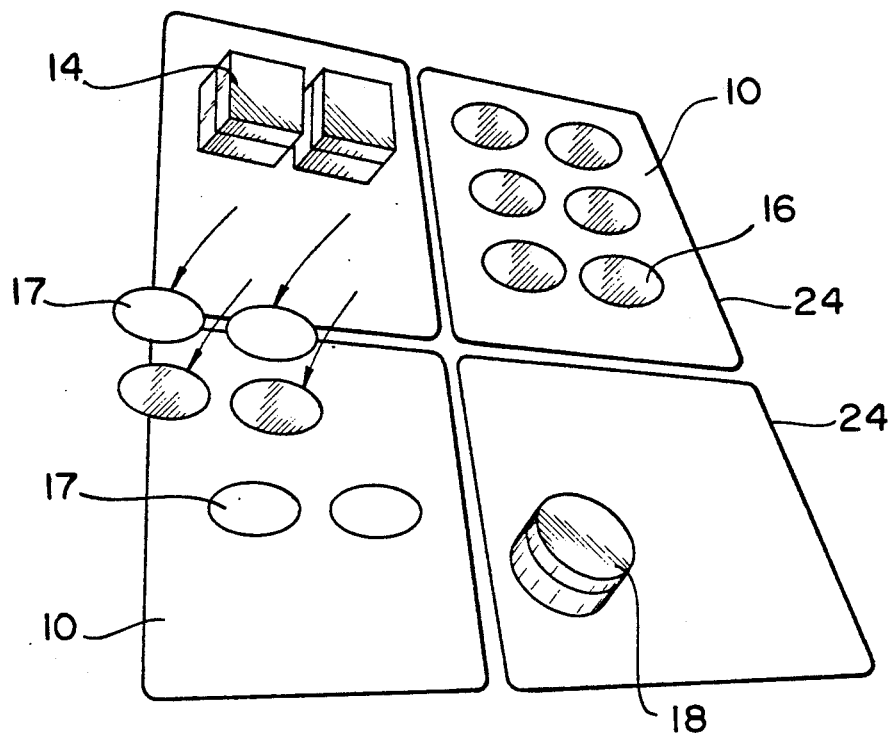
Figure 13:
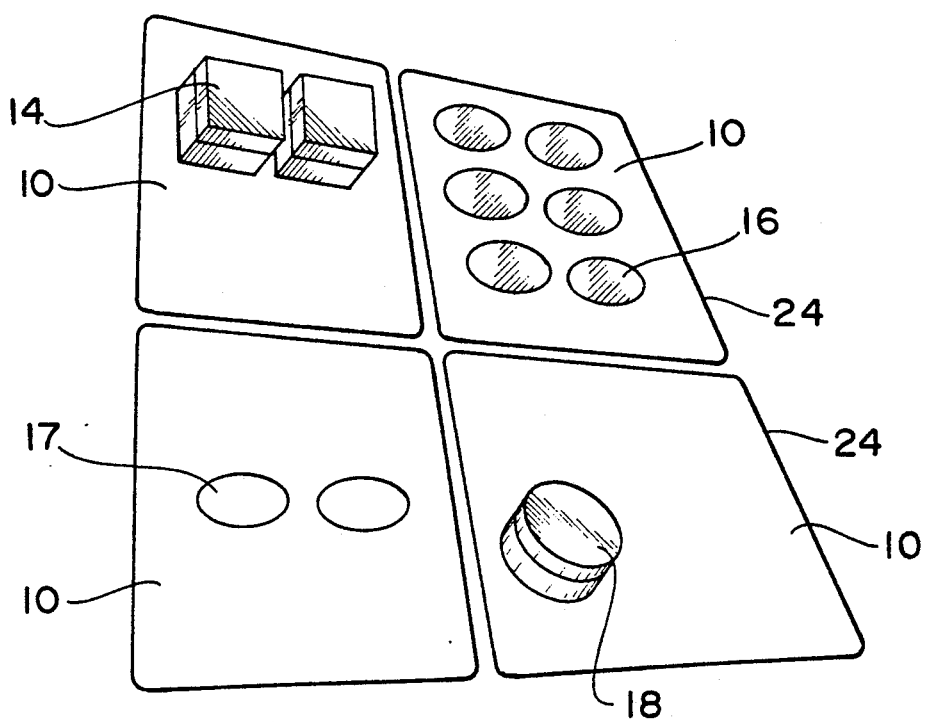
Figure 13P:
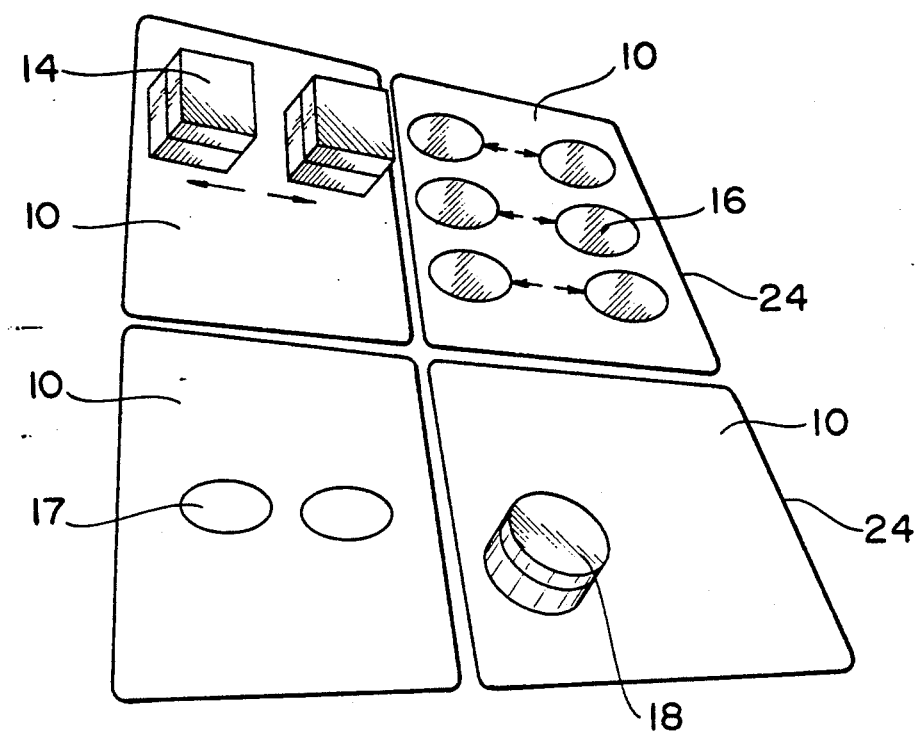
Figure 13Q:
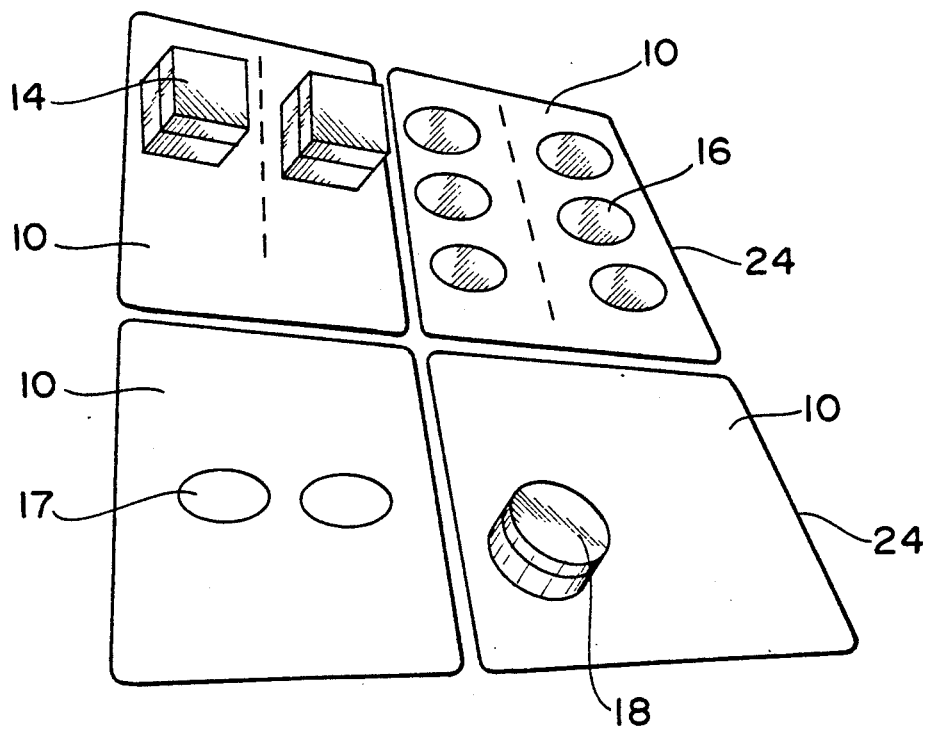
Figure 13R:
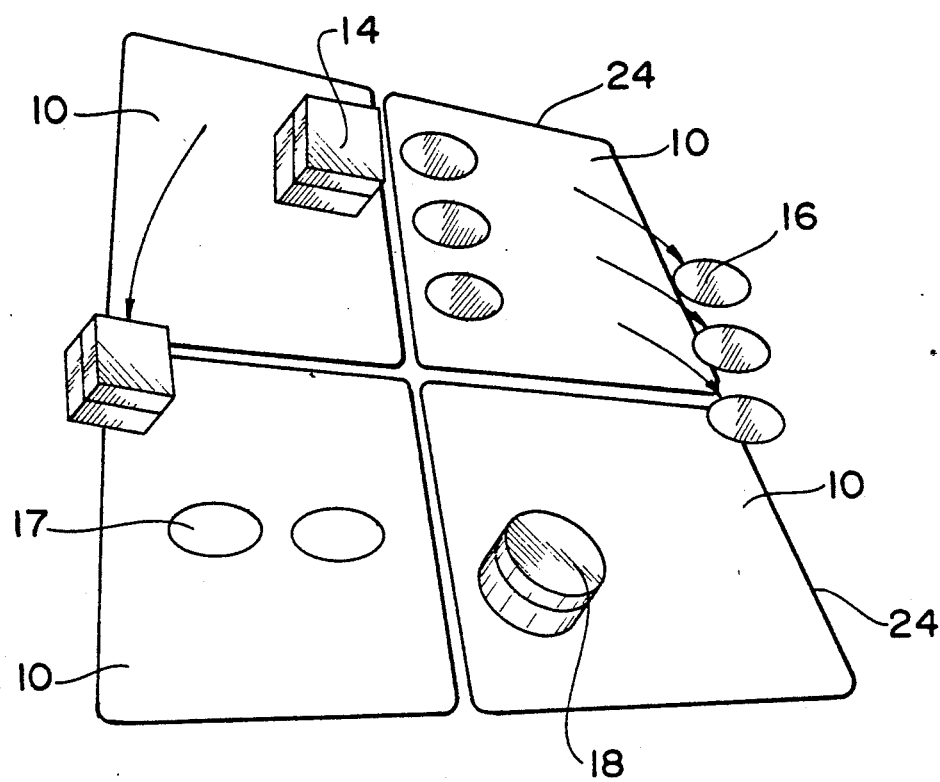
Figure 13S:
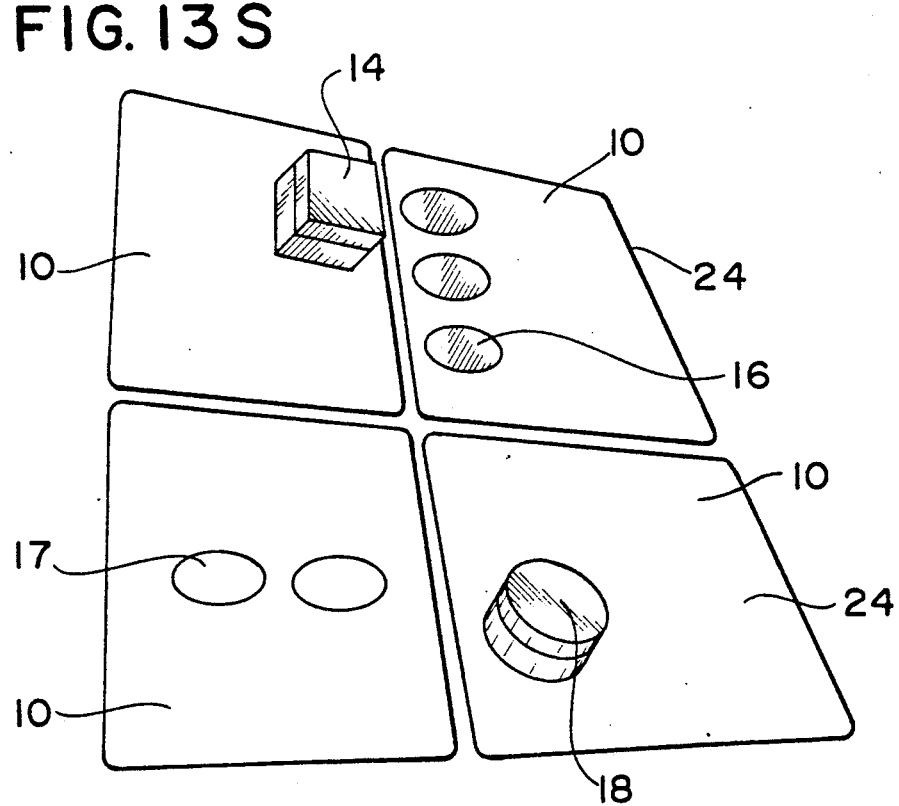

Example 13: FIGS. 13A through S illustrate the application of the invention to solving a system of two linear equations, employing a strategy of substitution. FIG. 13A depicts the system $\{2b+c=4d$ and $2d=2b+2c\}$, or $\{2y+x=4$ and $2=2y+2x\}$. In FIG. 13B it is recognized that since the upper boards equate two boxes and a can with 4 dots, the two boxes and a can of the lower right board can be correctly replaced by four dots, yielding the equivalent system $\{2b+c=4d$ and $2d=4d+c\}$, or $\{2y+x=4$ and $2=4+x\}$, in FIG. 13C. Two dots are removed from each lower board in FIG. 13D, resulting in the equivalent system $\{2b+c=4d$ and $0=2d+c\}$, or $\{2y+x=4$ and $0=2+x\}$, of FIG. 13E. FIGS. 13F–13I focus on solving the equation represented by the lower boards, yielding in FIG. 13I the equivalent system $\{2b+c=4d$ and $-2d=c\}$, or $\{2y+x=4$ and $-2=x\}$. Since it is now known that $c=-2d$, or $x=-2$, the can of the upper left board can be replaced by $-2$ dots in FIG. 13J, yielding in FIG. 13K the equivalent system $\{2b+(-2d)=4d$ and $-2d=c\}$, or $2y-2=4$ and $-2=x\}$. FIGS. 13L—13R focus on solving the equation represented by the upper board, yielding in FIG. 13S the solution $\{b=3d$ and $-2d=c\}$, or $\{y=3$ and $-2=x\}$. The student thus becomes comfortable with a solution to an equation in either of its symmetrical forms (i.e., $x=-2$ or $-2=x$).

Figure 14A:
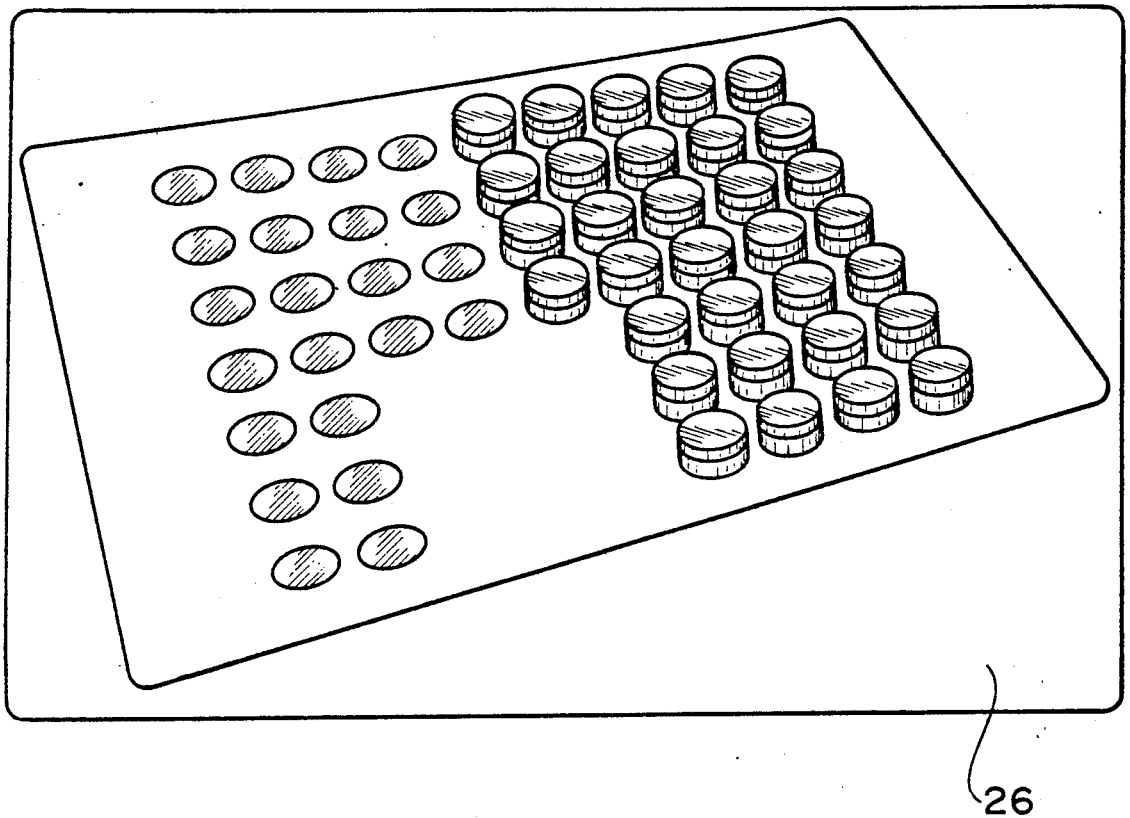
FIGS. 14 through 16 illustrate front and rear sides of cooperating cards which may be used with each of the foregoing board systems.
Figure 14B:
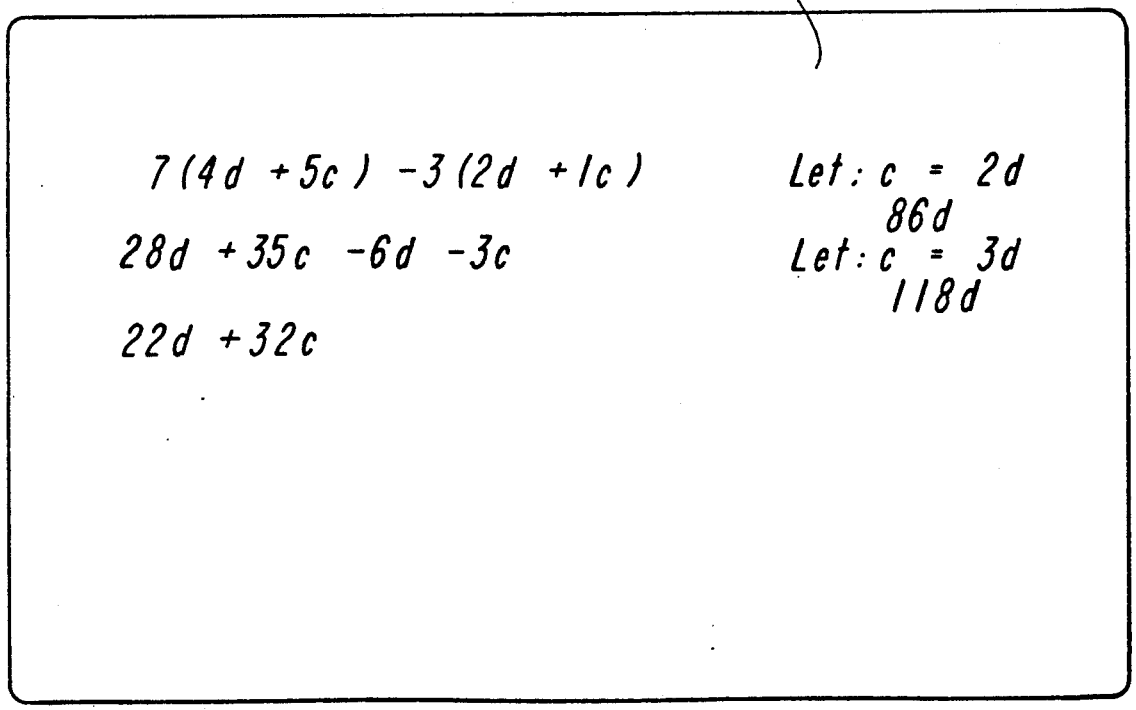
Figures 15A, 15B:
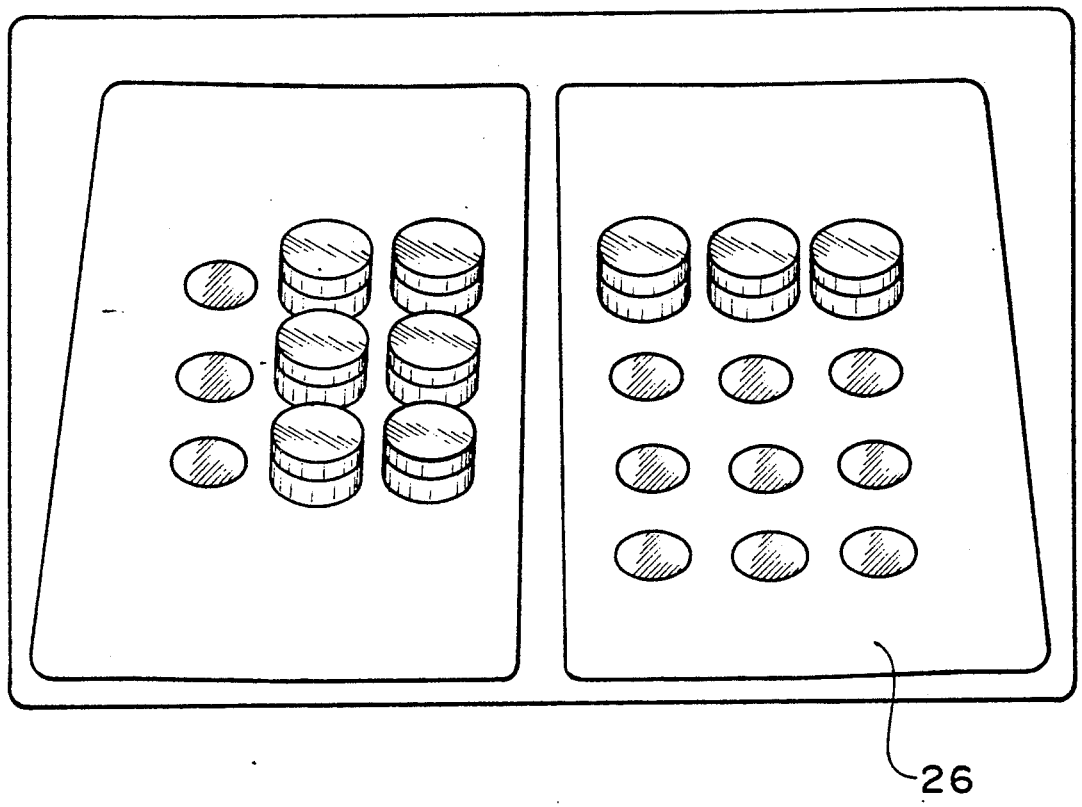
Figures 16A, 16B:
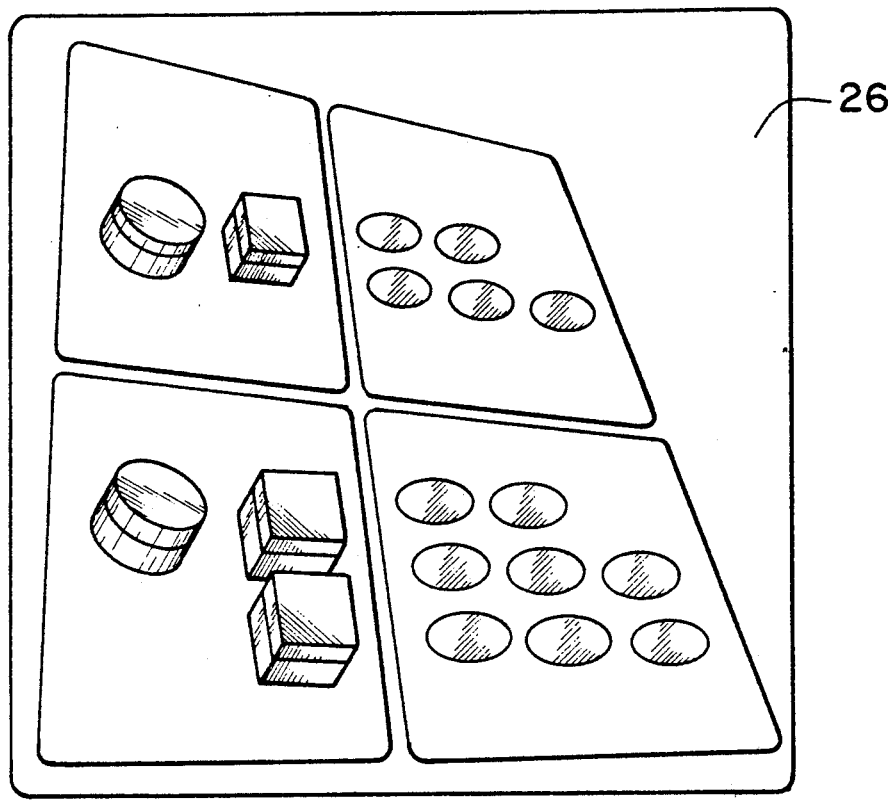

Information regarding setting up the surfaces, symbolic representations, and solutions is provided on the cooperating cards. The obverse side of the card provides a visual and/or tactile (for visually impaired) representation of the actual objects to be displayed. The reverse side establishes an appropriate symbolic representation and/or solution to the counting problem, equation, or set of equations. FIG. 14 FRONT illustrates the front side of a card depicting an array of cans and dots which is counted by the expression $7(4d'5c) - 3(2d + c)$. FIG. 14 REAR illustrates the resulting simplification and answers for several substitutions. FIG. 15 FRONT illustrates the front side of a card depicting the set up for the linear equation $3d+6c=3c+9d$, or $3+2x=3x+9$. FIG. 15 REAR illustrates a form of the solution. FIG. 16 FRONT illustrates the front side of a card depicting the set up for the system of linear equations $\{c+b=5d$ and $c+2b=8d\}$, or $\{x+y=5$ and $x+2y=8\}$. FIG. 16 REAR illustrates a form of the solution using the technique of linear combinations.

Figure 17A:
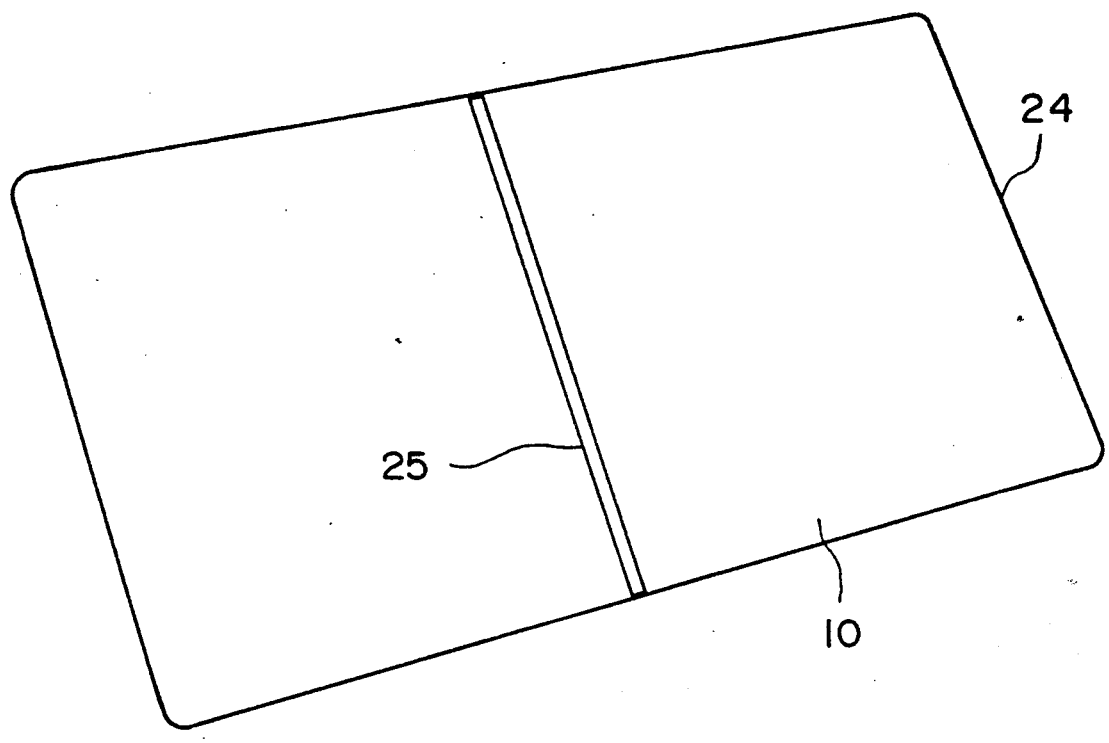
FIG. 17 illustrates a single board system in which the board is divided into zones.
Figure 17B:
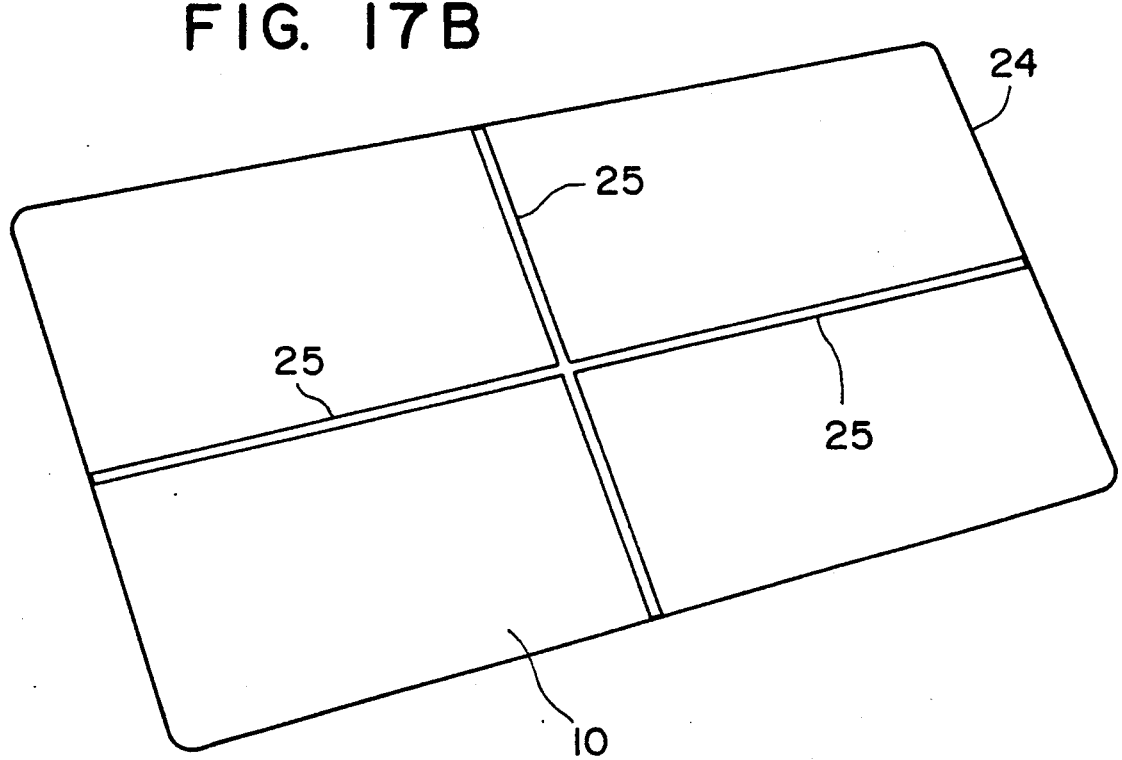

As can be seen from the foregoing examples and drawings, the present invention offers an inexpensive, but concrete kit for the teaching of mathematical concepts including both counting, expressive evaluation, and the solving of a variety of equations. The kit is particularly adapted to permit the progression from the easier concepts to the more complex concepts. While the drawings present the system as separate boards, a single board divided into zones can be used with equal effectiveness. FIG. 17A illustrates a single board divided into two zones, useful for the solution of a linear equation as in example 2. FIG. 17B illustrates a board divided into four zones, useful for the solution of two linear equations as in example 12.

At the introductory levels, the student will actually open the containers to verify the accuracy of the solution or count. When all of the skills have been presented, there will no longer be a need for this so that objects will not have to serve a containing function. Accordingly, the next stage in the progression toward abstraction would be to use flat objects, like squares or circles, to represent denominate units. As the student manipulates these objects, the corresponding symbolic representations can be stressed.

Eventually, the student will become skilled in representing the deductive manipulations symbolically and the objects will not need to be actually moved on the boards. At this point, the student can be presented with a problem depicted on a card. The cards, in fact, can be employed by themselves as a teaching device independent of the boards. Finally, the need for a pictorial representation will no longer exist and the student can be presented only with the symbolic representation (e.g. an equation) and he will be able to perform on paper the appropriate manipulations of which he has acquired an internalized understanding. The use of distinguishable physical features in specifying countable denominate units provides the student with a foundation for solving problems in the physical world that involve volume, temperature, mass, energy, velocity, acceleration and/or other more complex physical properties.

While this invention has been described fully and completely with specific emphasis upon a preferred embodiment, it should be understood that within the scope of the appended claims, the invention may be practiced in a variety of manners without departing from the scope of the inventive concept. It is intended that all matter contained in the above description or shown in the accompanying drawings shall be interpreted as illustrative and not in a limiting sense.

What is claimed is:

1. An educational kit for teaching counting strategies comprising:
    (a) At least one display surface, each such display surface comprising:
        (1) At least one display zone and
        (2) Zone-defining means for establishment of each such display zone on each said display surface;
    (b) A plurality of masking objects separate and distinct from any zone-defining means; and
    (c) A plurality of counting units objects;
said masking objects being of suitable size and shape to hide a plurality of counting unit objects and being manipulable independently of any zone-defining means and said counting unit objects, said counting unit objects being of suitable size and shape to be masked by said masking objects and being manipulable independently of any zone-defining means.

2. An educational kit in accordance with claim 1 comprising at least two separate and distinguishable kinds of masking objects and at least two separate and distinguishable kins of counting unit objects.

3. An educational kit for teaching strategies for solving (n) linear equations in (n) unknowns comprising:
   (a) At least (2n) display surfaces, each of said display surfaces comprising a single display zone with zone-defining means consisting only of the edges or borders of said display surface;
   (b) A plurality of at least (n) distinguishble types of masking objects; and
   (c) A plurality of counting unit objects;
said masking objects being of suitable size and shape to hide a plurality of counting units and being manipulable independently of any zone-defining means and said counting unit objects, and said counting unit objects being of suitable size and shape to be masked by said masking objects and being manipulable independently of any zone-defining means.

4. An educational kit in accordance with claim 3 in which all of said counting unit objects are the same.

5. An educational kit in accordance with claim 3 in which said counting unit objects are of at least two distinctive types, one of said types being solely to designate units and the other of said counting unit objects representing multiples or fractions of units.

6. An educational kit for teaching strategies for solving (n) linear equations in (n) unknowns comprising:
   (a) A single display surface comprising at least (2n) display zones and means defining each such display zone on said display surface;
   (b) A plurality of at least (n) distinguishable types of masking objects;
   (c) A plurality of counting unit objects;
said zone-defining means being distinct from and independent of said masking objects and said counting unit objects; said masking objects being of suitable size and shape to hide a plurality of counting units and being manipulable independently of any zone-defining means and said counting unit objects, and said counting unit objects being of suitable size and shape to be masked by said masking objects and being manipulable independelty of any zone-defining means.

7. An educational kit in accordance with claim 6 in which all of said counting unit objects are the same.

8. An educational kit in accordance with claim 6 in which said counting unit objects are of at least two distinctive types, one of said types being solely to designate units and the other of said counting unit objects representing multiples or fractions or units.

9. An educational kit for teaching strategies for solving (n) linear equations in (n) unknowns comprising:
   (a) At least two (n) display surfaces;
   (b) A plurality of at least (n) distinguishable types of masking objects which are individually manipulatable;
   (c) A plurality of substantially identical counting unit objects capable of being masked by said masking objects; and
   (d) A set of cards, the obverse of each card having a representation of a setup of the display surface, masking objects, and counting unit objects for a demonstration problem and the reverse of each ncard having a solution to the obverse problem, and in which the minimum number of each type of masking object in said kit is equal to the maximum number of each shown on the obverse of any of said cards, and the minimum number of counting unit objects is equal to the largest number of counting unit objects represented on the obverse side of any of said cards as determined by the number visible on said obverse side plus (n) times the unknown quantity represented by each of said masking objects.

10. An educational kit for teaching strategies for solving (n) linear equations in (n) unknowns comprising:
    (a) At least two (n) display surfaces;
    (b) A plurality of at least (n) distinguishable types of masking objects which are individually manipulatable;
    (c) A plurality of counting unit objects capable of being masked by said masking objects, said counting unit objects being of at least two distincitive types, one of said types being solely to designate units and the other of said counting unit objects representing multiples or fractions of units; and
    (d) A set of cards, the obverse of each card having a representation of a setup of the display surface, masking objects, and counting unit objects for a demonstration problem and the reverse of each card having a solution to the obverse problem, and in which the minimum number of each type of masking object in said kit is equal to the maximum number of each shown on the obverse of any of said cards, and the minimum number of counting unit objects which represents a multiple of counting units is equal to the number of masking objects for said multiple-representing counting unit object.

11. A method for demonstrating strategies for solving linear equations which comprises:
    (a) Providing at least two display surfaces for each linear equation of a problem;
    (b) For each linear equation involved in the problem, setting up on one of said surfaces the number of counting unit objects equal to the totality of the value of the lefthand side of the equation;
    (c) Setting up on said display surface a number of masking objects equal to the quantity of unknowns represented on that side of the equation, each such masking unit masking a number of counting unit objects equal in value to the value of the unknown;
    (d) Repeating said procedure for the second of said display surfaces for the righthand side of said equation;
    (e) Repeating the foregoing steps for each linear equation and each unknown involved in said problem; and
    (f) Progressively removing visible counting unit objects and masking unit objects including masked counting unit objects from each member of the pair of display surfaces that represents a linear equation in accordance with the usual mathematical operations and properties until only one masking unit with included masked objects is left on one of said display surfaces and only counting unit objects remain on the paired display surface.

12. A method in accordance with claim 11 in which the masking unit object is removed to reveal the unknown number of unit objects equal to the counting unit objects retained on the other of the paired surfaces.

* * * * *